United States Patent
Yoshioka et al.

(10) Patent No.: US 7,412,326 B2
(45) Date of Patent: Aug. 12, 2008

(54) MAP DISPLAY DEVICE AND MAP DISPLAY METHOD

(75) Inventors: Mototaka Yoshioka, Osaka (JP); Jun Ozawa, Nara (JP); Takahiro Kudo, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/633,480

(22) Filed: Dec. 5, 2006

(65) Prior Publication Data

US 2007/0078599 A1    Apr. 5, 2007

Related U.S. Application Data

(63) Continuation of application No. PCT/JP2005/010460, filed on Jun. 8, 2005.

(30) Foreign Application Priority Data

Jun. 11, 2004    (JP) ............................. 2004-173872

(51) Int. Cl.
    *G06G 7/78*    (2006.01)
(52) U.S. Cl. ...................... 701/208; 340/990
(58) Field of Classification Search ......... 701/208–212, 701/201; 340/990, 995.1, 995.11, 995.14, 340/995.15, 995.19, 995.22, 995.26
See application file for complete search history.

(56) References Cited

U.S. PATENT DOCUMENTS 5,089,826 A * 2/1992 Yano et al. ................. 342/457
5,748,109 A * 5/1998 Kosaka et al. ........... 340/995.14
6,006,161 A * 12/1999 Katou ........................ 701/212
6,040,824 A    3/2000 Maekawa et al.
6,067,502 A * 5/2000 Hayashida et al. ........... 701/209
6,453,236 B1    9/2002 Aoki (Continued)

FOREIGN PATENT DOCUMENTS

EP            0 822 529        2/1998

(Continued)

*Primary Examiner*—Dalena Tran
(74) *Attorney, Agent, or Firm*—Wenderoth, Lind & Ponack, L.L.P.

(57) ABSTRACT

A map display device which scroll-displays a travel route simply scroll-displays a route from a current driving location to a destination on an entire screen. The map display device of the present invention is a map display device which displays a map regarding a travel route of a mobile object, and is configured of: a display unit; a route calculation unit and a map information storage unit which obtain map information concerning a current position of the mobile object and the travel route; a current position detection unit, a current position storage unit and a display area determination unit which allow a map indicated by the obtained map information concerning the current position of the mobile object to be displayed entirely on a display screen; and a partial map display area storage unit and a partial map display position determination unit which display a map indicated by the obtained map information with regard to the travel route of the mobile object on a partial display area which is a part of the display screen, in which the partial map display position determination unit displays, on the partial display area, a partial map which is a map regarding a part of the travel route while allowing the partial map to be scrolled along the travel route.

23 Claims, 64 Drawing Sheets

U.S. PATENT DOCUMENTS

| | | | |
|---|---|---|---|
| 6,640,185 B2 * | 10/2003 | Yokota et al. | 701/208 |
| 6,826,472 B1 * | 11/2004 | Kamei et al. | 701/202 |
| 6,836,728 B2 * | 12/2004 | Shimabara | 701/212 |
| 6,954,696 B2 * | 10/2005 | Ihara et al. | 701/208 |

FOREIGN PATENT DOCUMENTS

| | | |
|---|---|---|
| JP | 5-080699 | 4/1993 |
| JP | 11-281385 | 10/1999 |
| JP | 2000-098880 | 4/2000 |
| JP | 2000-122529 | 4/2000 |
| JP | 2002-277260 | 9/2002 |
| JP | 3412164 | 3/2003 |
| JP | 2003-157135 | 5/2003 |
| JP | 2003-214880 | 7/2003 |
| JP | 2004-028646 | 1/2004 |
| JP | 2004-053951 | 2/2004 |

* cited by examiner

MAP DISPLAY DEVICE AND MAP DISPLAY METHOD

CROSS REFERENCE TO RELATED APPLICATION(S)

This is a continuation application of PCT application No. PCT/JP2005/010460 filed Jun. 8, 2005, designating the United States of America.

BACKGROUND OF THE INVENTION (1) Field of the Invention

The present invention relates to a map display device and a map display method for scroll displaying the following for a user's easy viewing in the case where a travel route is set through destination setting: a destination; a map showing a route to the destination; commercial information; and traffic information.

(2) Description of the Related Art

Conventionally, devices which scroll-display a map showing a travel route include a device which displays a route from a current position to a destination on a scroll screen (e.g., see Japanese Patent No. 3412164 (see p.5, FIG. 1)). FIG. 1 is a diagram showing a conventional display example of scrolling a route map, which is described in the Patent Document 1.

31 in FIG. 1 denotes a current display screen while a vehicle position 21 shows a current driving state. FIG. 1 further shows a destination 23 that is set through destination setting, and an optimal road 22 to the destination. Since the route from the current position to the destination cannot be entirely displayed on the current display screen 31, the conventional map display device displays the optimal road 22 to the destination on a main screen by scrolling from a scroll screen 1 (32 in FIG. 1) to a scroll screen 2 (33 in FIG. 1), and then to a scroll screen 3 (34 in FIG. 1) so as to display the route to the destination.

SUMMARY OF THE INVENTION

However, with the conventional structure as described above, since a map showing a route to a destination is simply scroll-displayed on the current display screen, the problem is that the user cannot view the information on the current driving state and the current driving information while scrolling the screen.

An object of the present invention is to provide a map display device which scroll-displays, in an appropriate state, a destination and information on a route to the destination in a window different from a current position display screen, so that the user can easily perceive the route information.

In order to solve the conventional problem as described above, the map display device according to the present invention is a map display device which displays a map regarding a travel route of a mobile object. The device includes: a display screen; a map information obtainment unit which obtains map information concerning a current position and the travel route of the mobile object; a whole-display unit which displays, on the whole display screen, a map indicated by the obtained map information concerning the current position of the mobile object; and a partial-display unit which displays, on a partial display area that is a part of the display screen, a map indicated by the obtained map information concerning the travel route of the mobile object, wherein the partial-display unit displays, on the partial display area, a partial map that is a map related to a part of the travel route while causing the map to be scrolled along the travel route, the partial map being superimposed on the map displayed by the whole-display unit.

The structure as described above enables the user to perceive the route information which is map information regarding a travel route, without decreasing the visibility of the information related to the current position of a driving vehicle.

With the map display device according to the present invention, the user can easily perceive the route information regarding a destination and a route to the destination without the current driving information being blocked.

FURTHER INFORMATION ABOUT TECHNICAL BACKGROUND TO THIS APPLICATION

The disclosure of Japanese Patent Application No. 2004-173872 filed on Jun. 11, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

Figure 1:
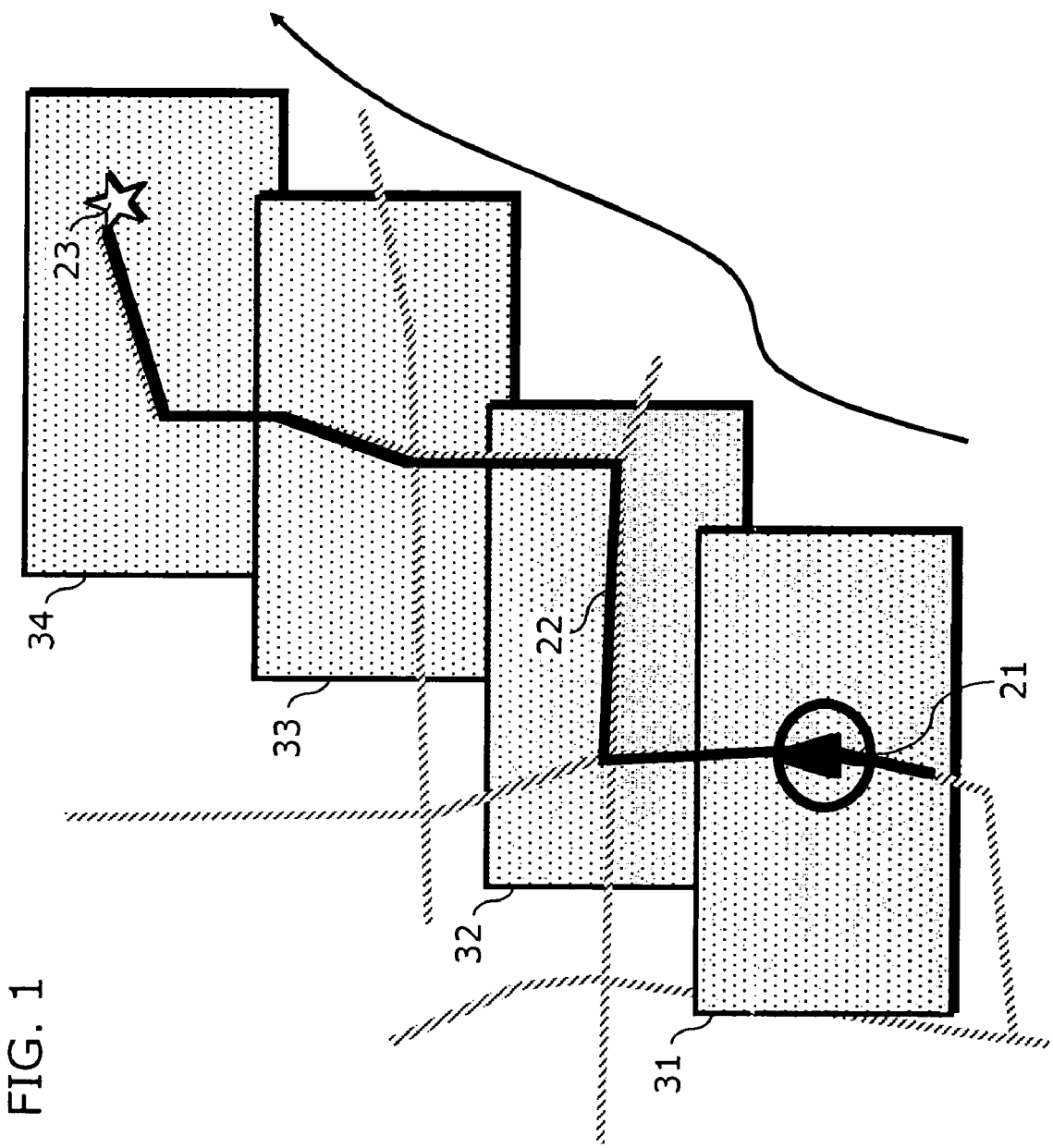
FIG. 1 is a diagram showing a conventional display example of scrolling a route map, which is described in Patent Document 1.
Figure 2:
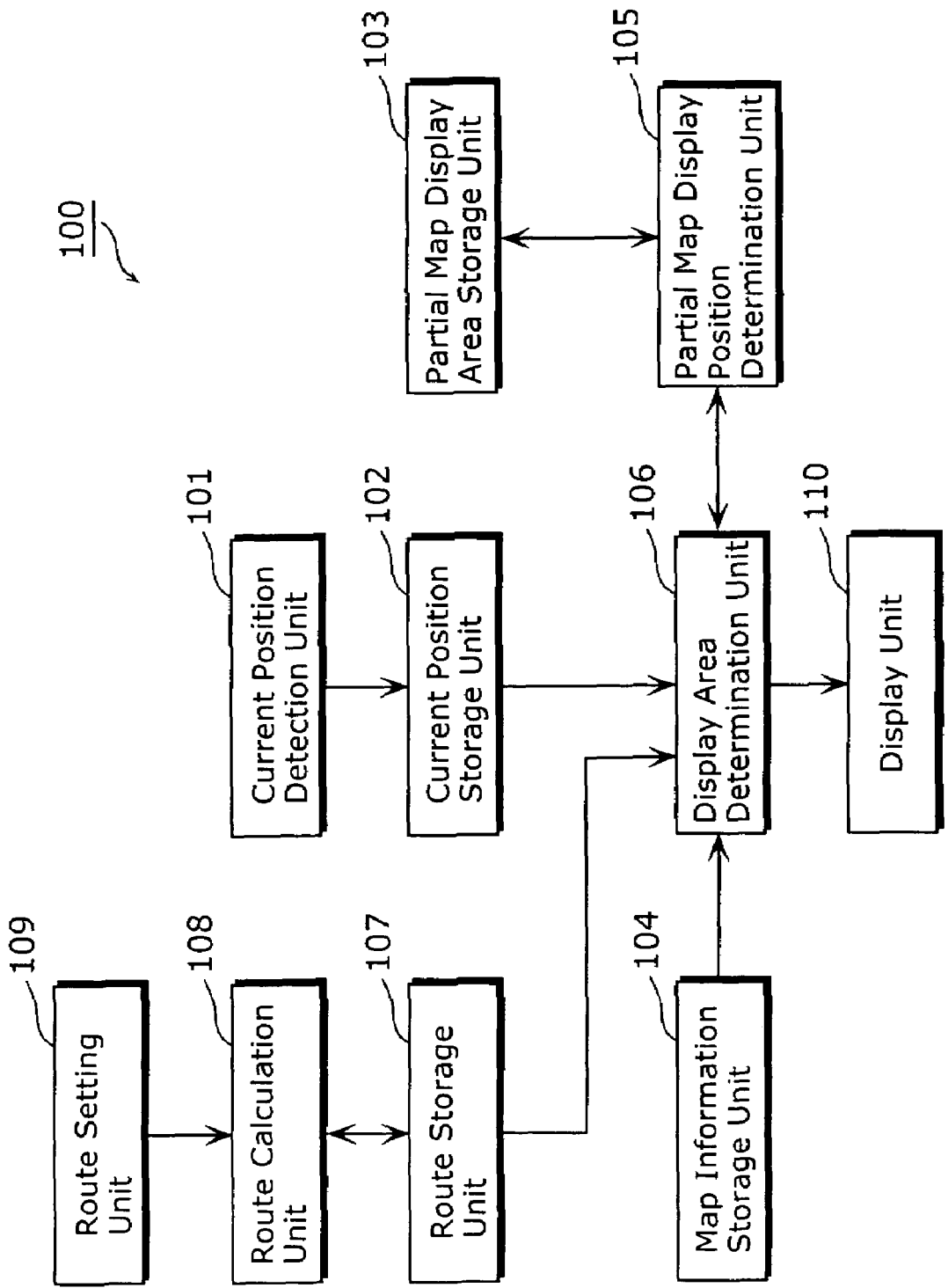
FIG. 2 is a block diagram showing a configuration of a map display device according to the embodiment (First Embodiment)
Figure 5:
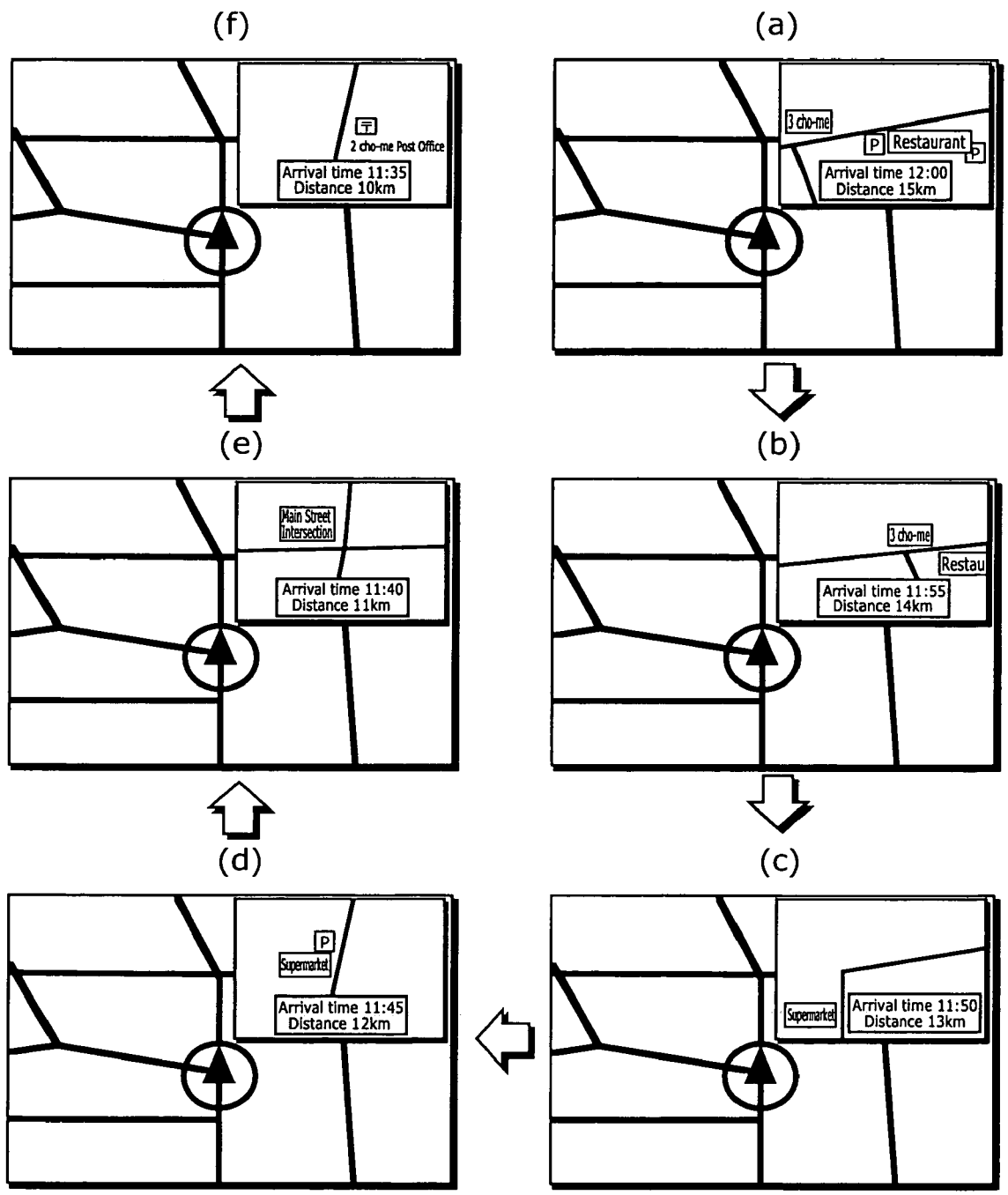
Figure 6:
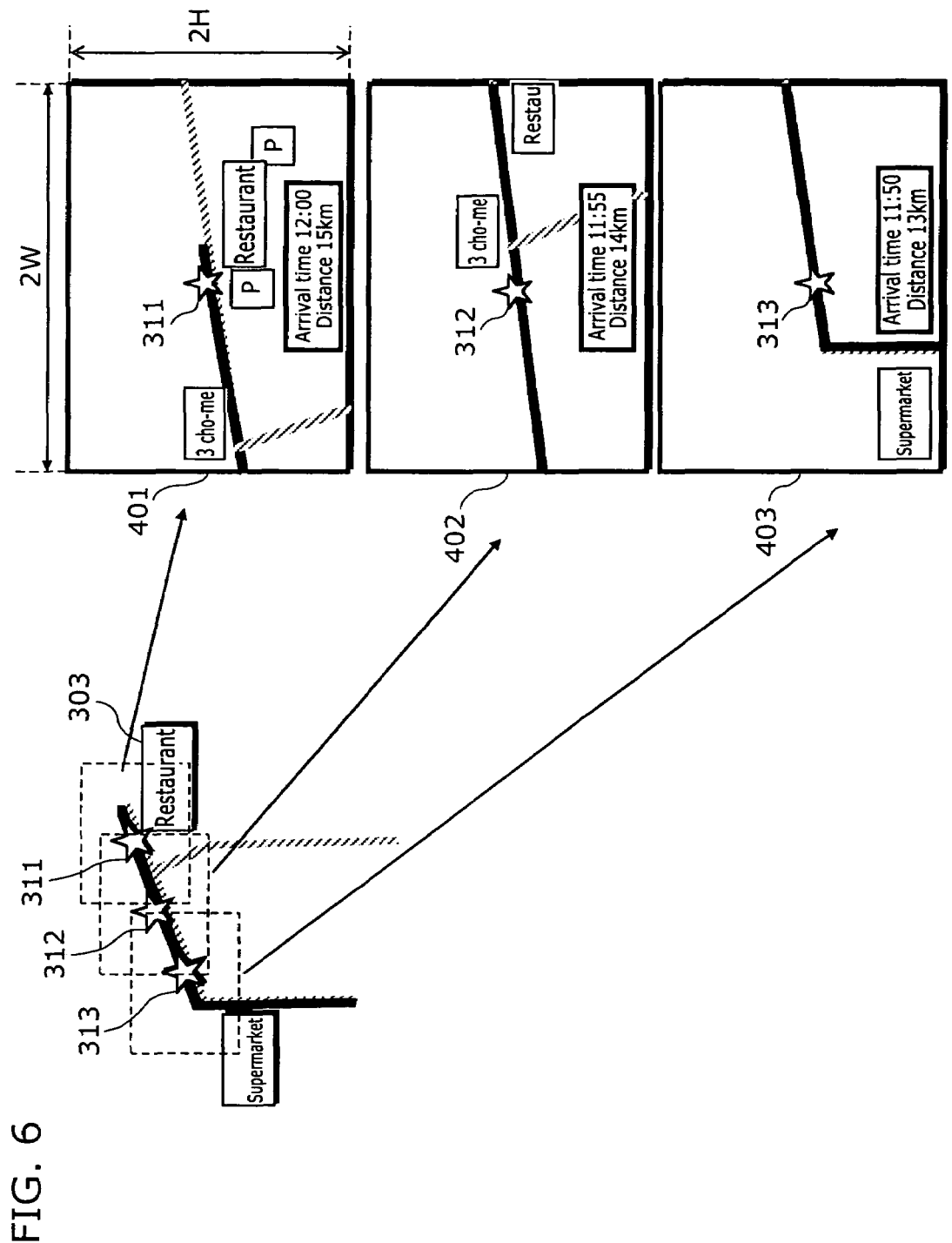
Figure 7:
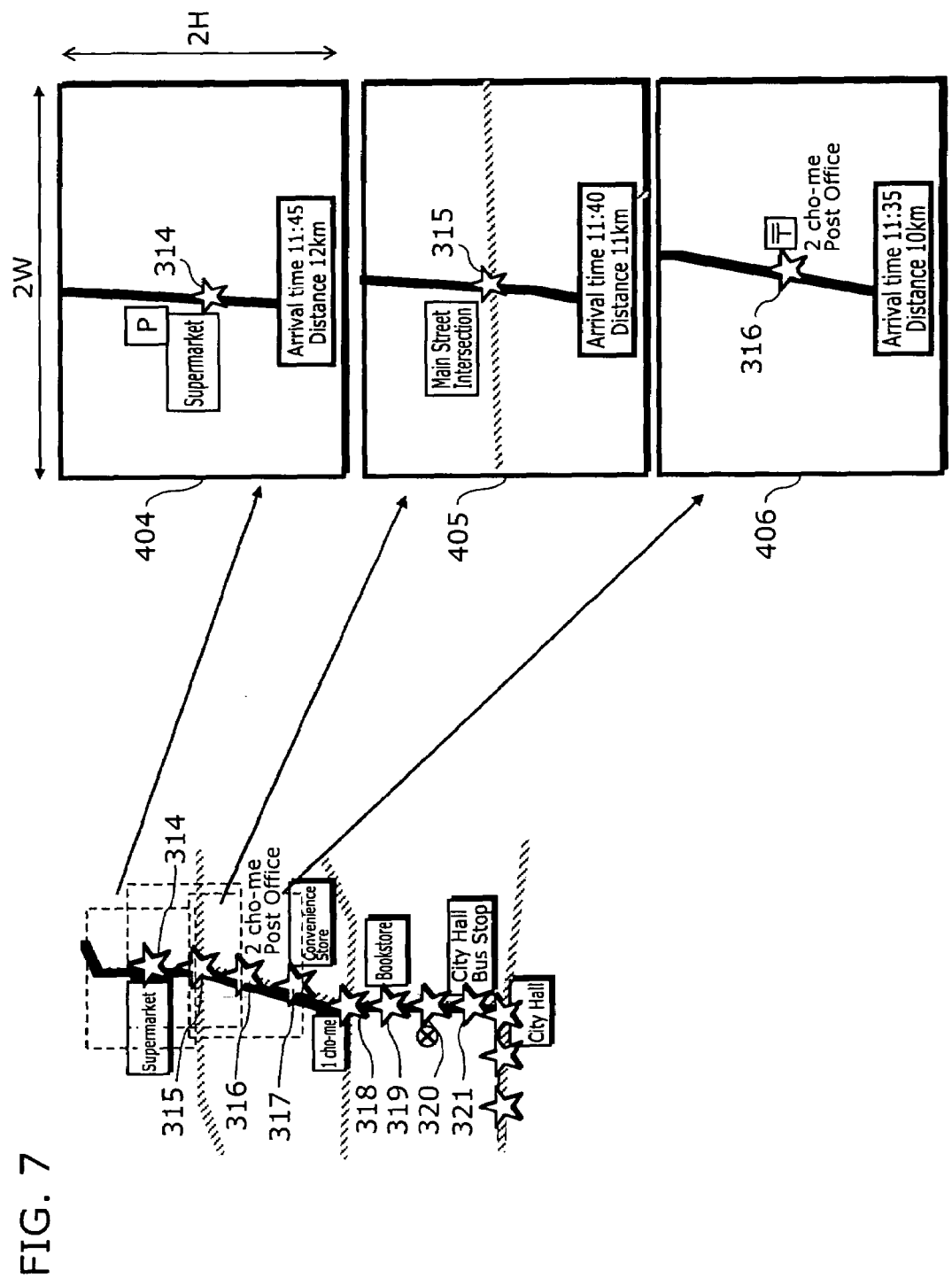
Figure 8:
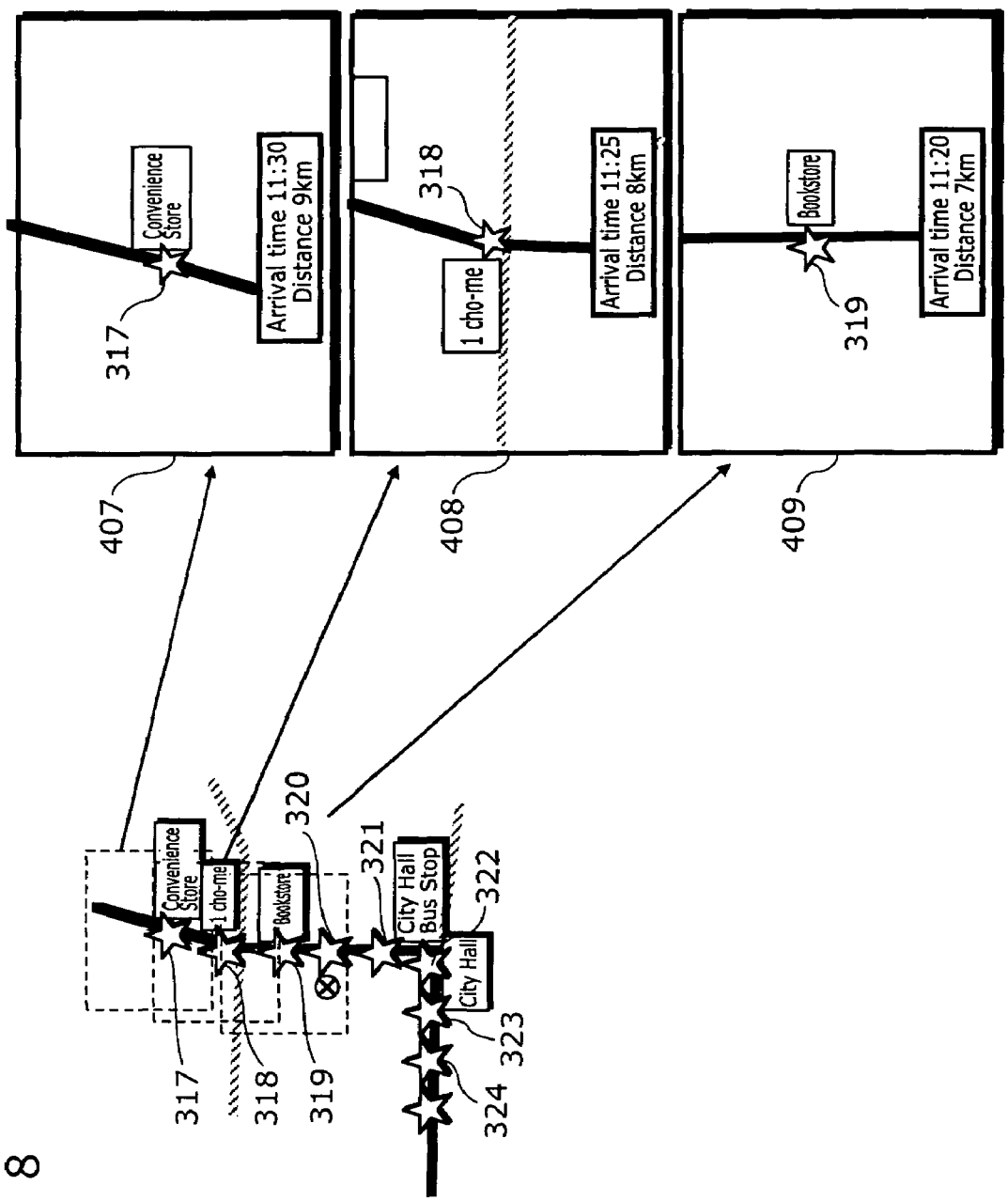
Figure 9:
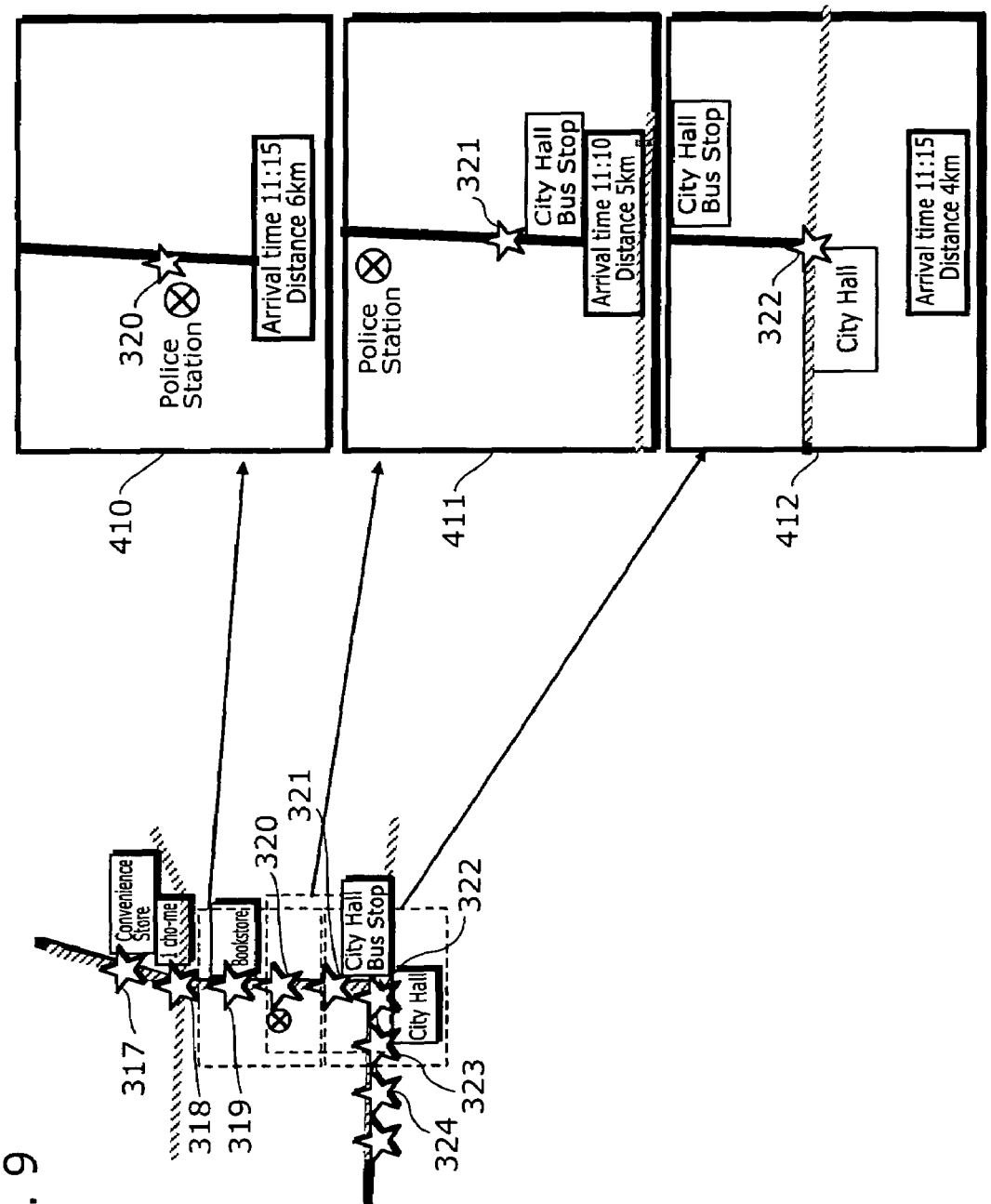
Figure 10:
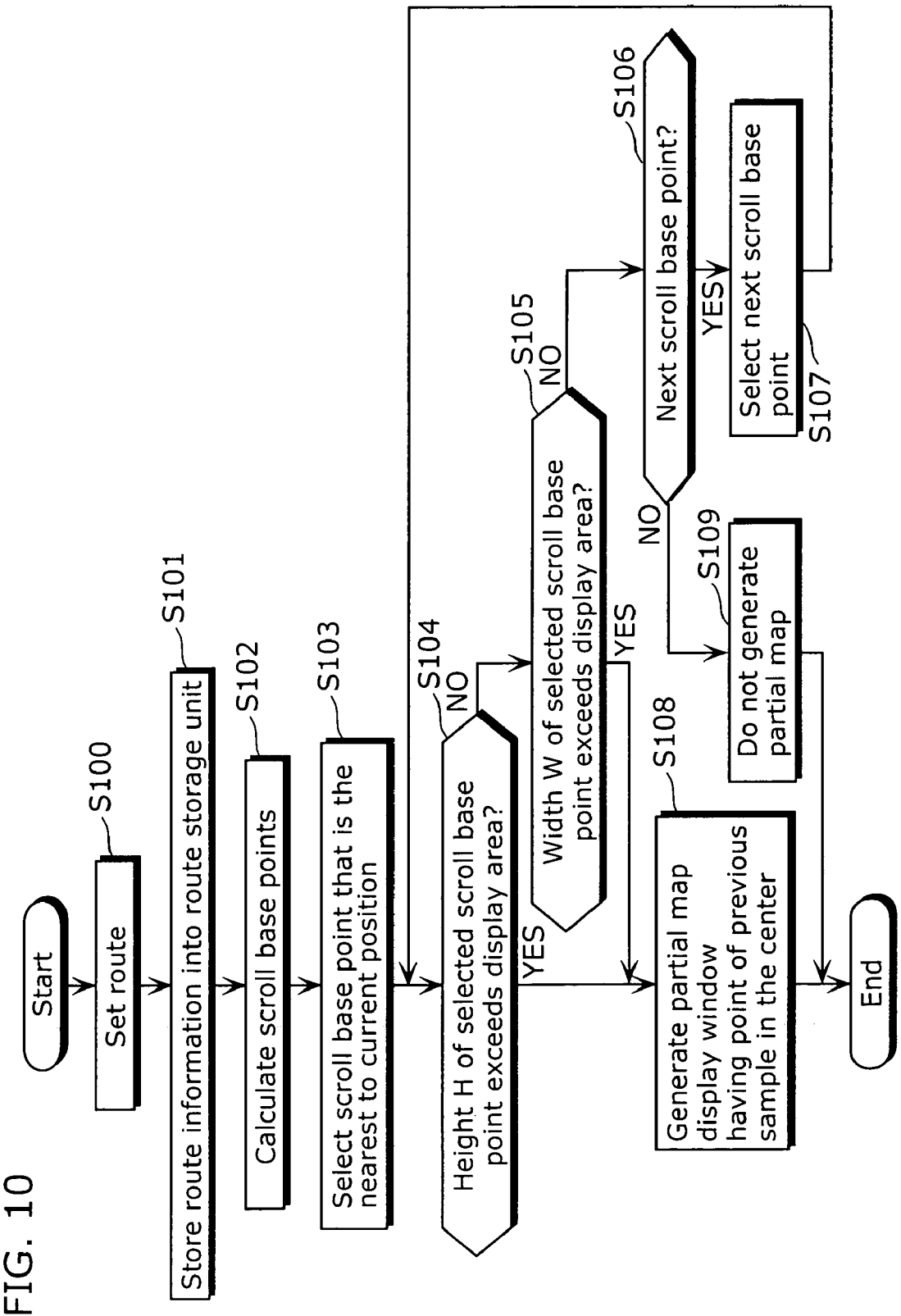
Figure 11:
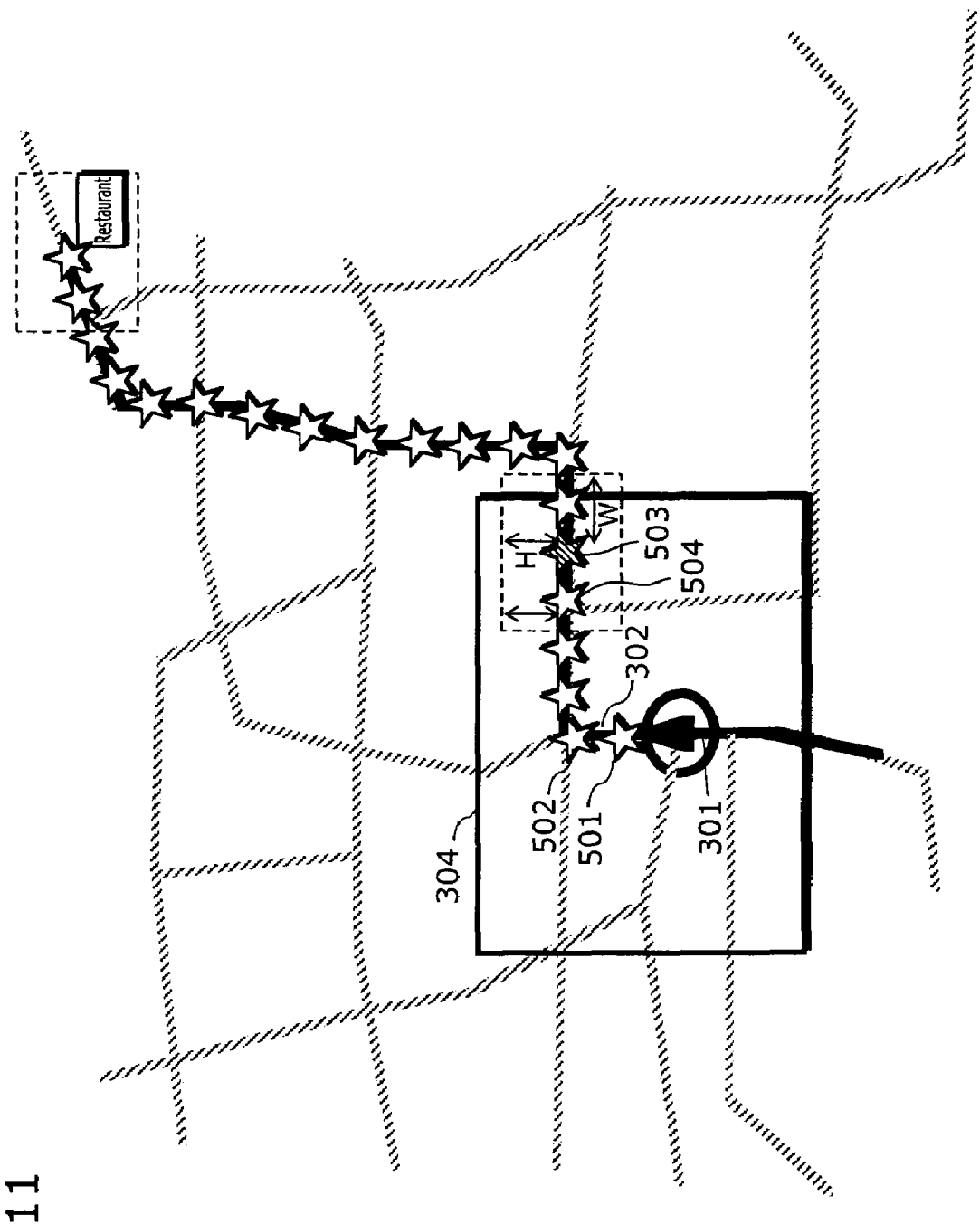
Figure 12:
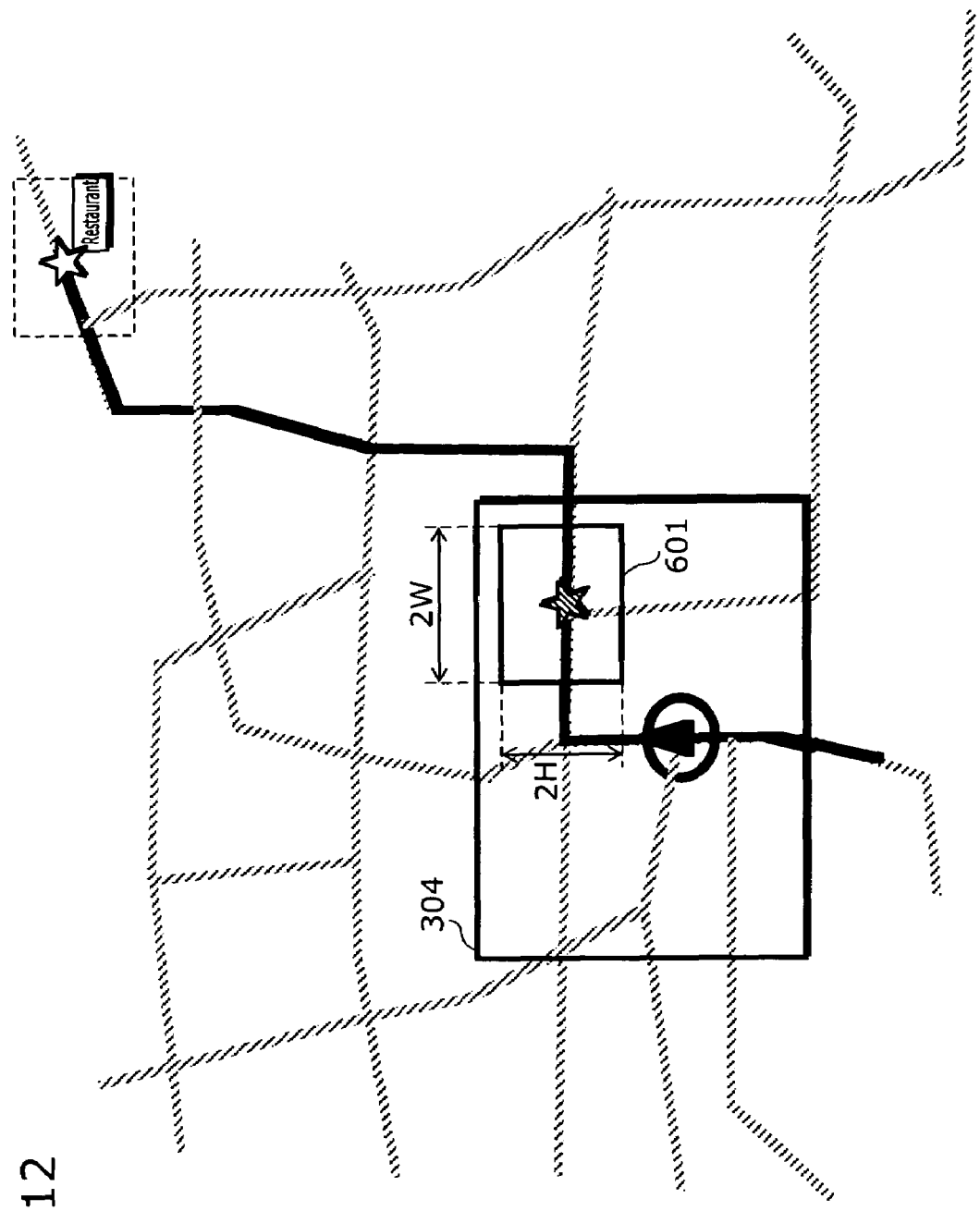
Figure 13:
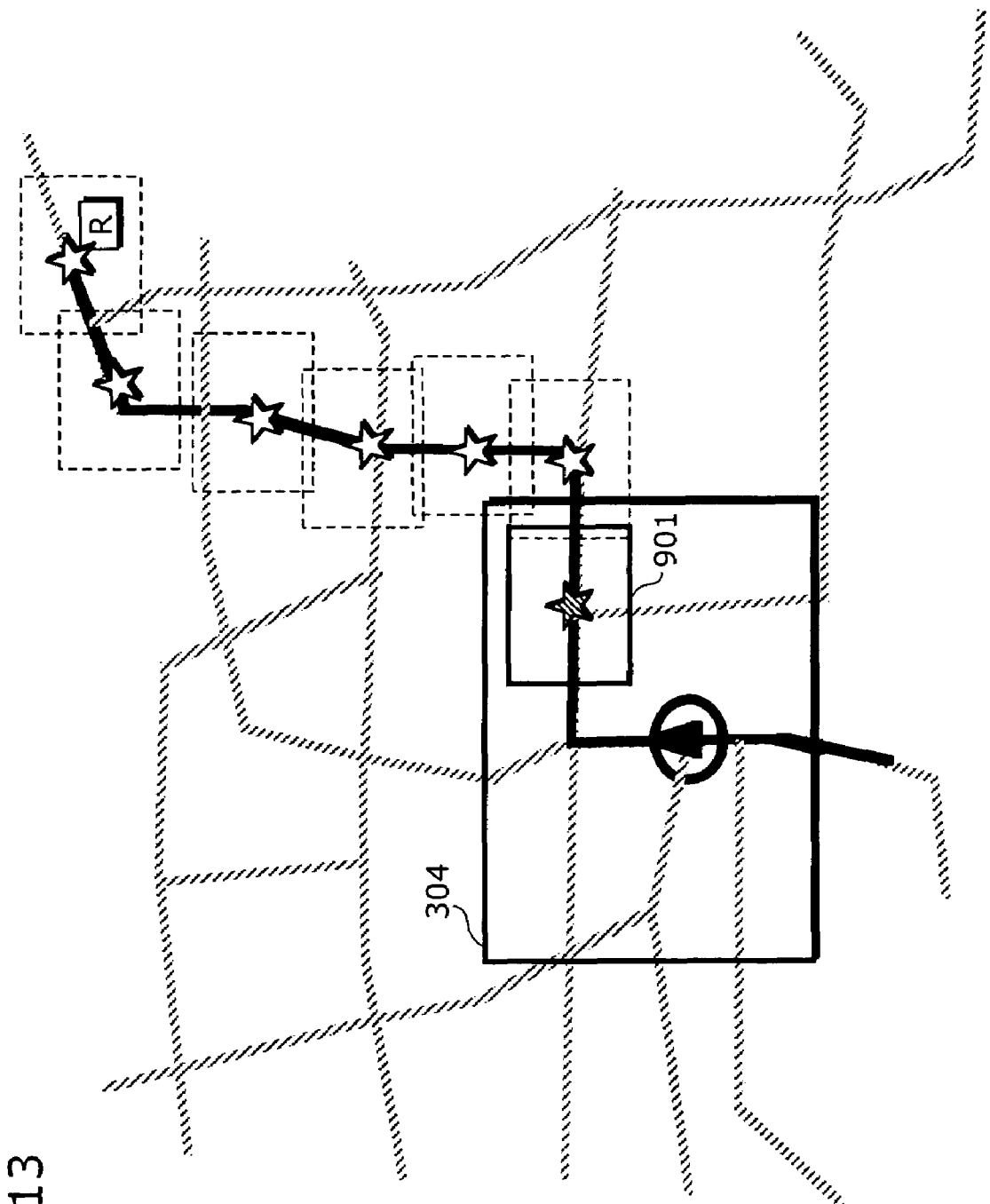
Figure 14:
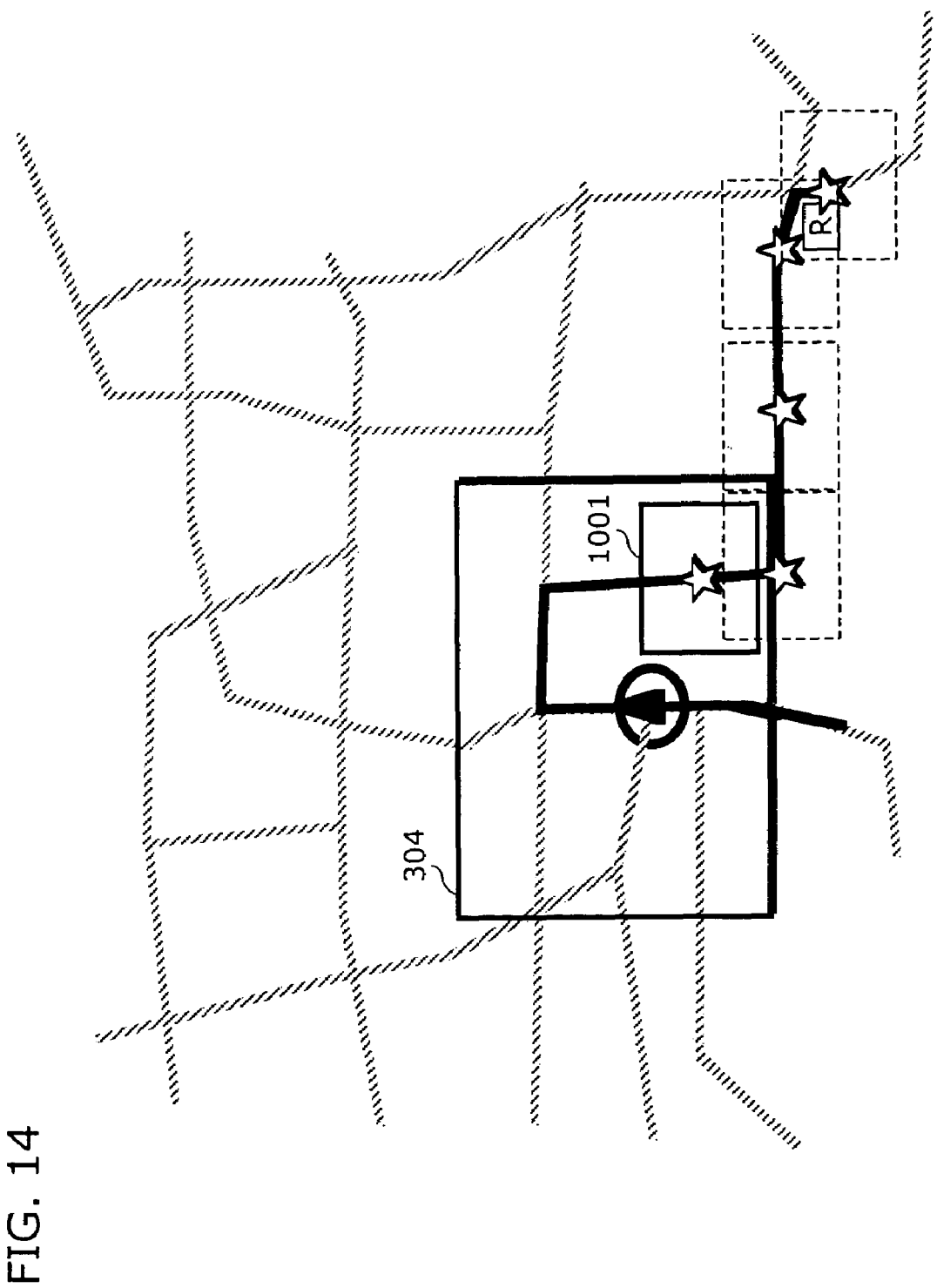
Figure 15:
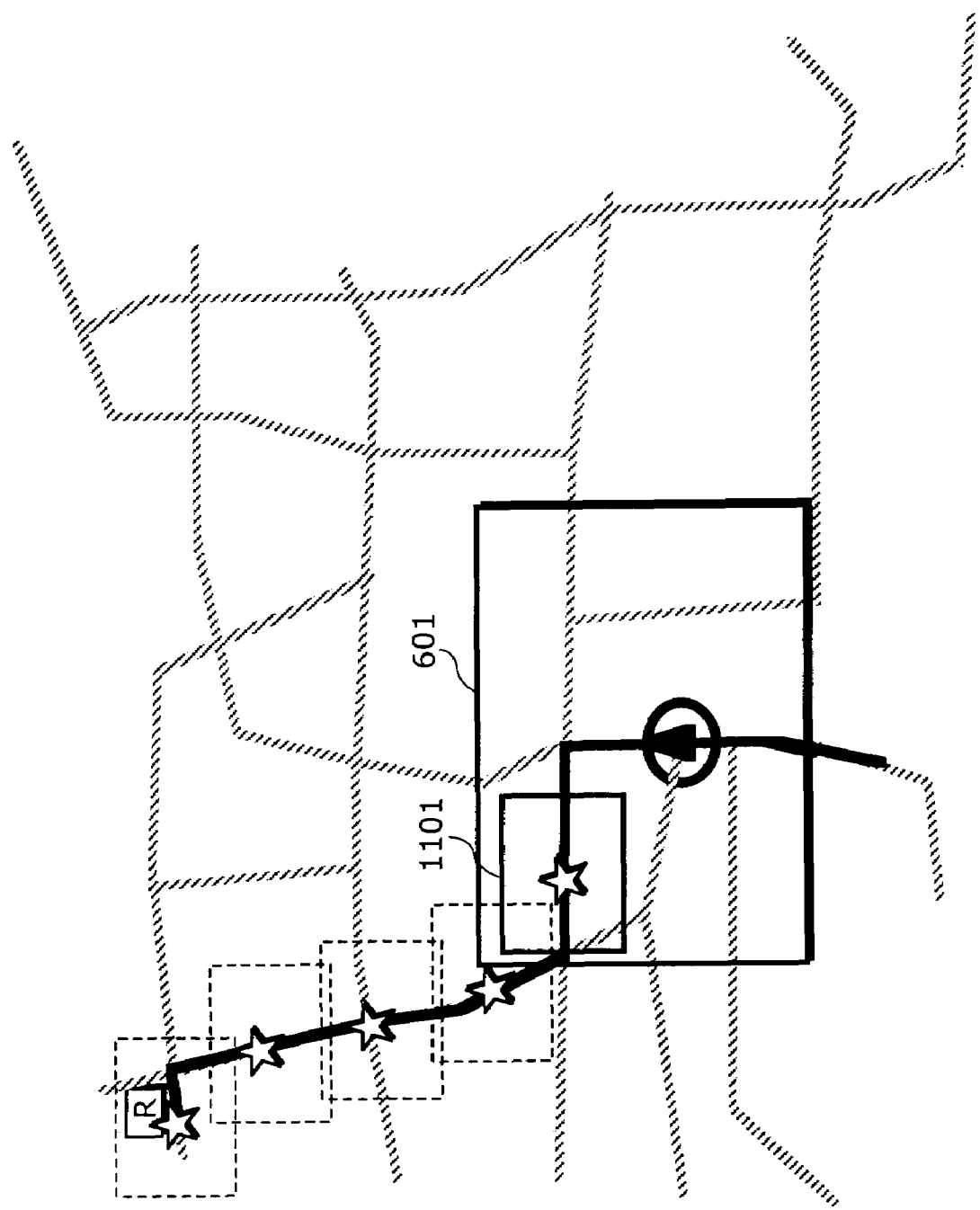
Figure 16:
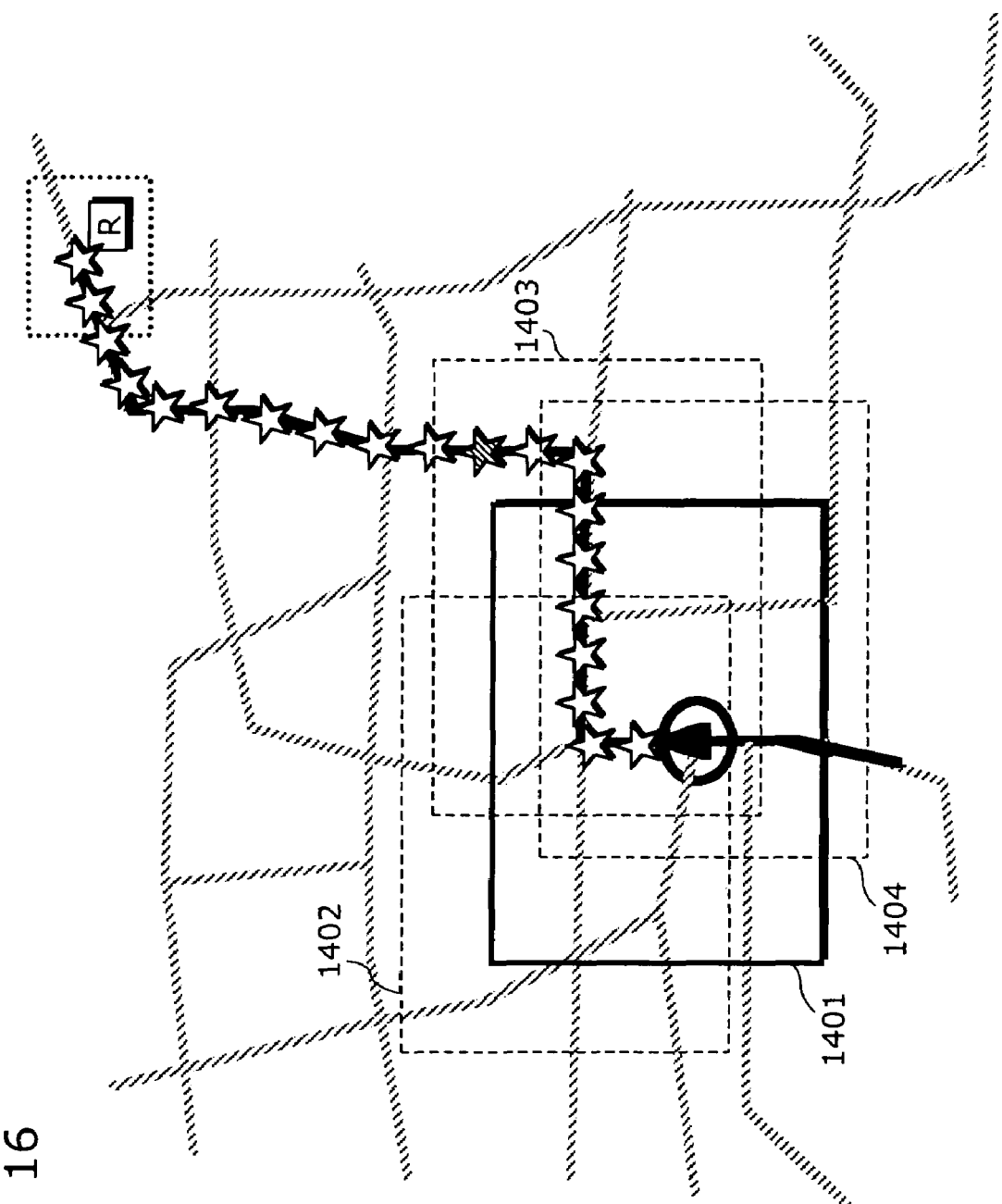
Figure 17:
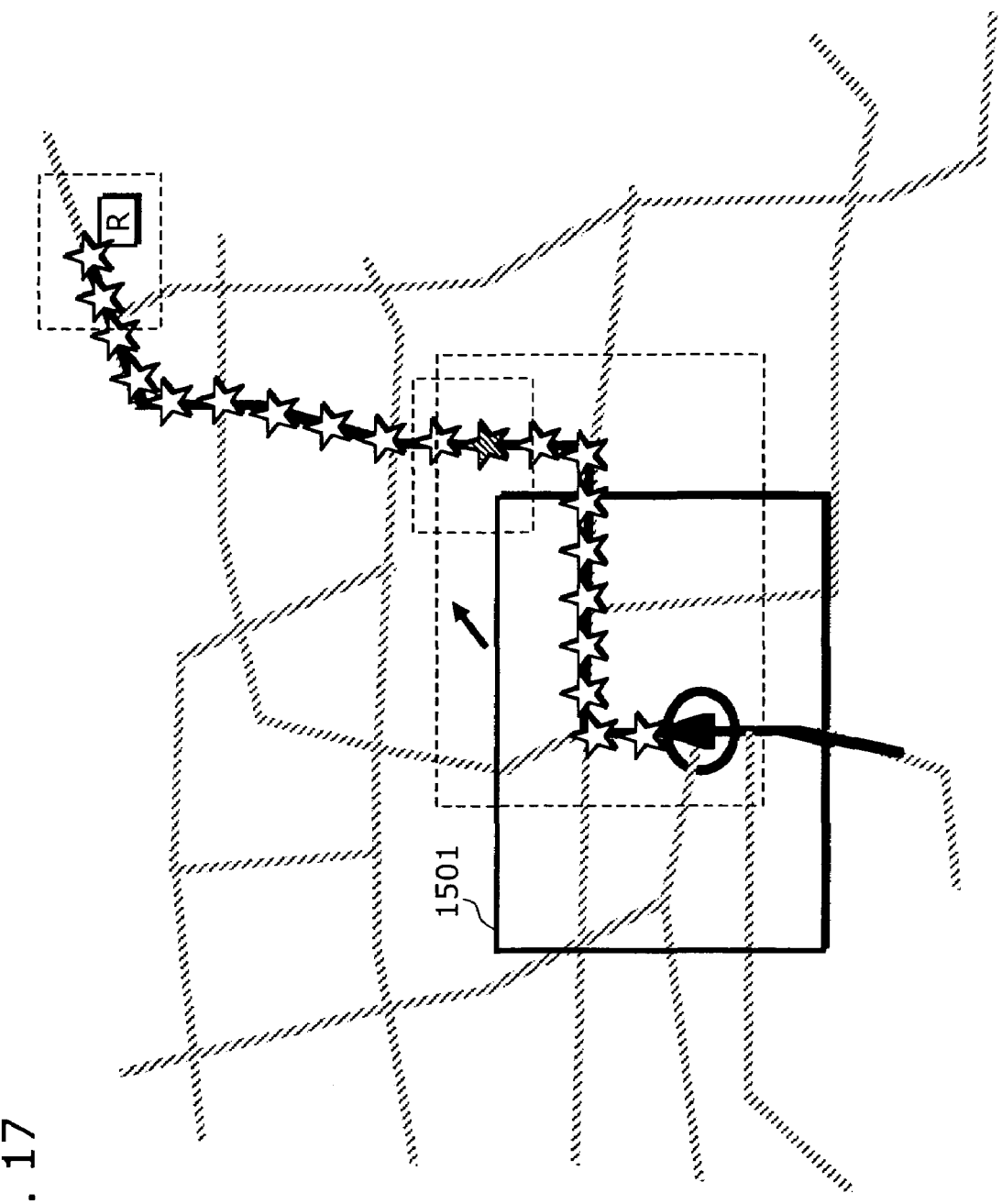
Figure 18:
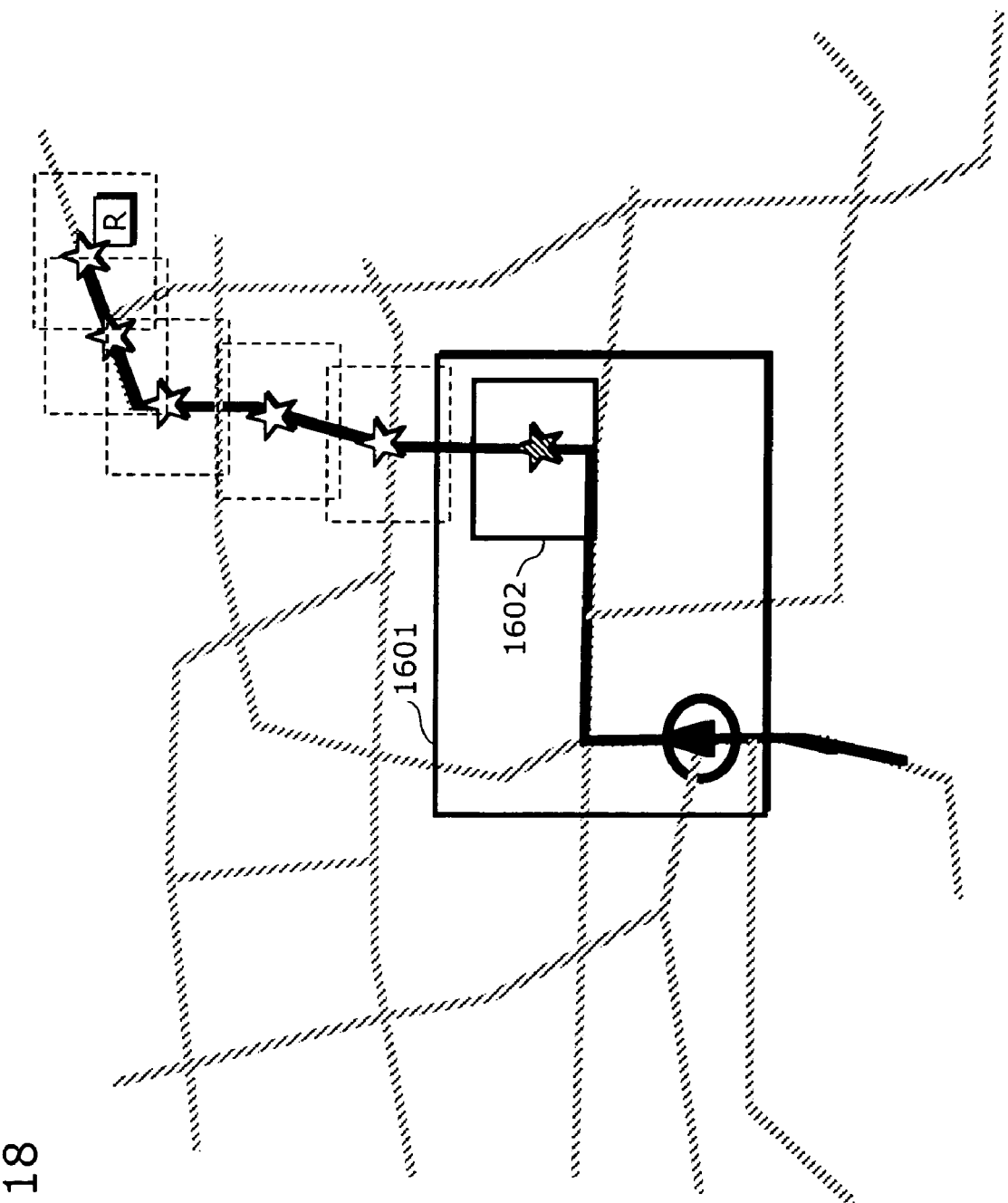
Figure 19B:
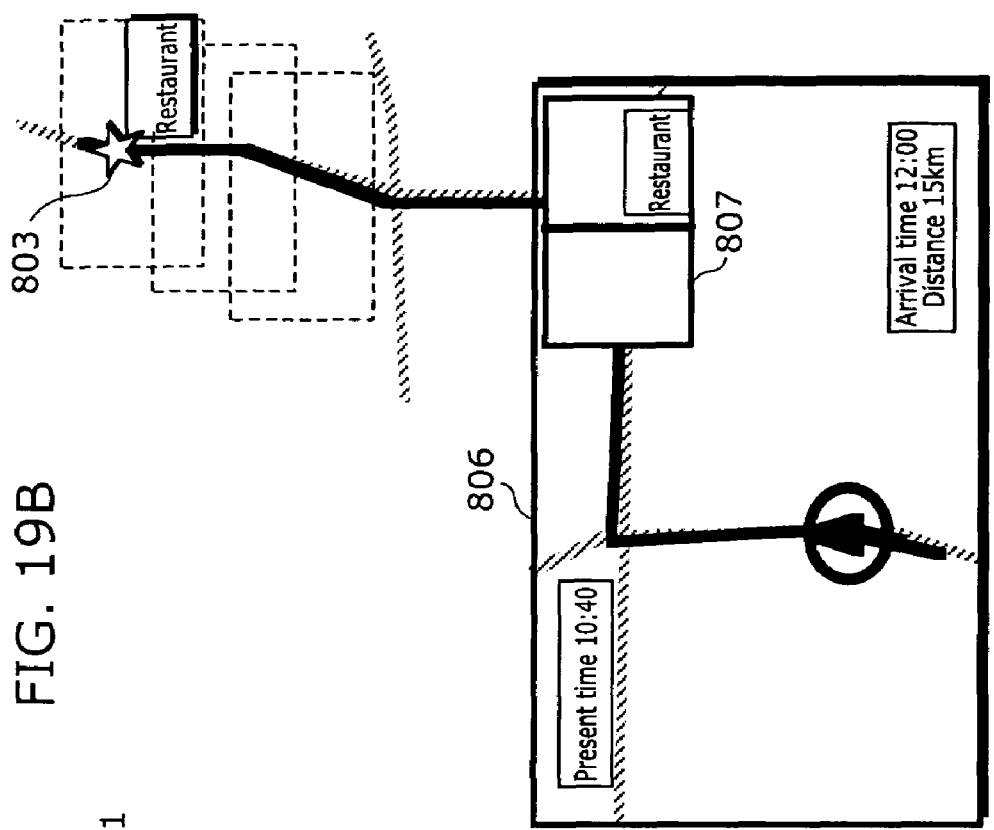
Figure 19A:
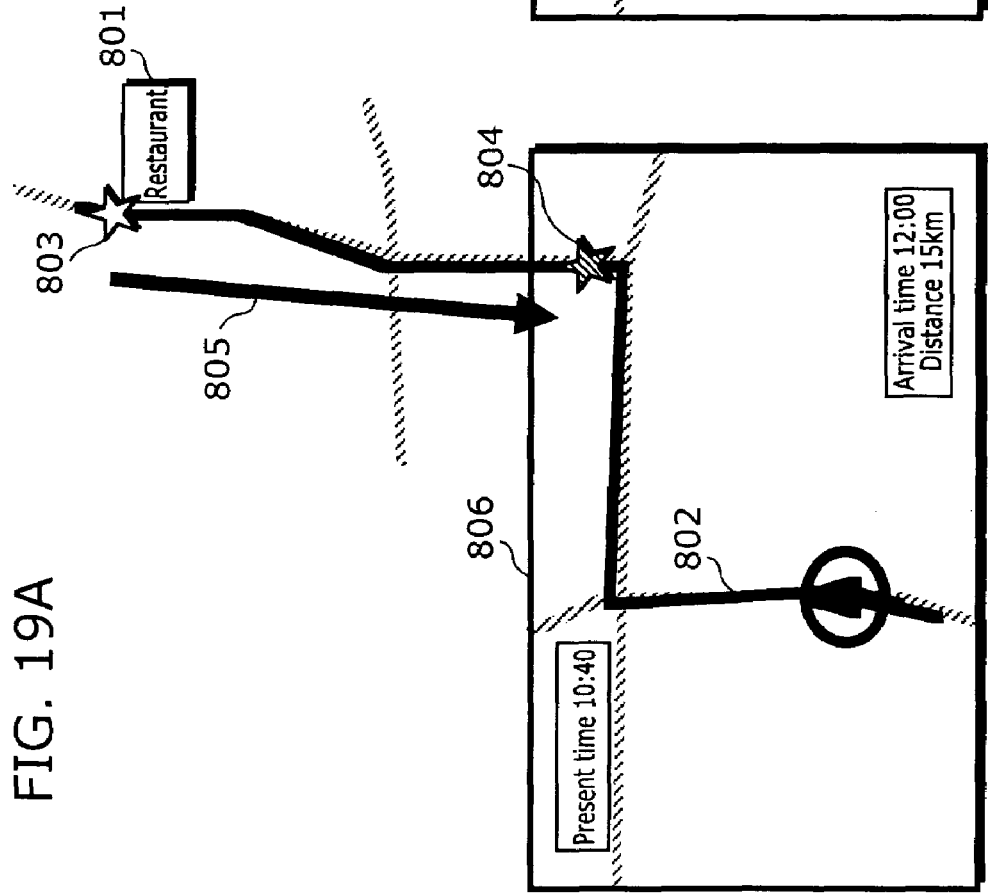
Figure 20A:
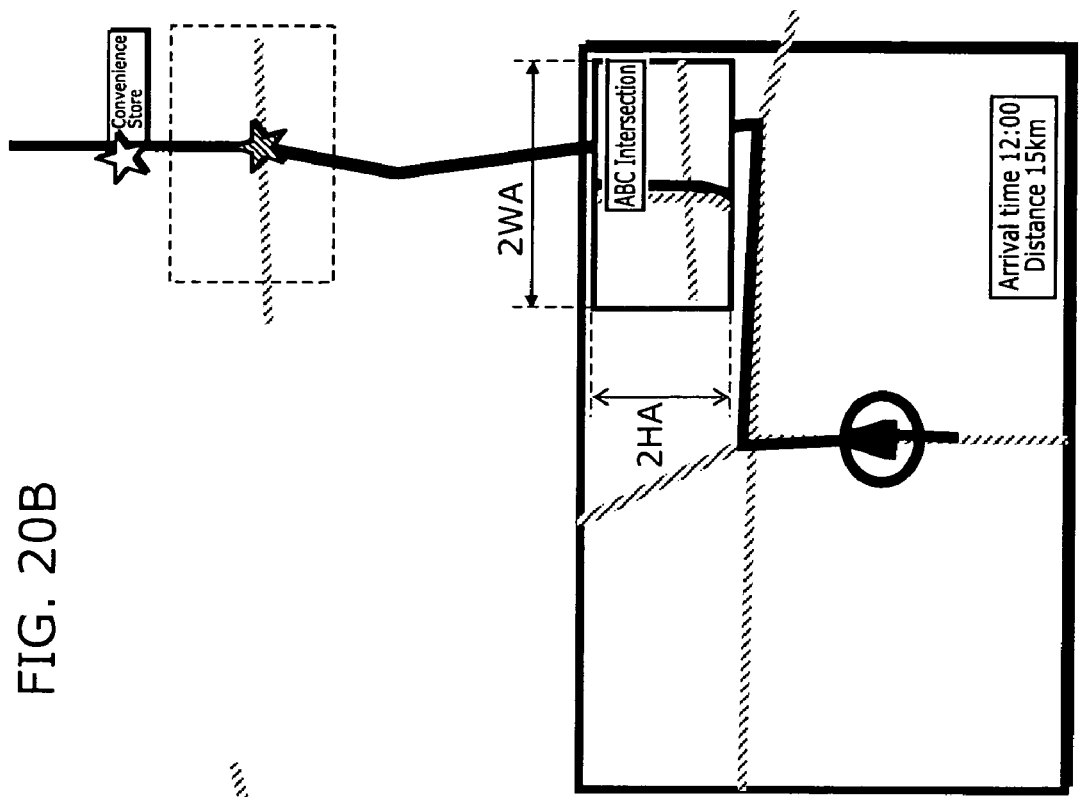
Figure 20B:
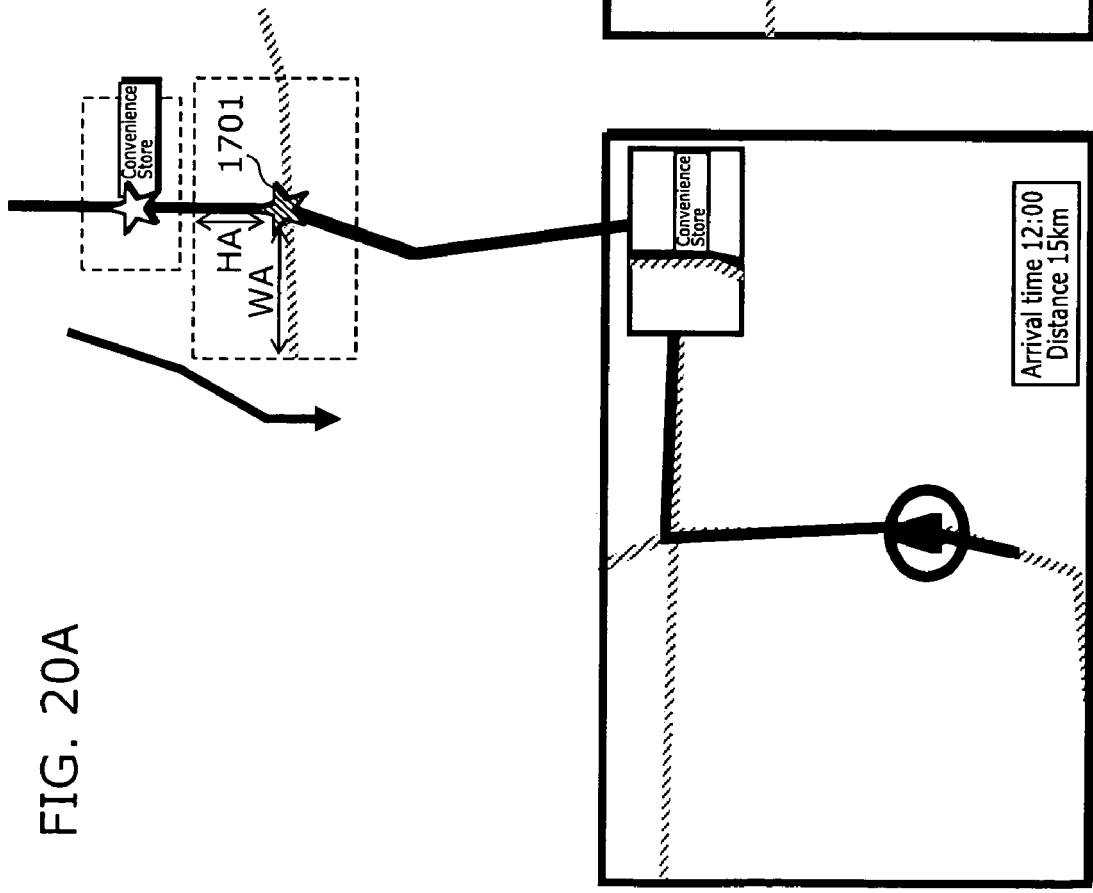
Figure 21:
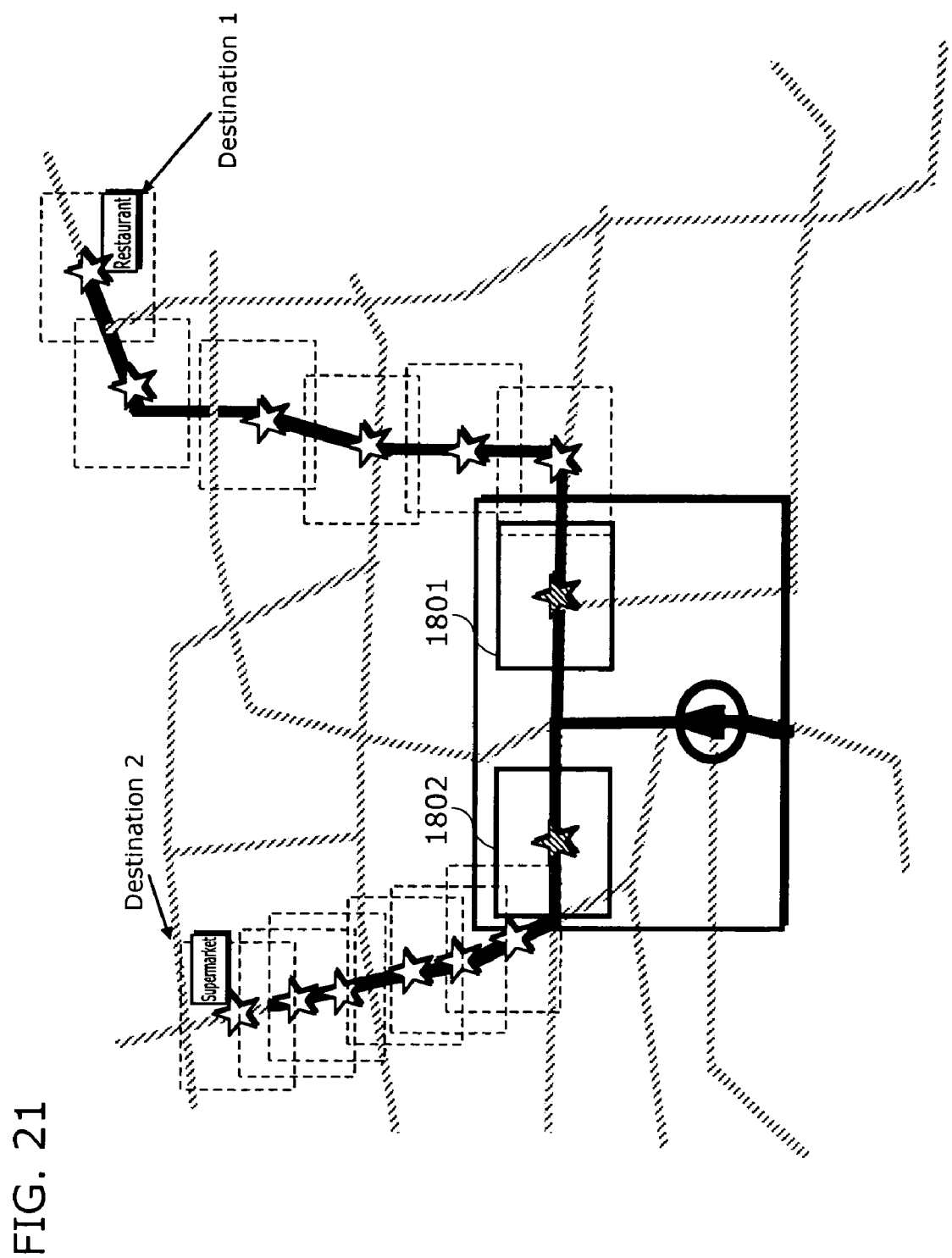
Figure 22B:
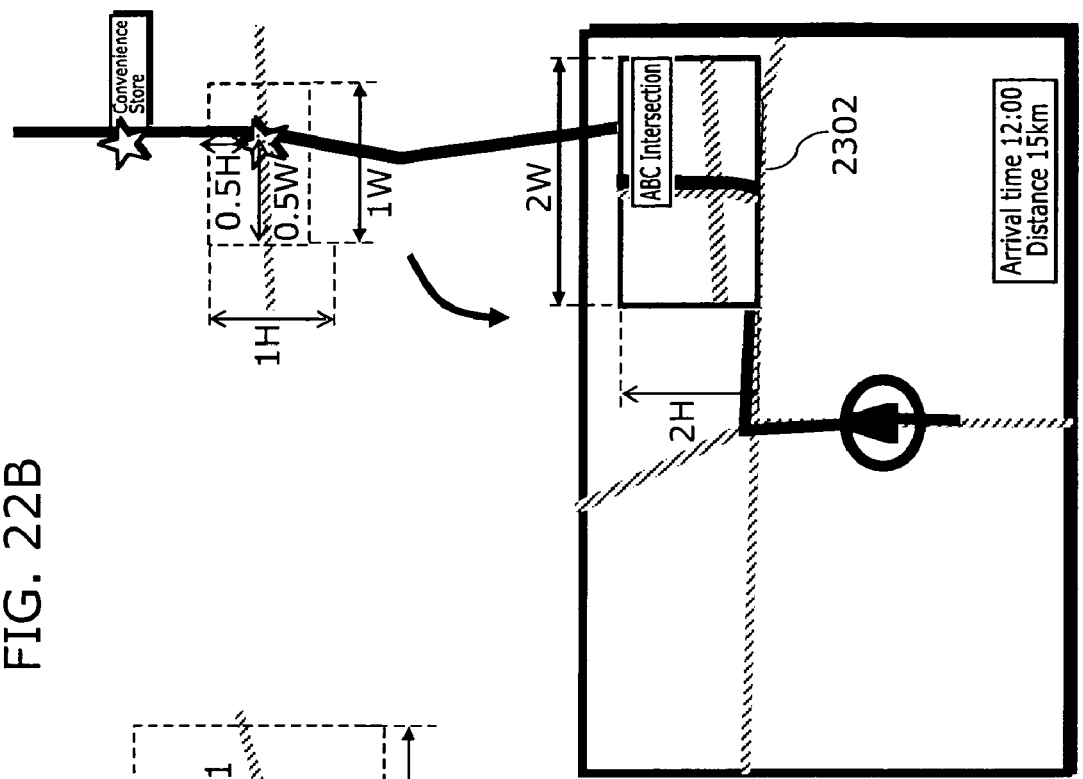
Figure 22A:
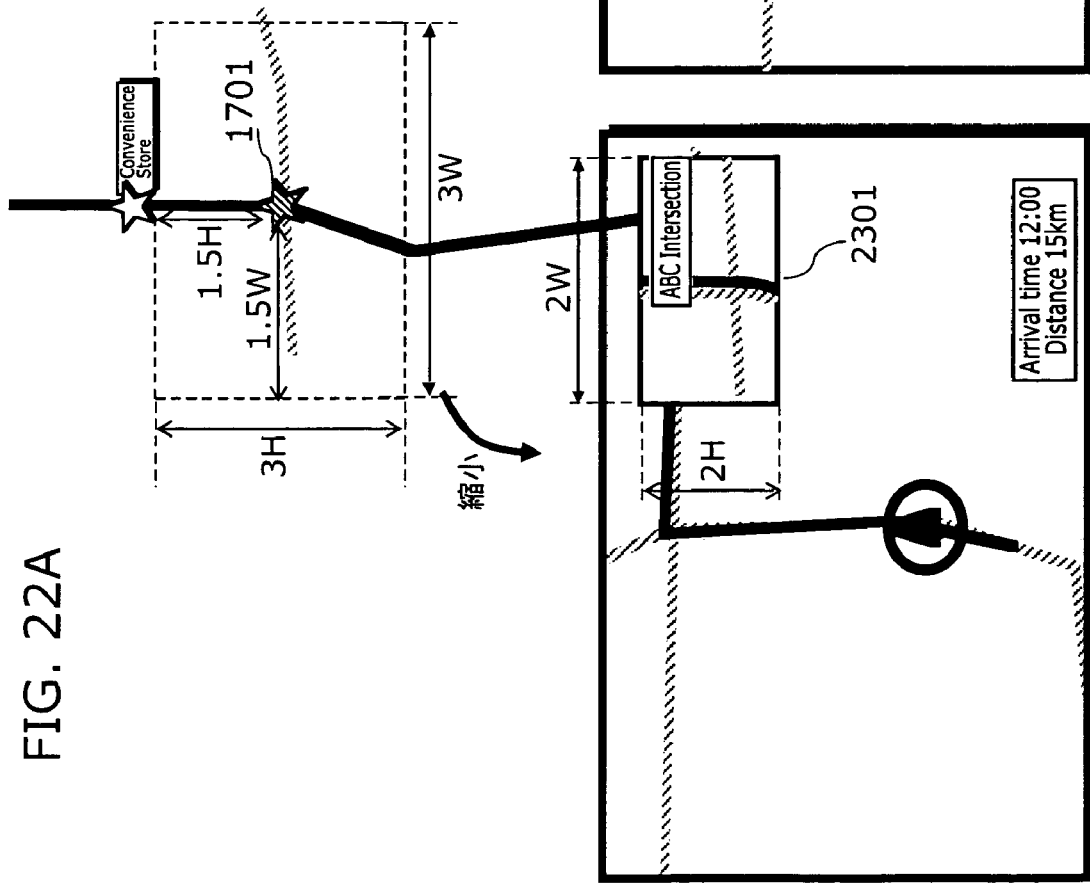
Figure 23:
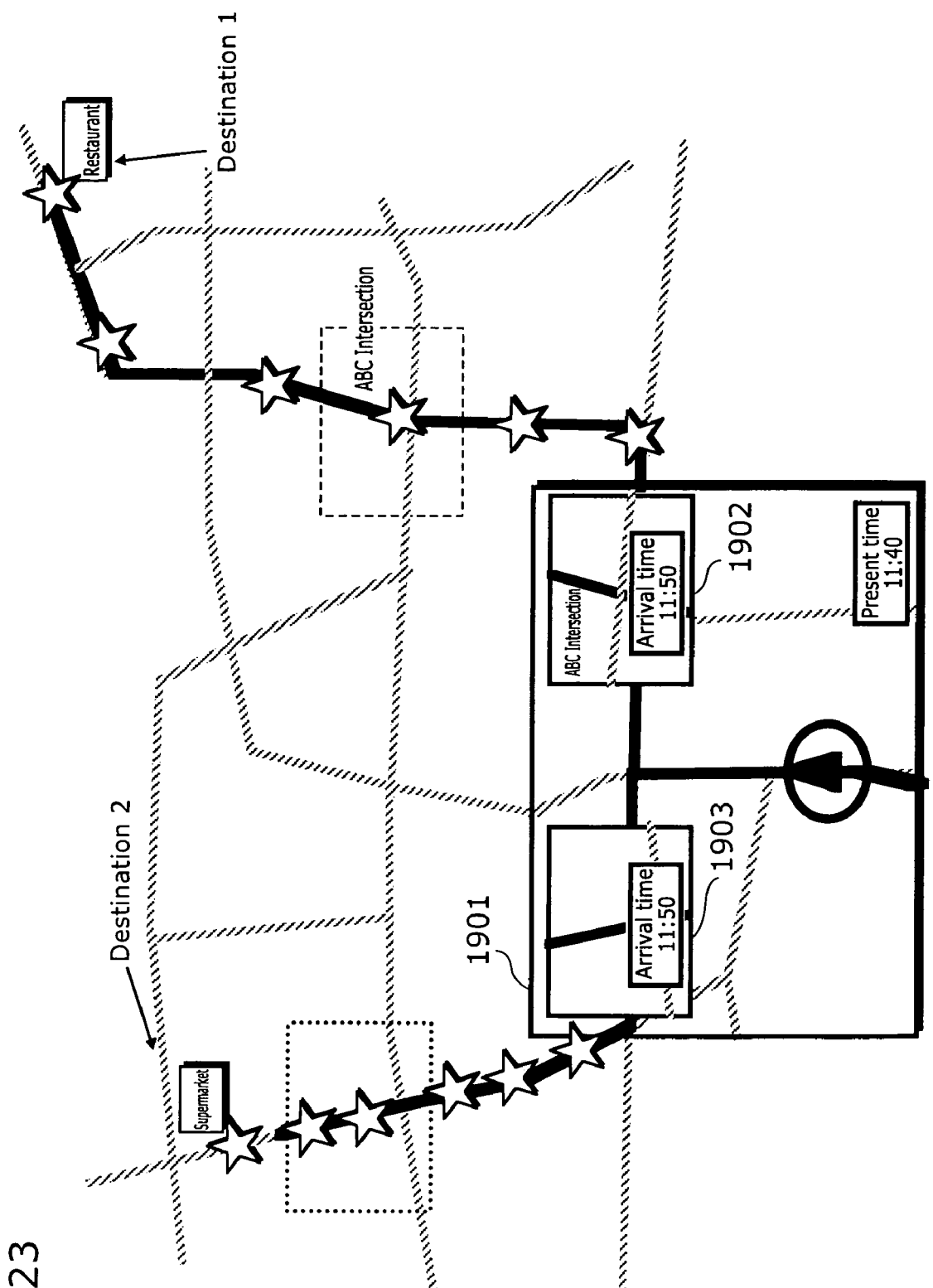
Figure 24:
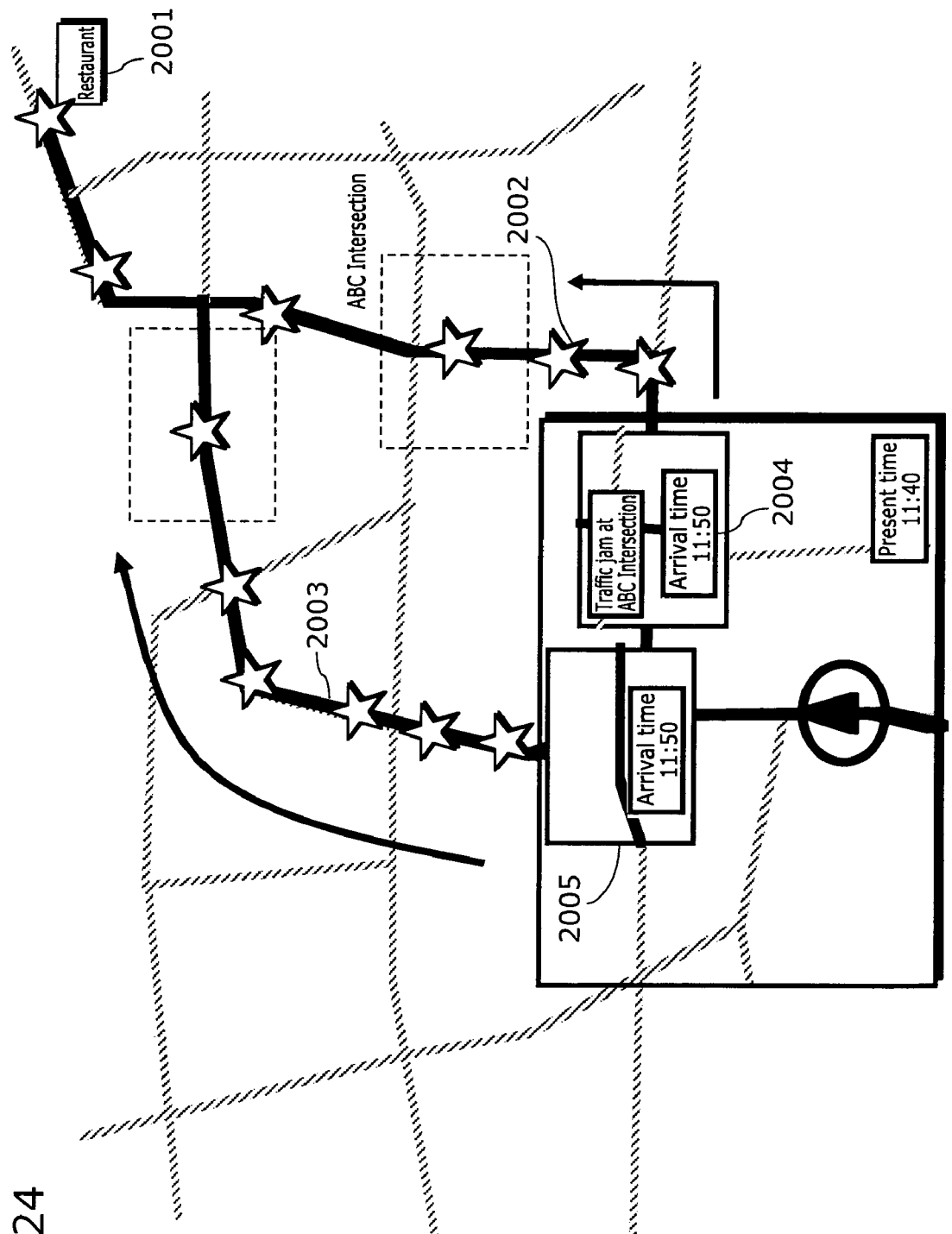
Figure 25B:
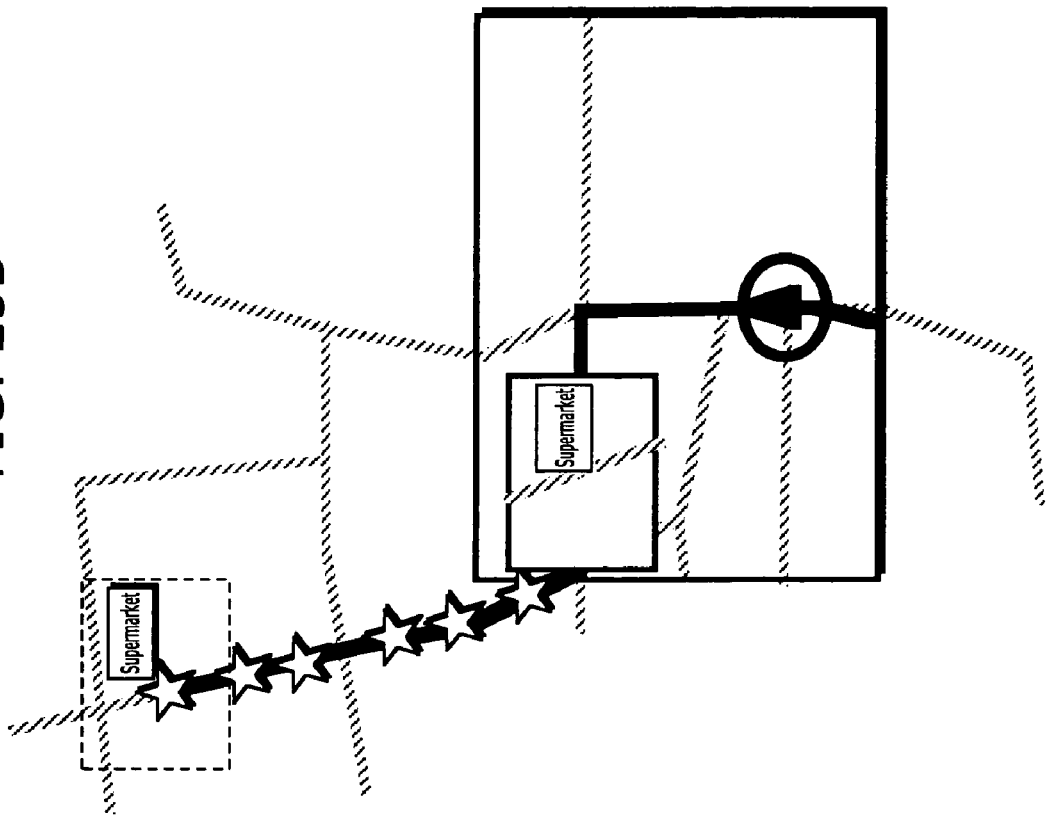
Figure 25A:
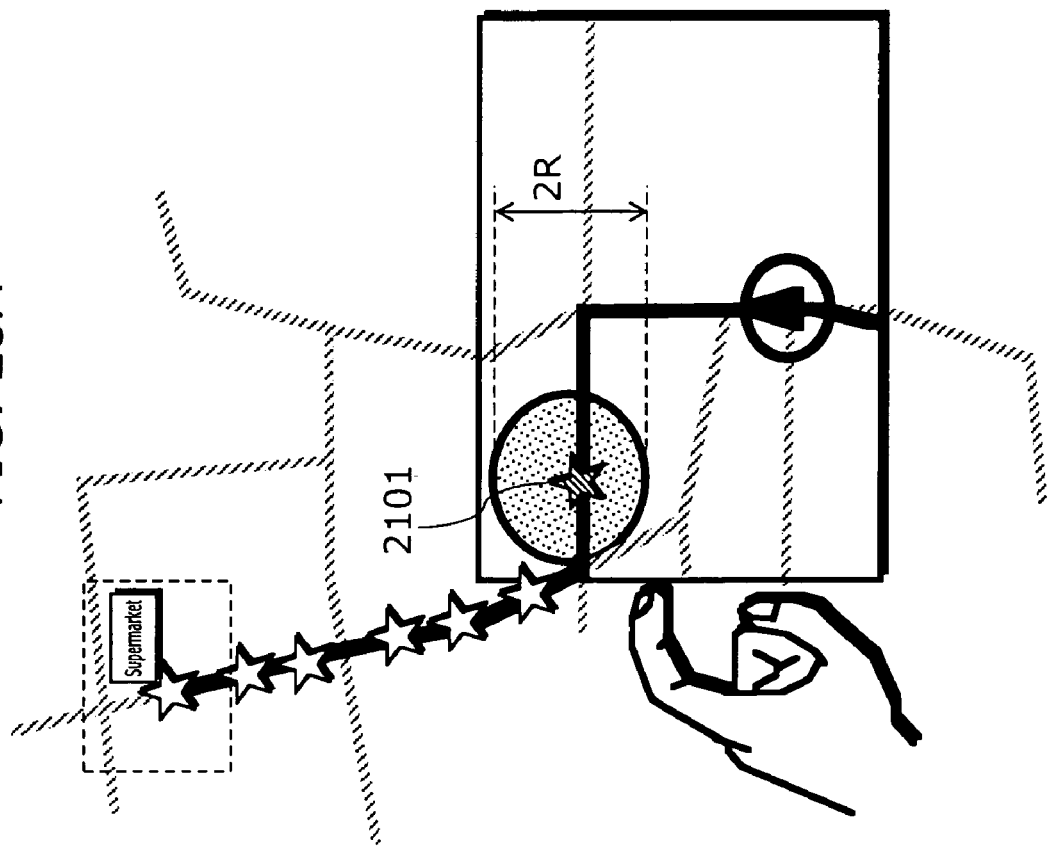
Figure 26:
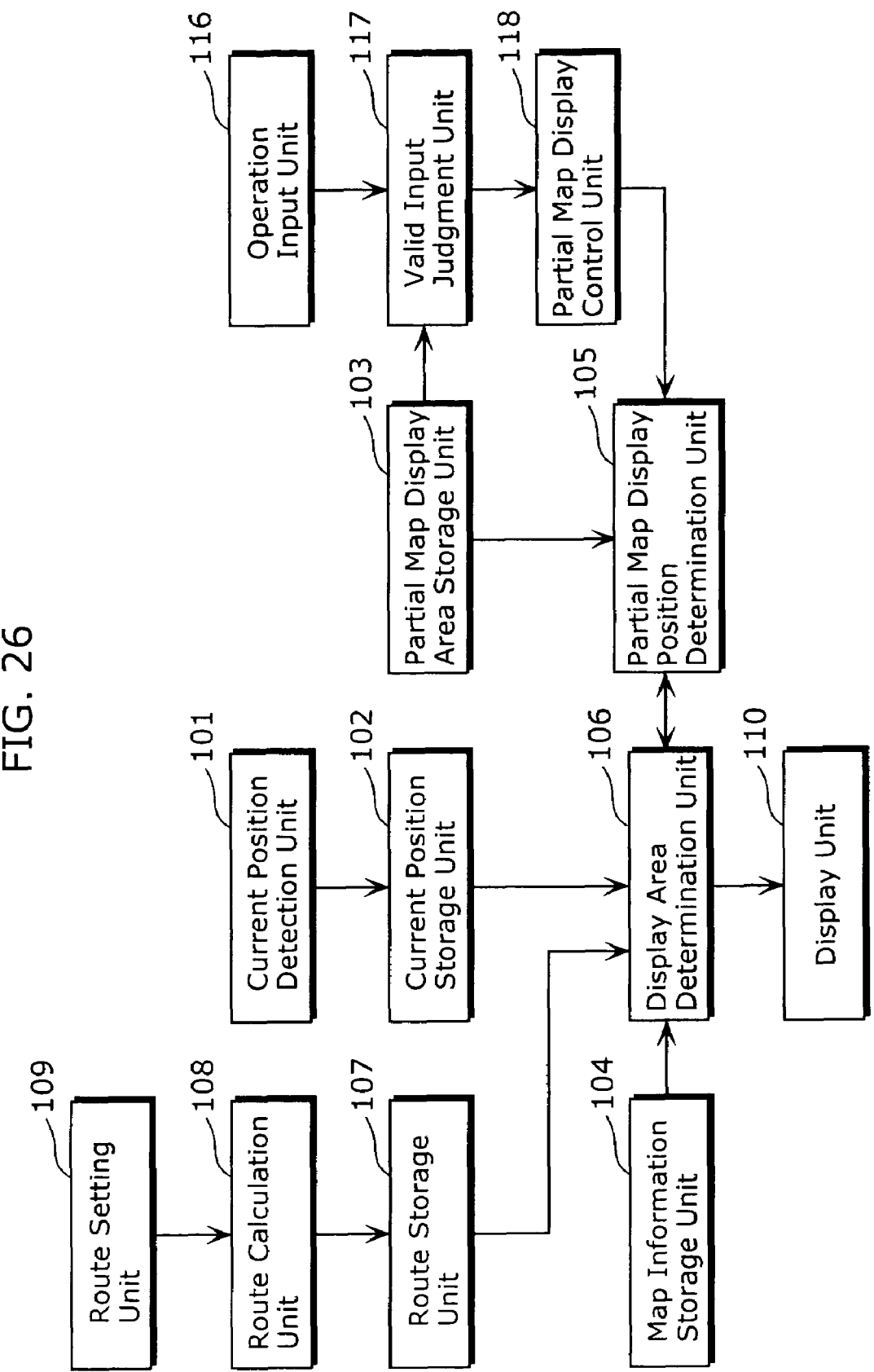
Figure 27A:
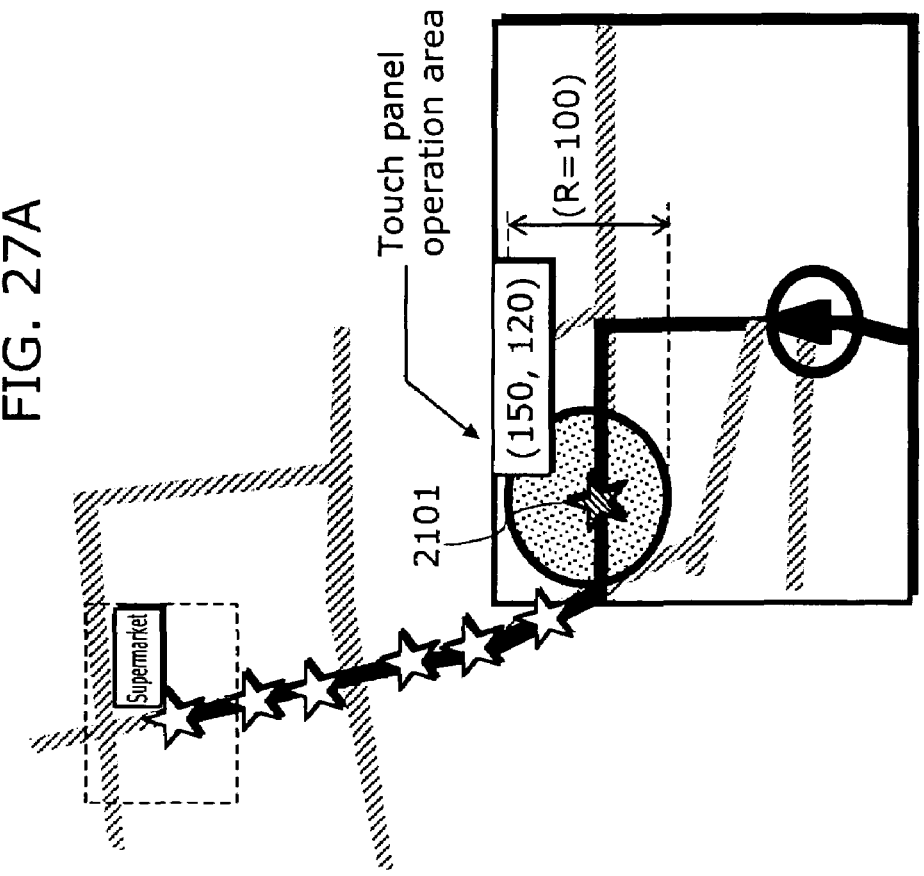
Figure 27B:
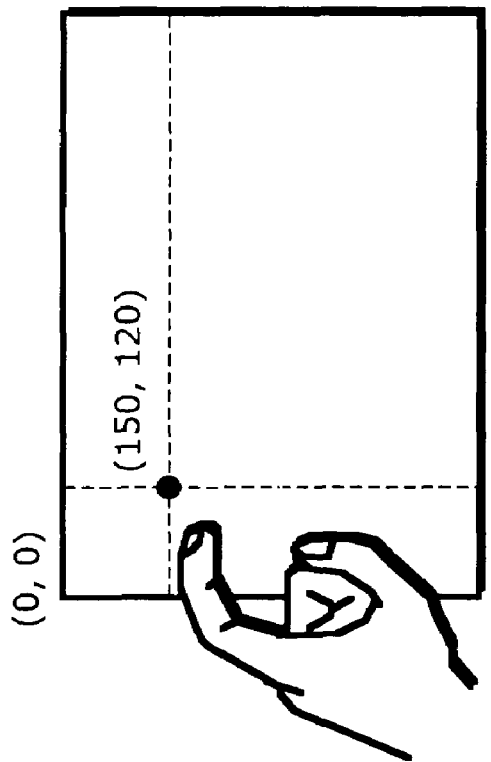
Figure 28A:
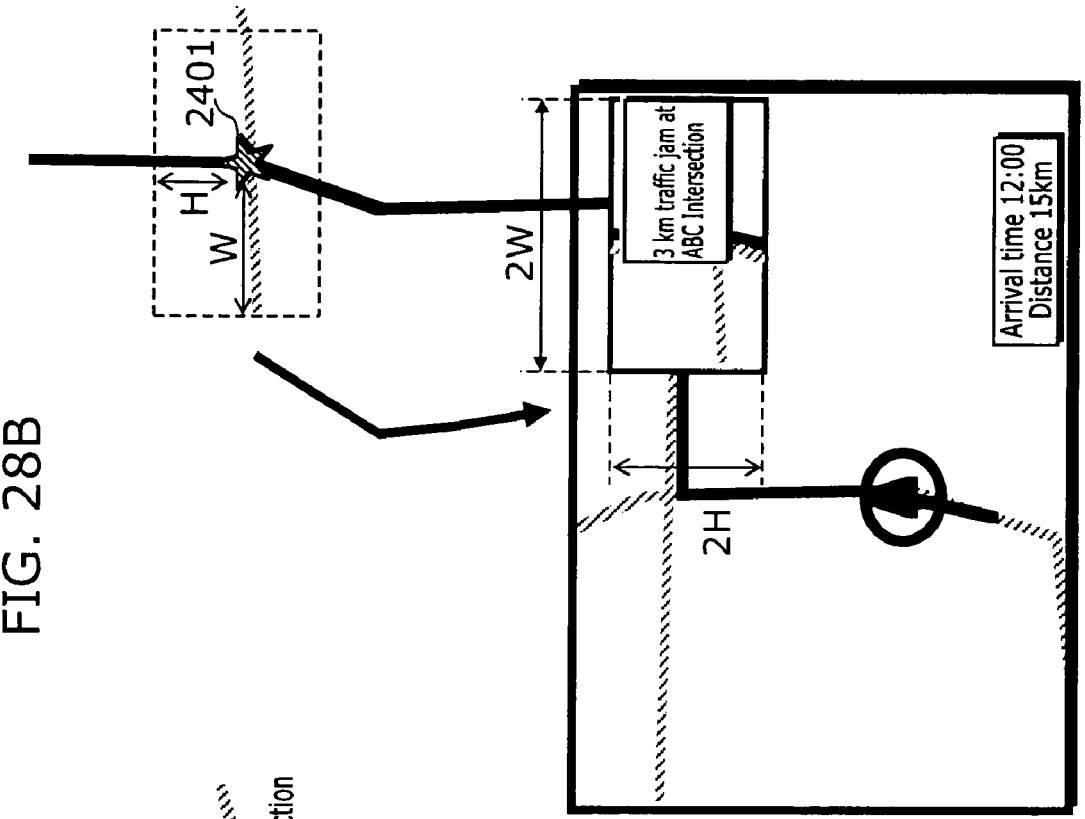
Figure 28B:
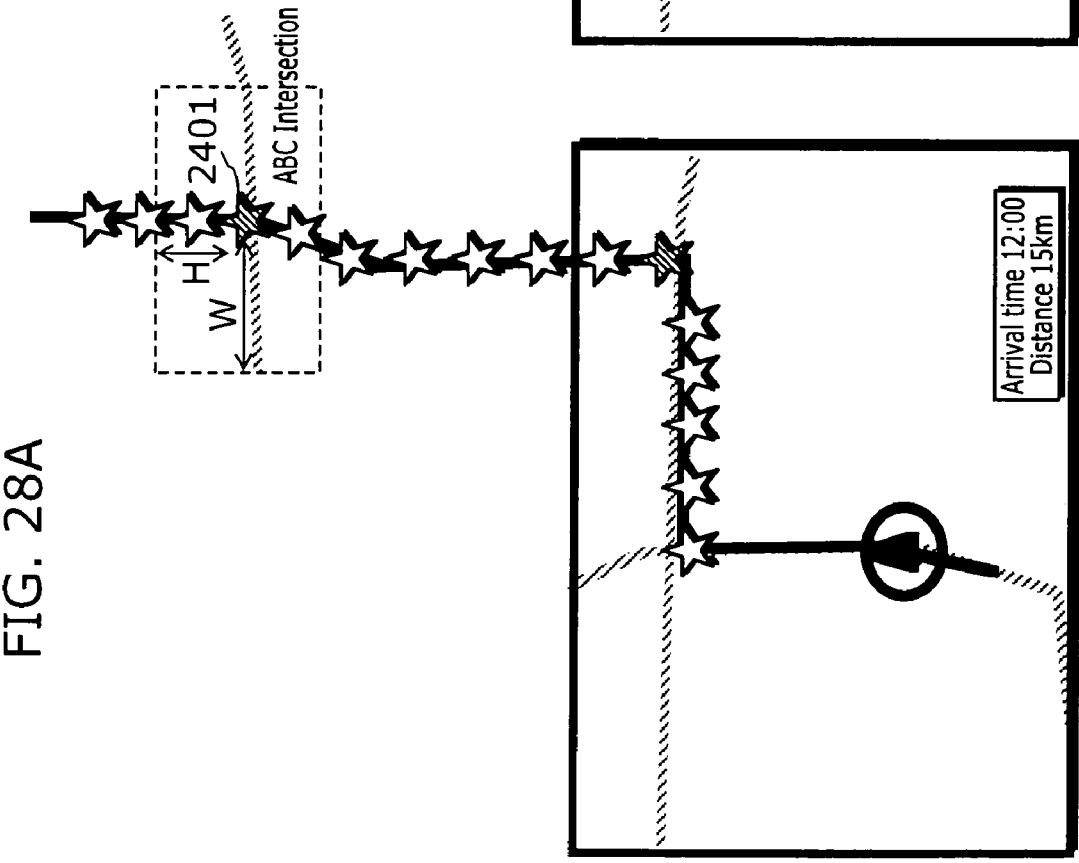
Figure 29:
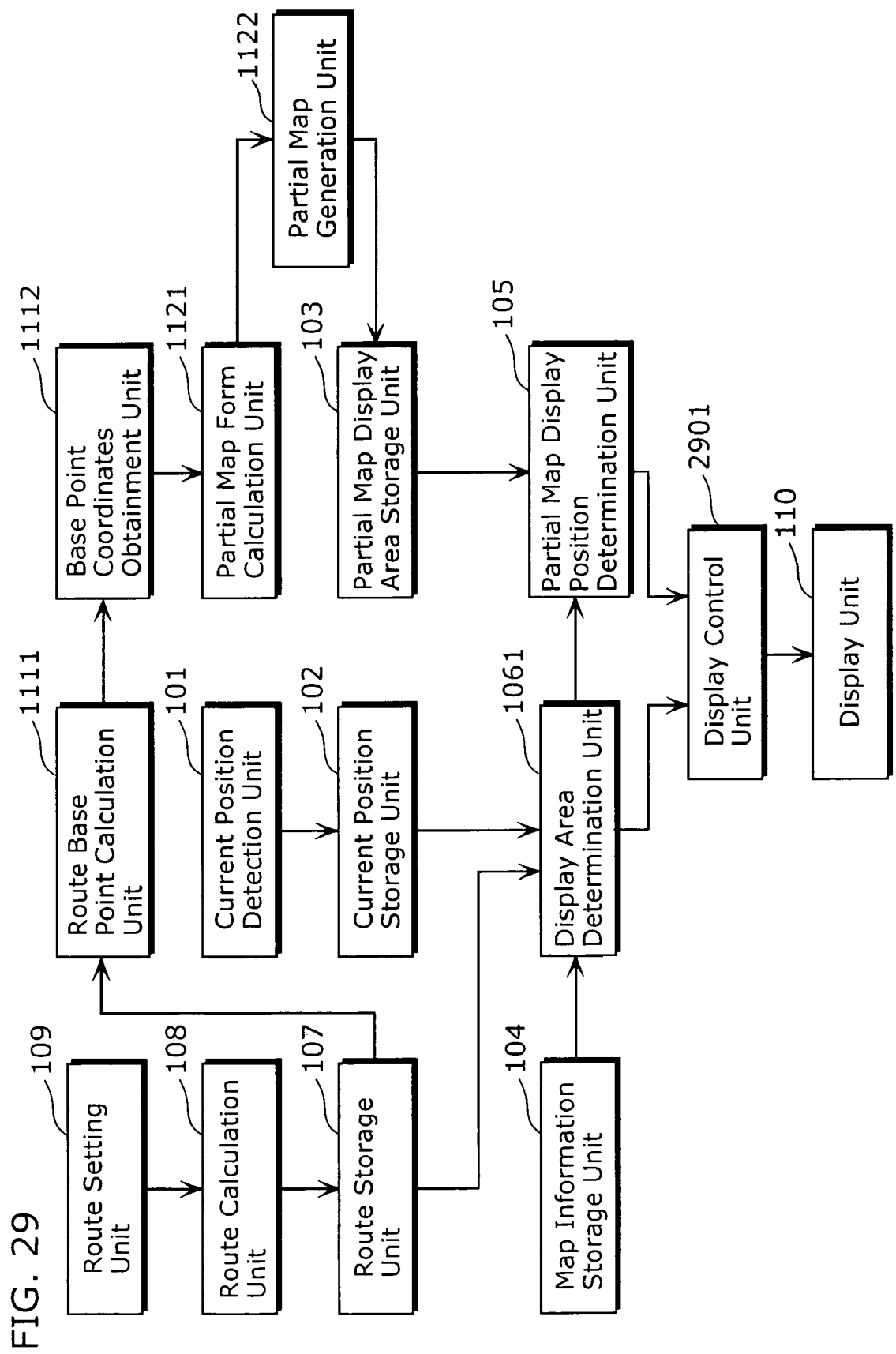
Figure 30:
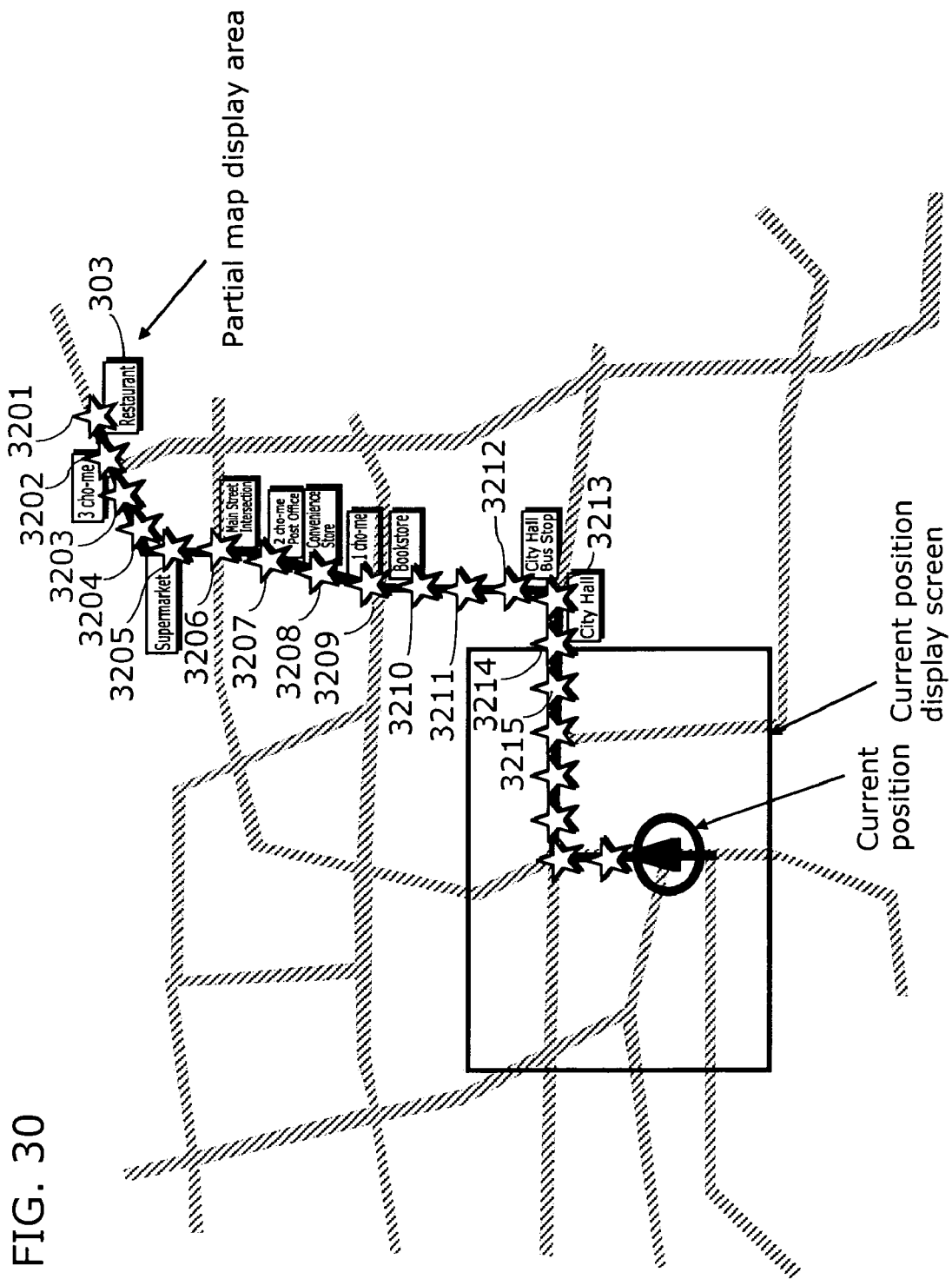
Figure 31:
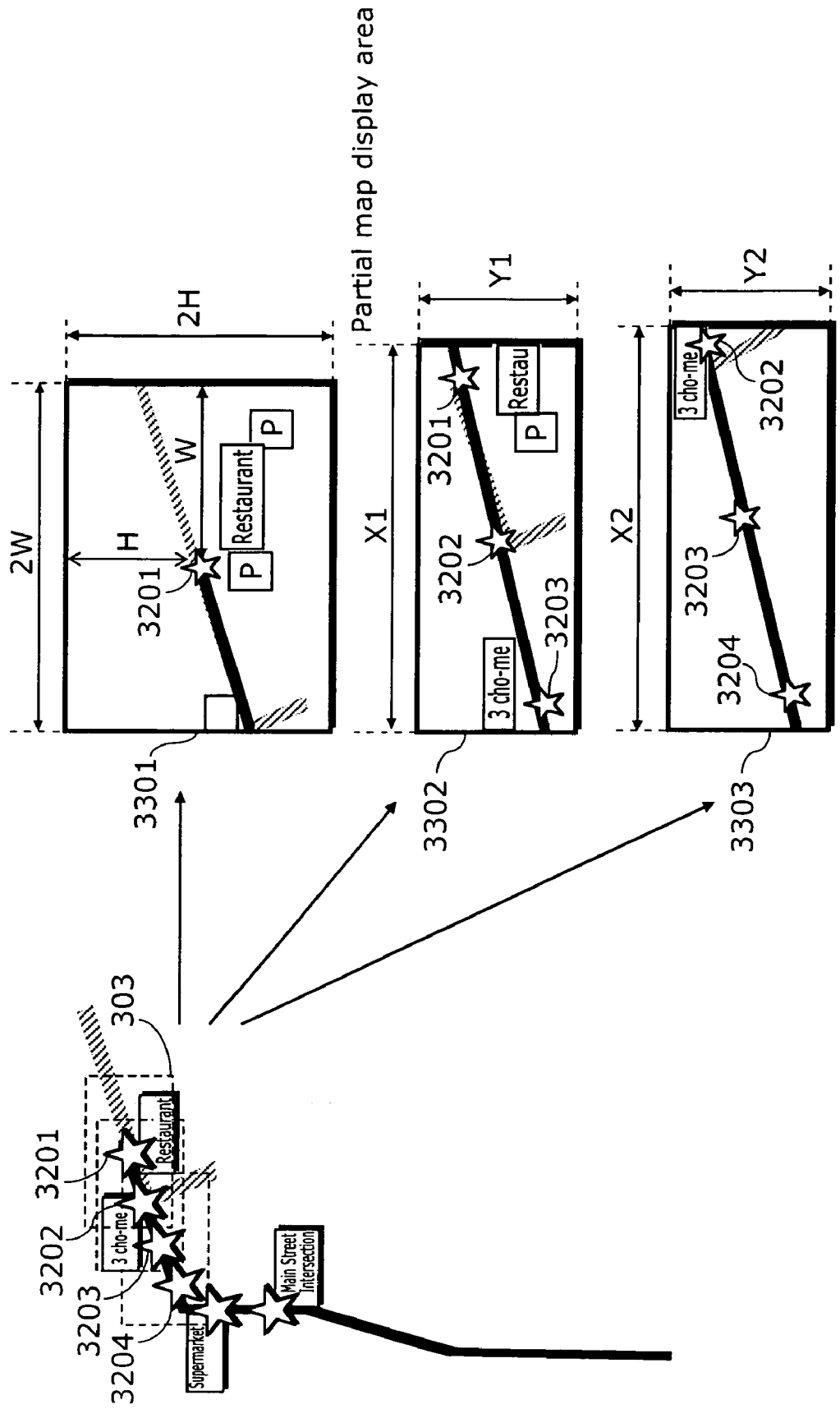
Figure 32:
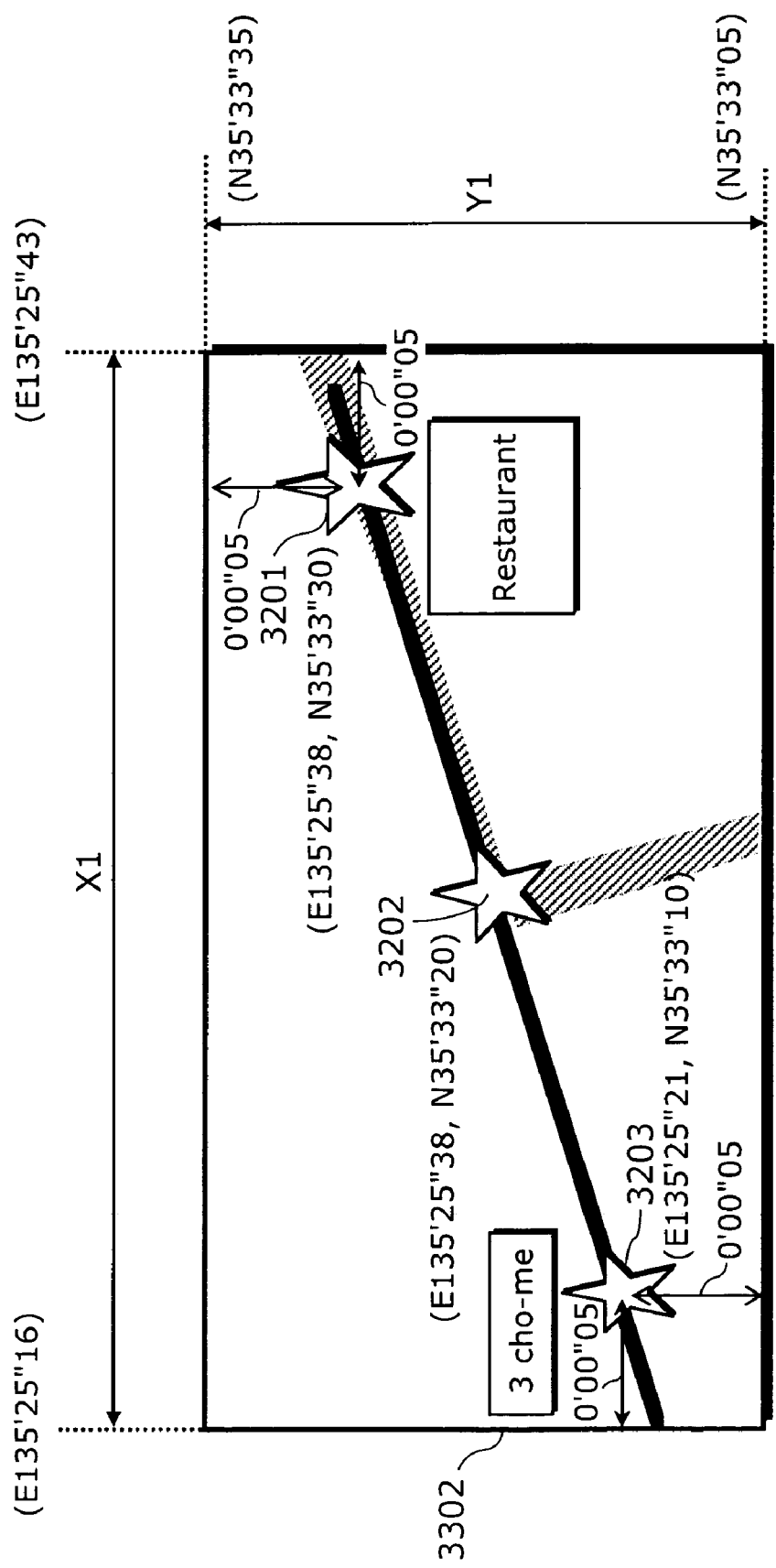
Figure 33:
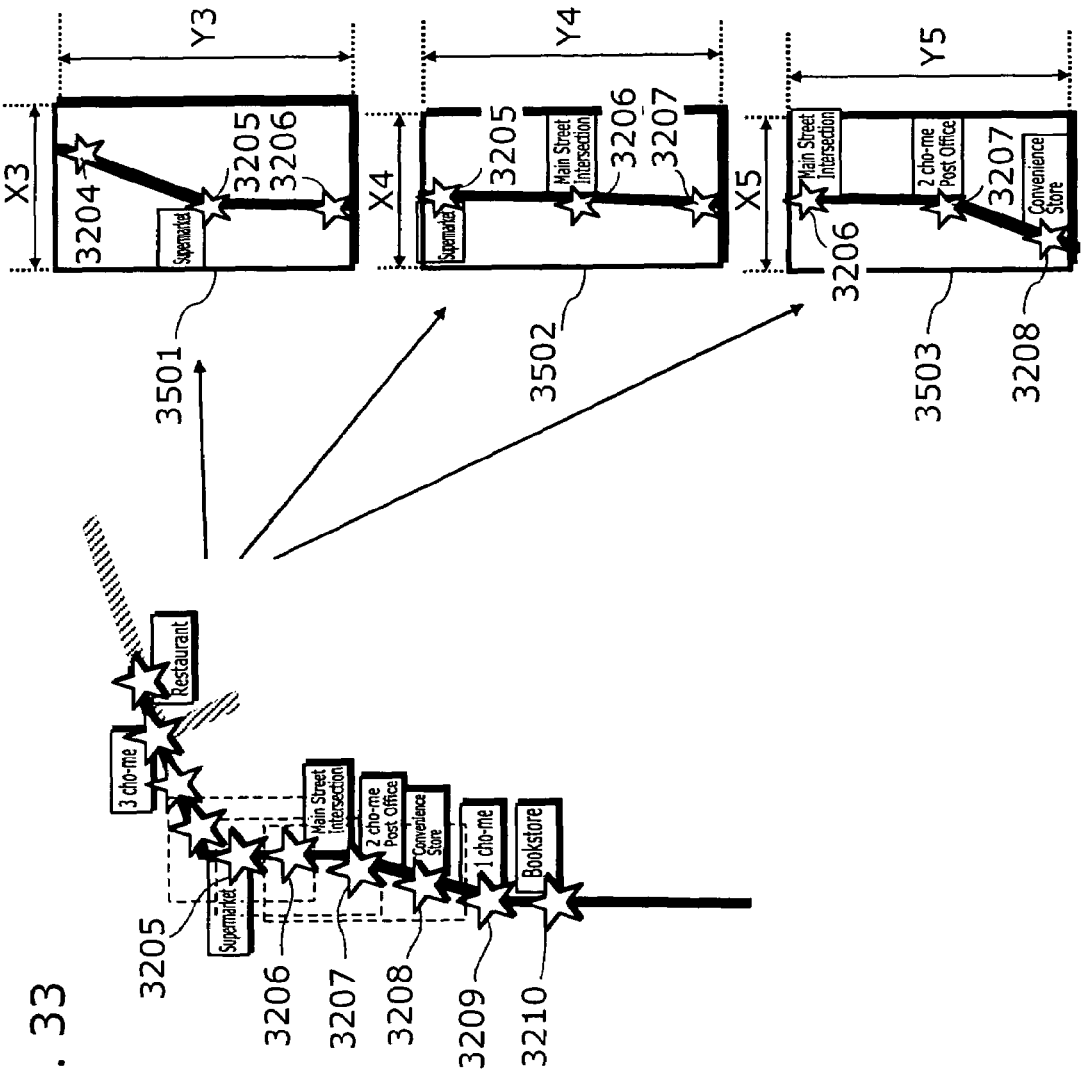
Figure 34:
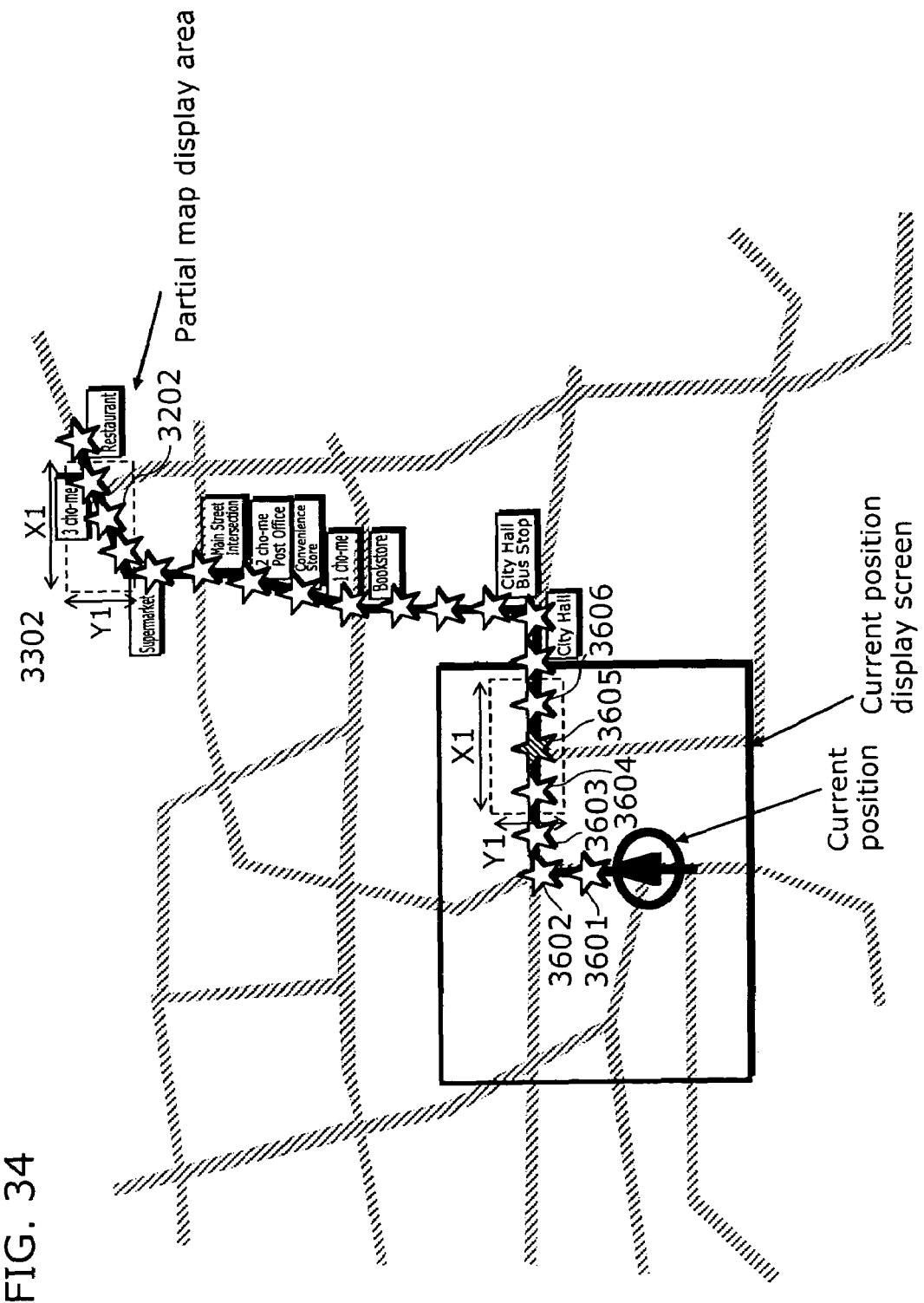
Figure 35:
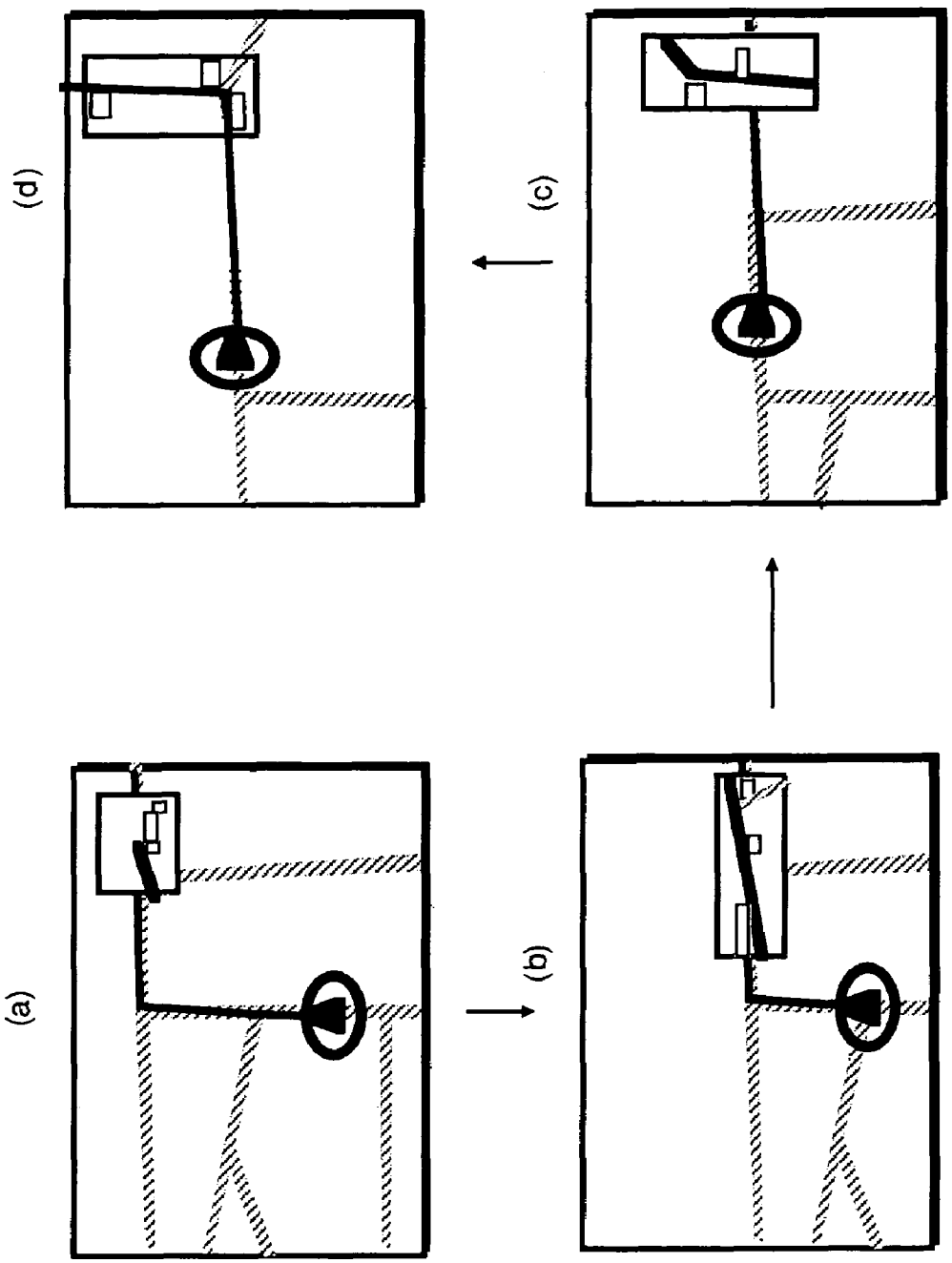
Figure 36:
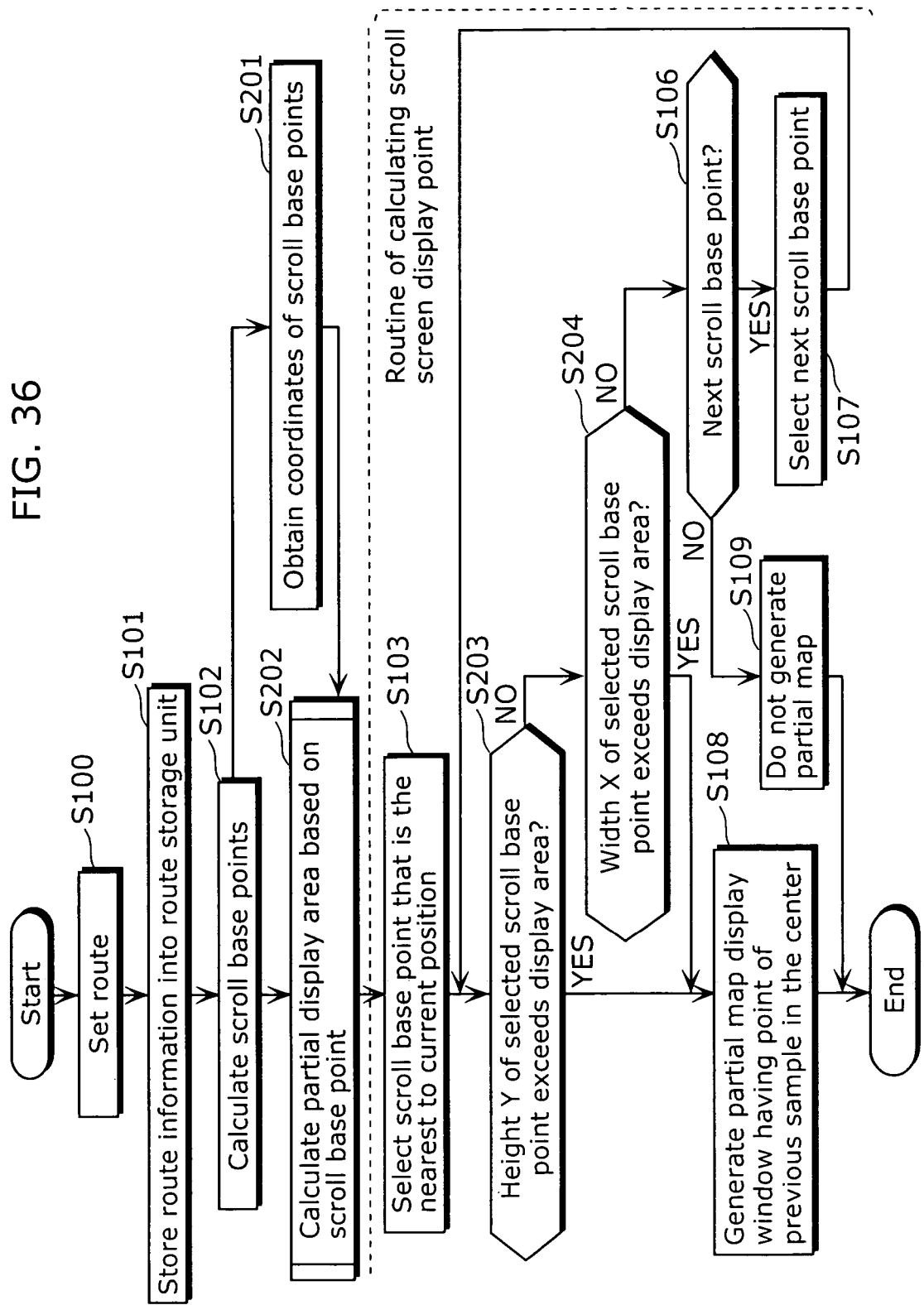
Figure 37:
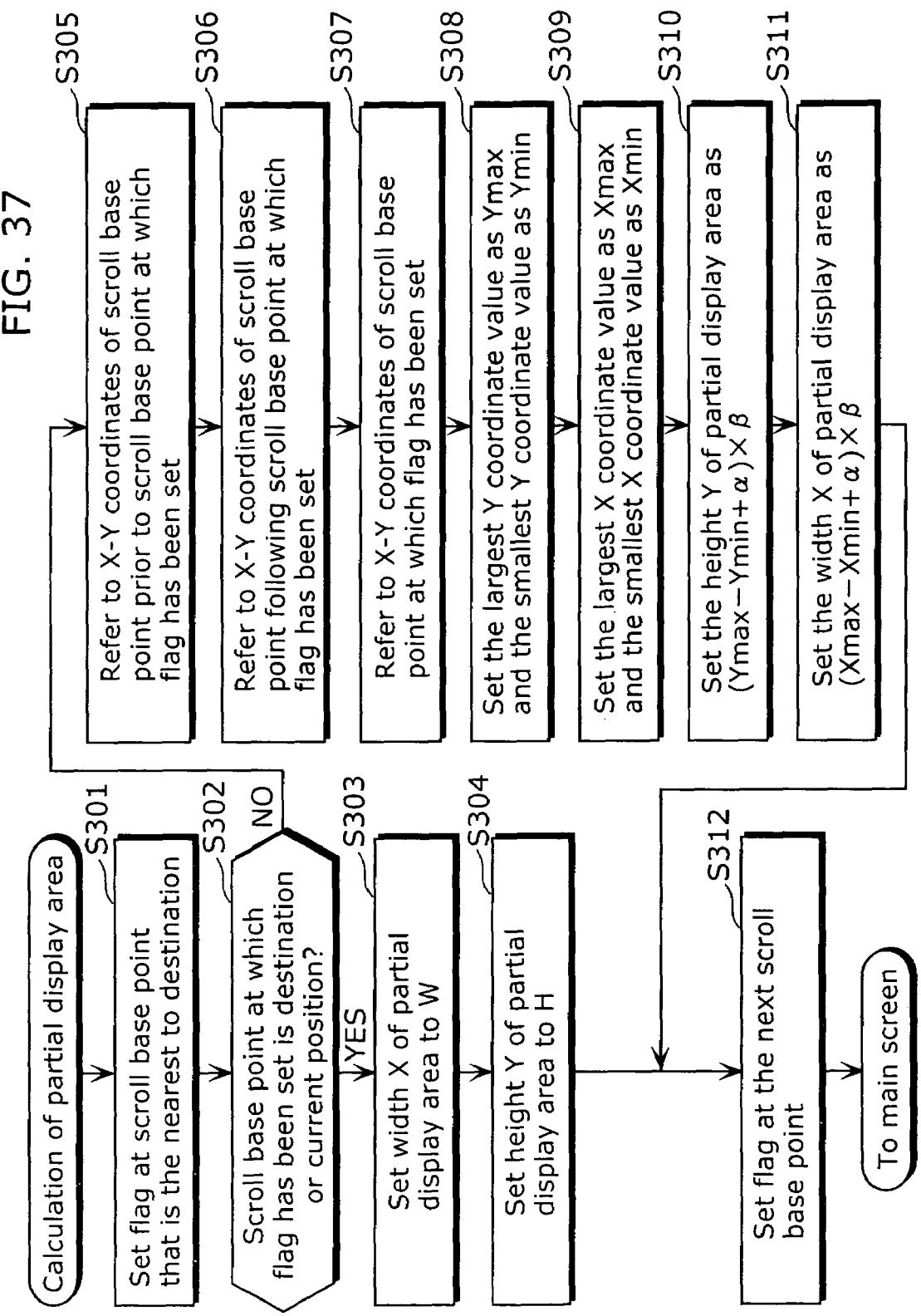
Figure 38:
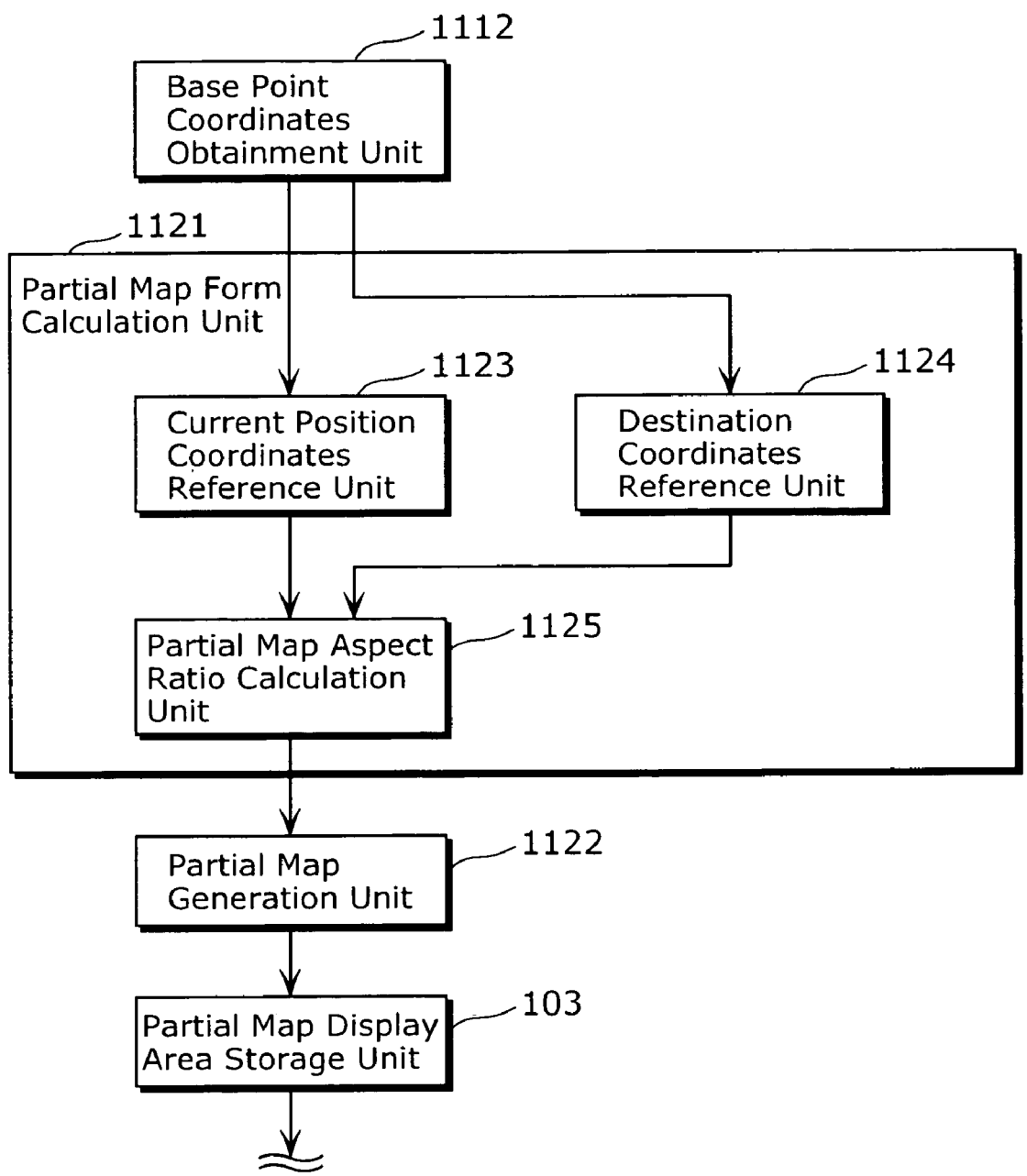
Figure 39:
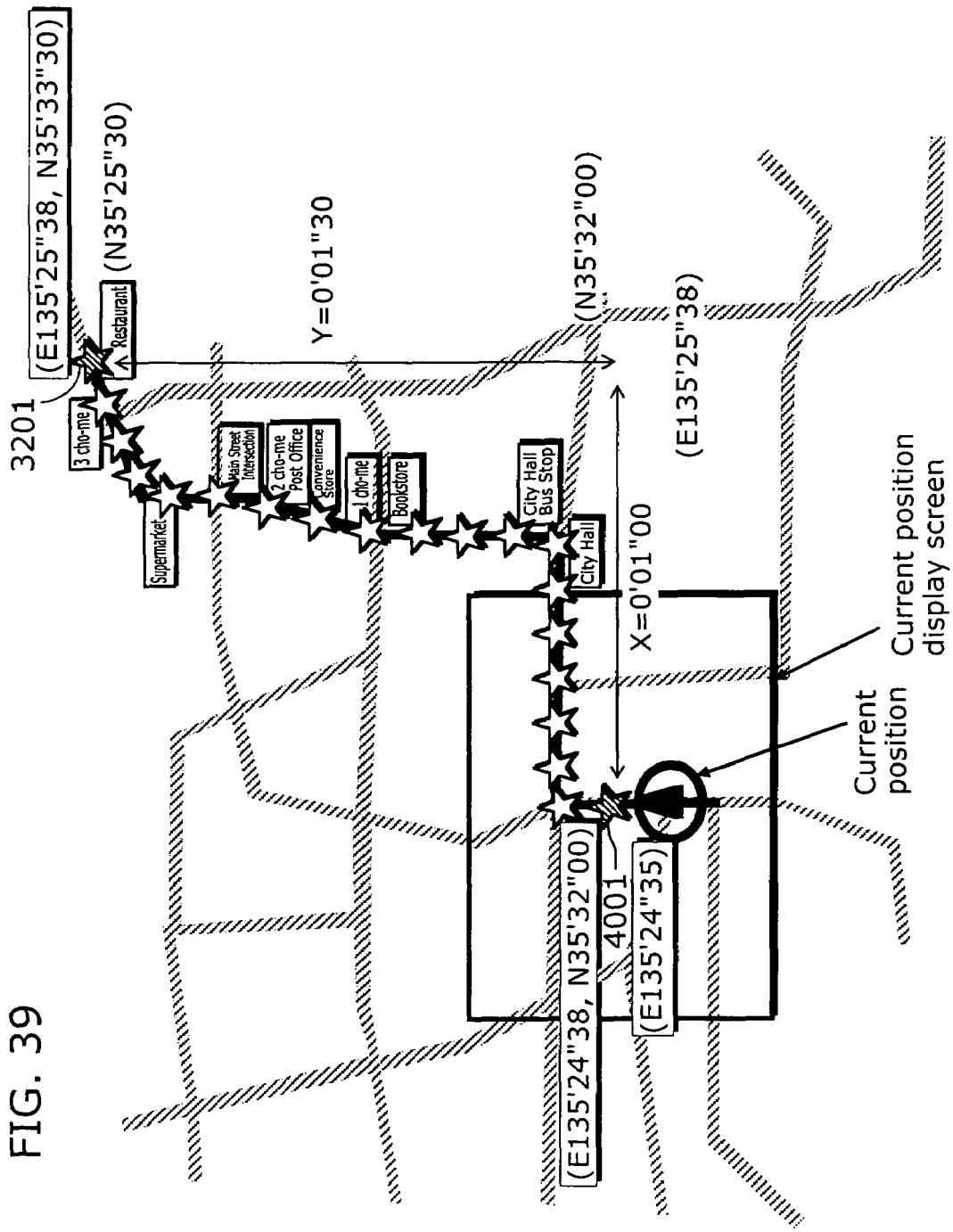
Figure 40:
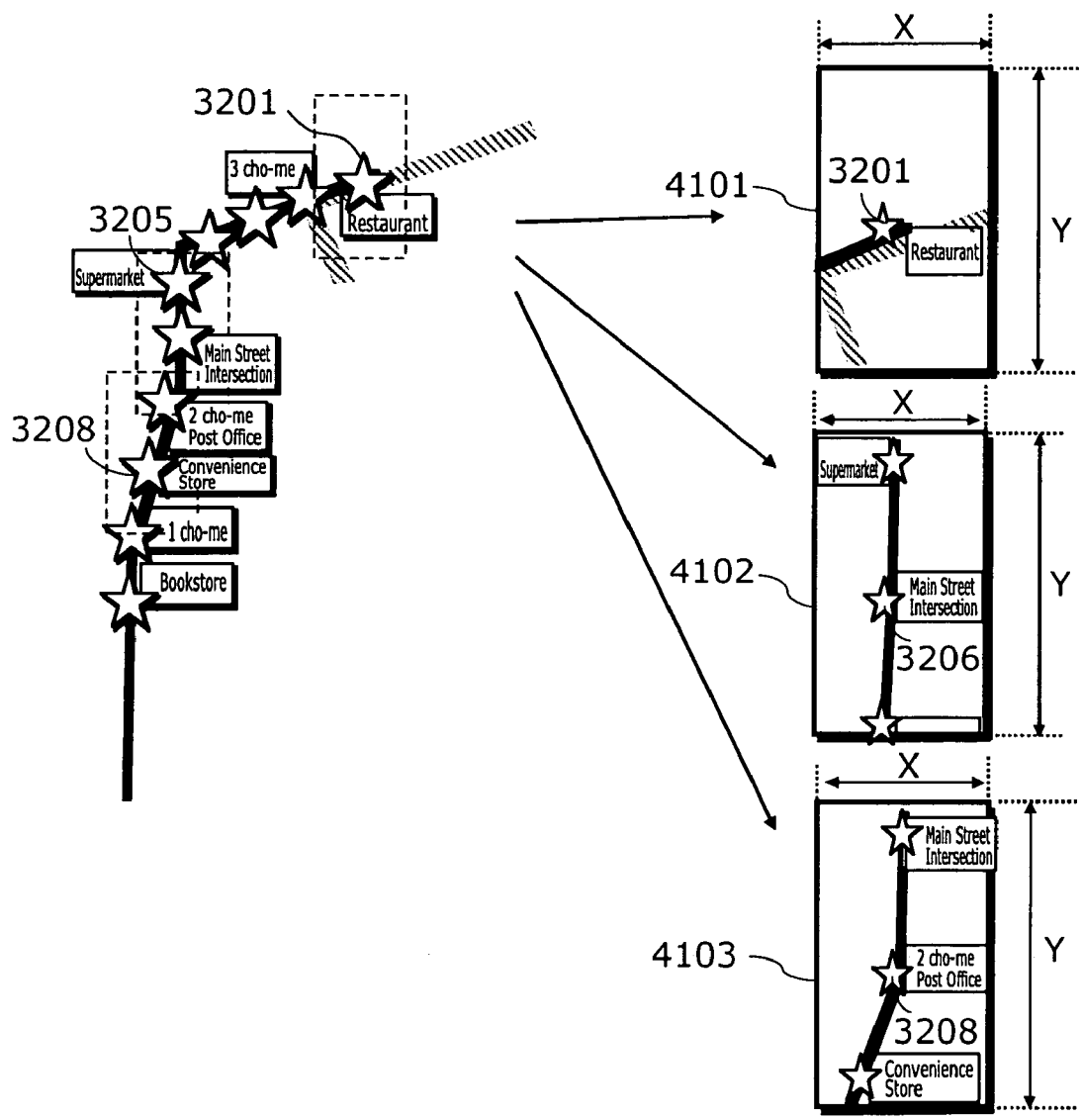
Figure 41:
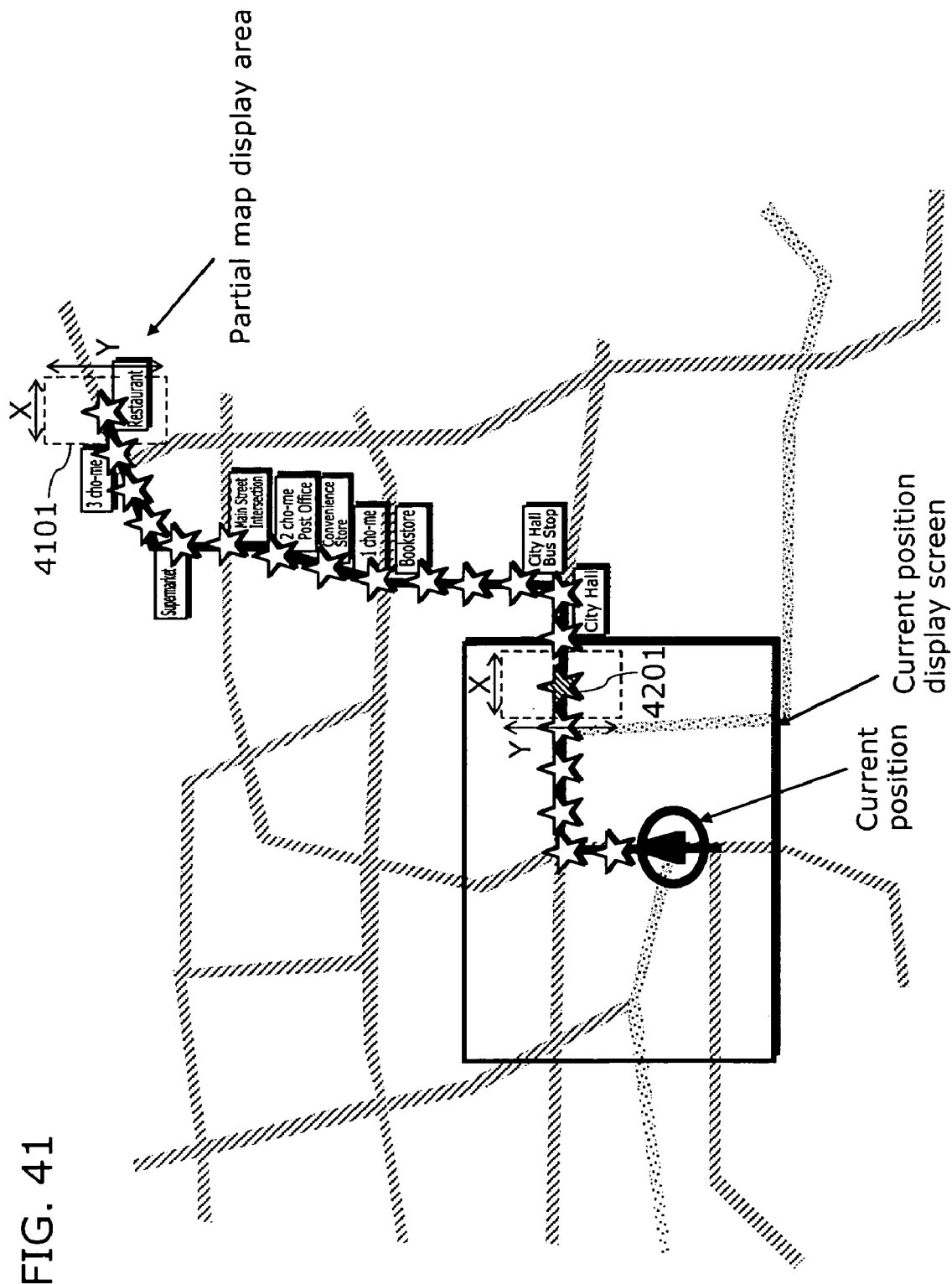
Figure 42:
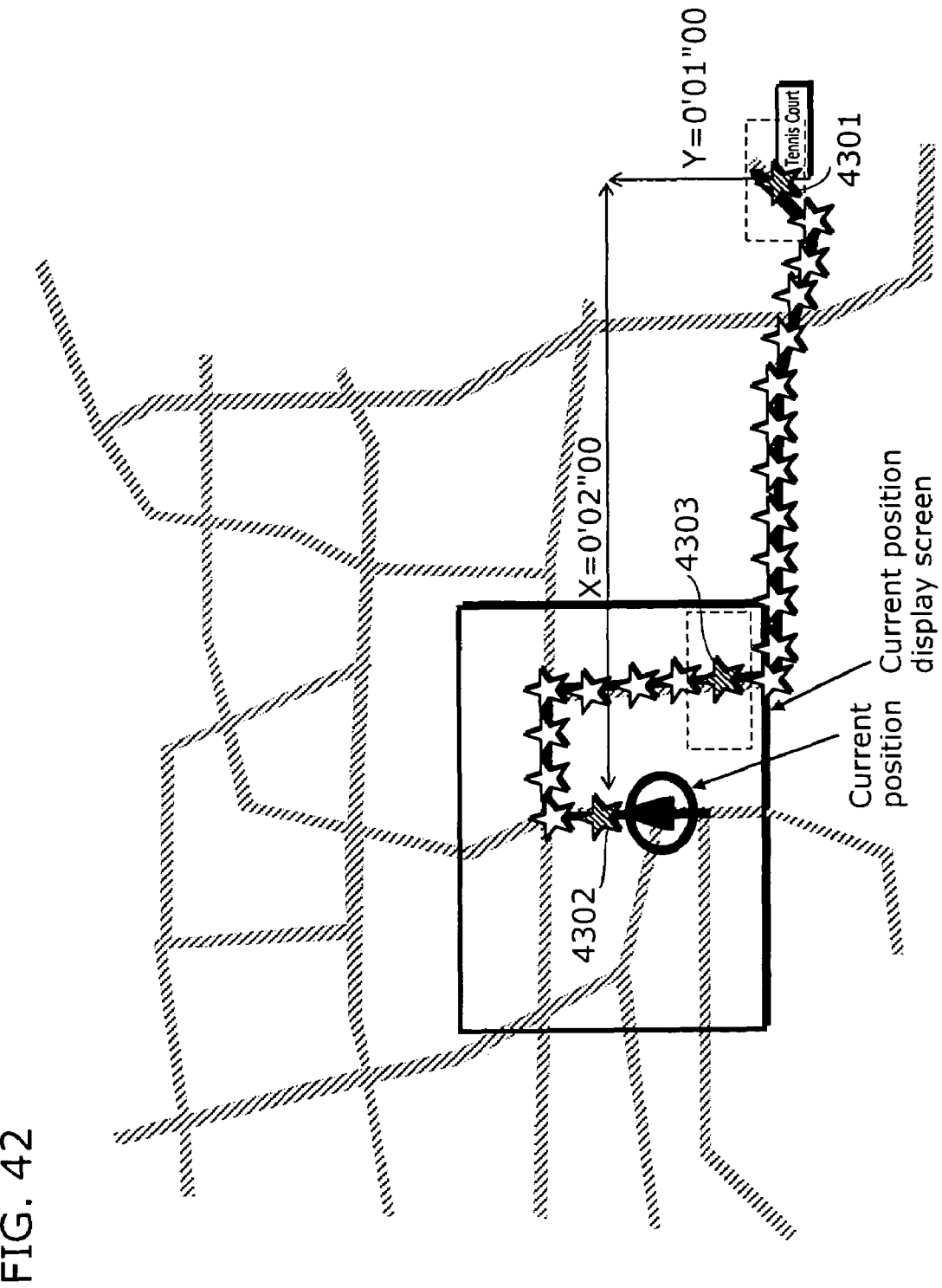
Figure 43:
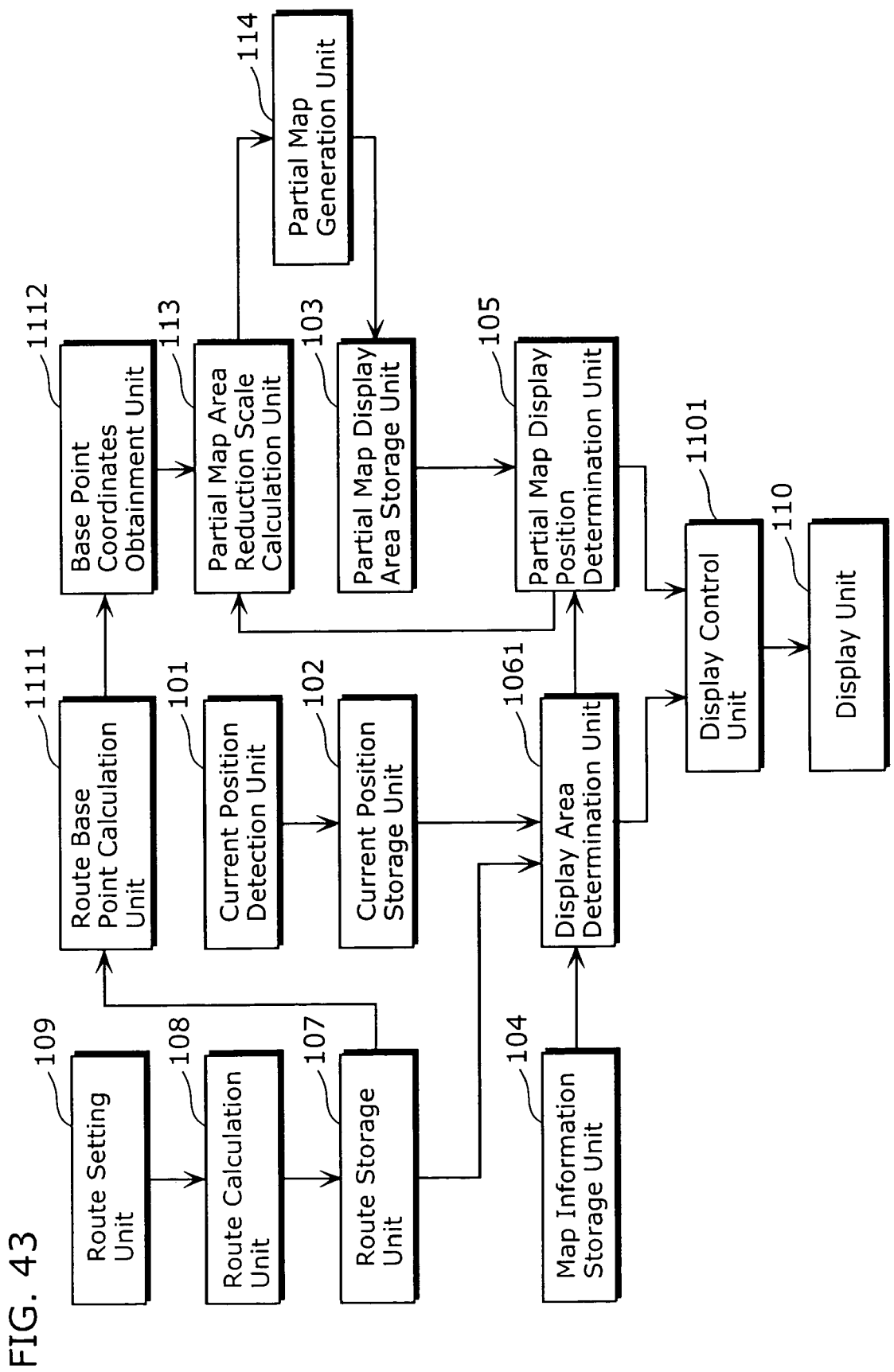
Figure 44:
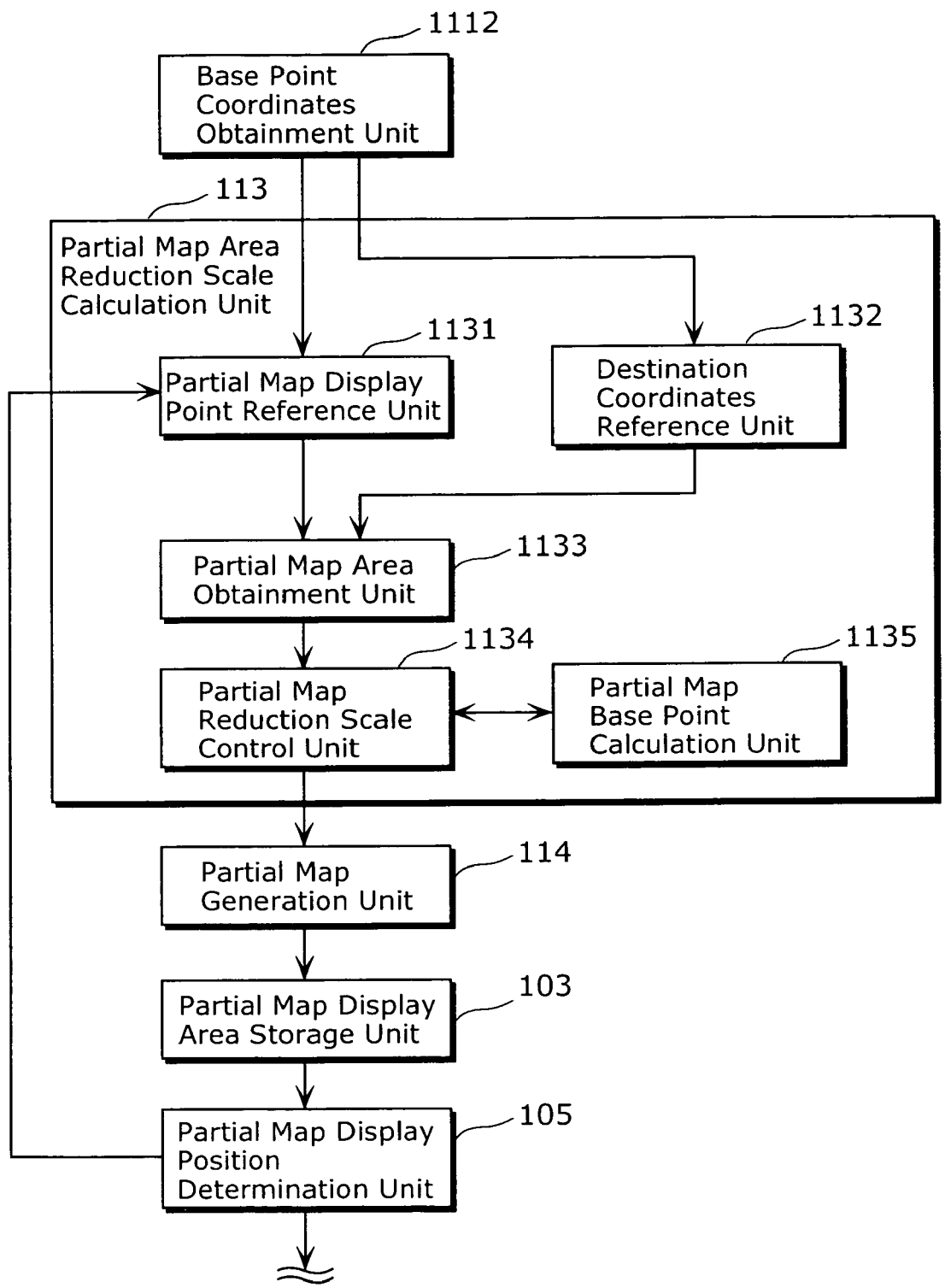
Figure 45:
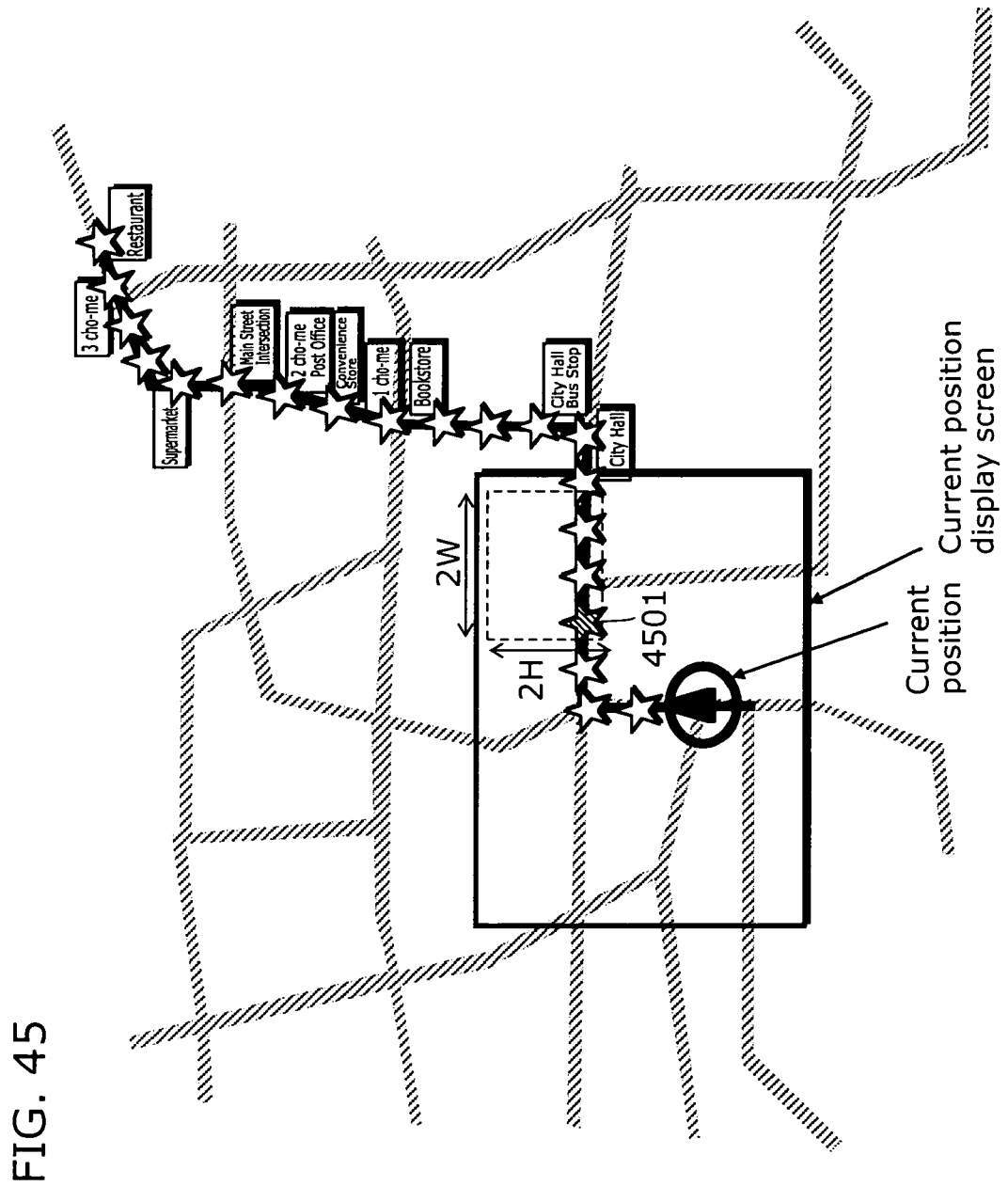
Figure 46:
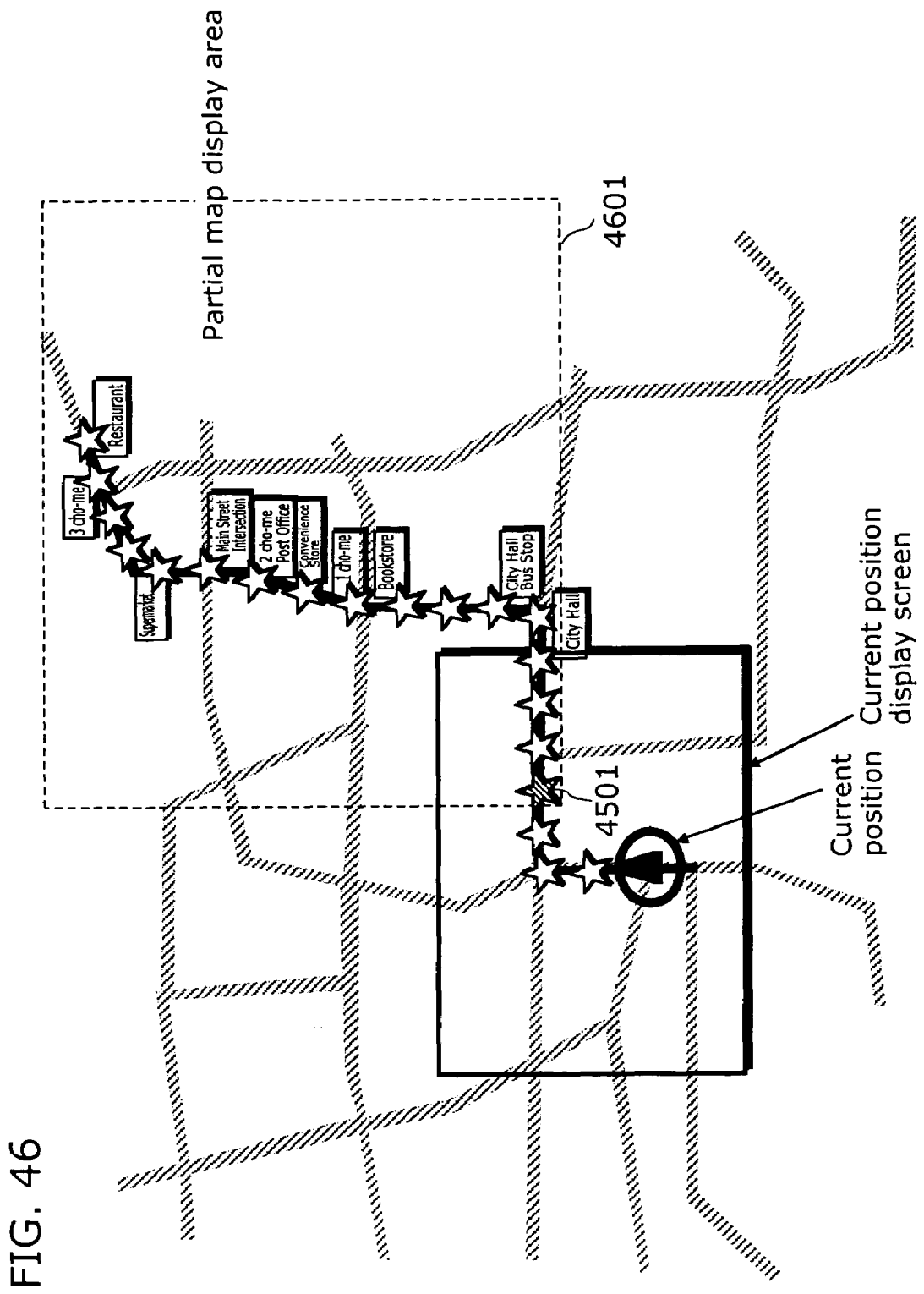
Figure 47:
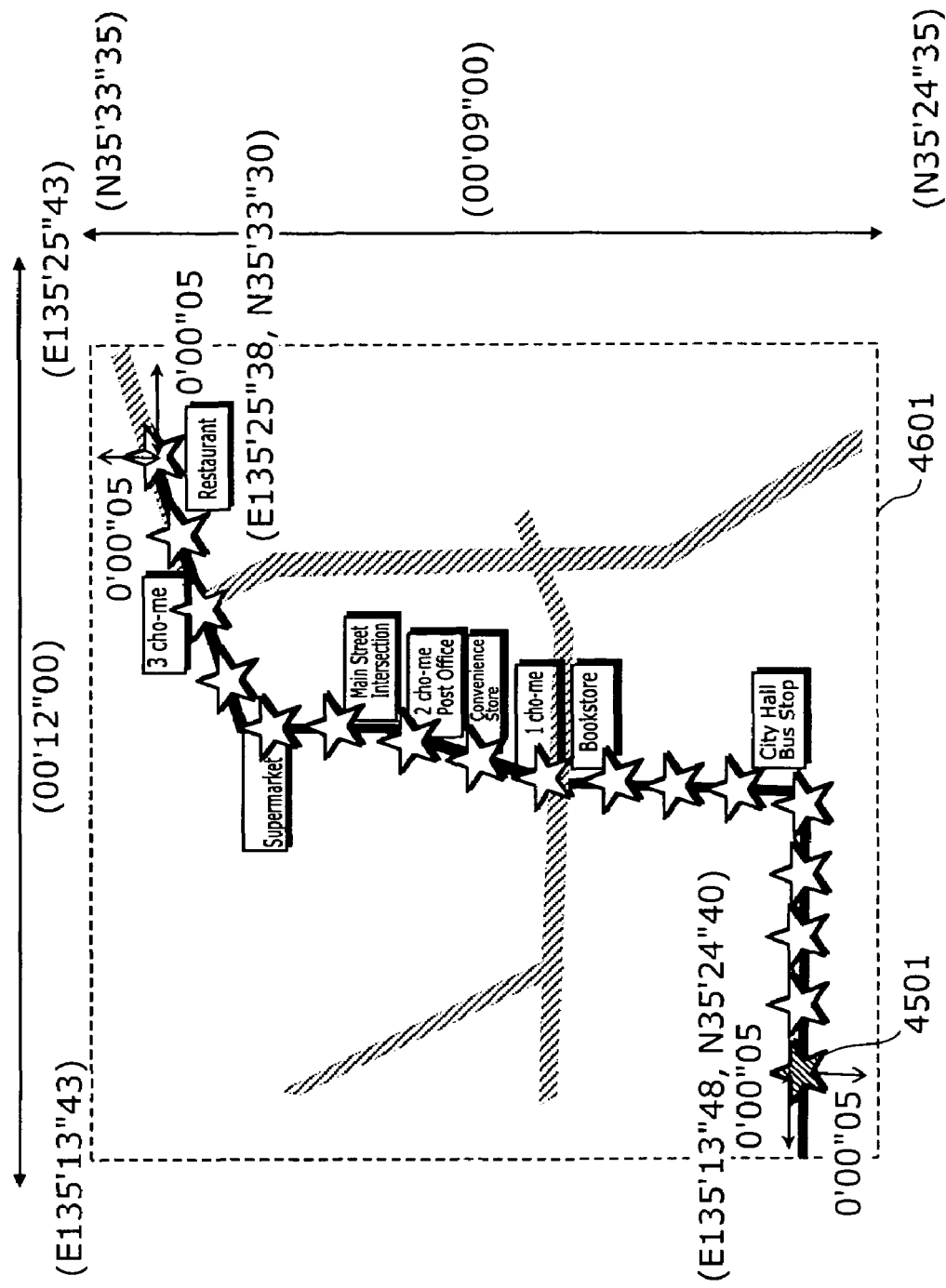
Figure 48:
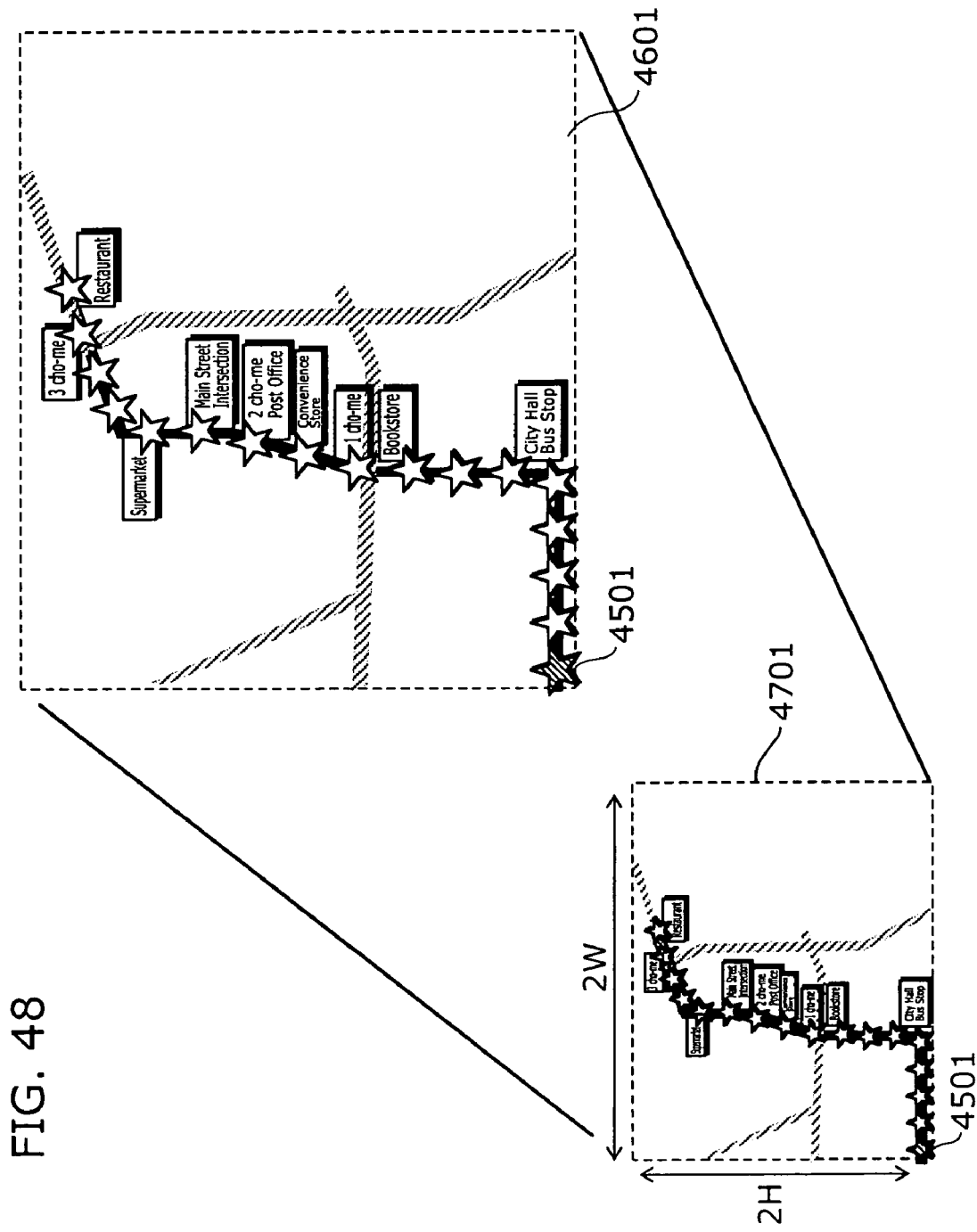
Figure 49:
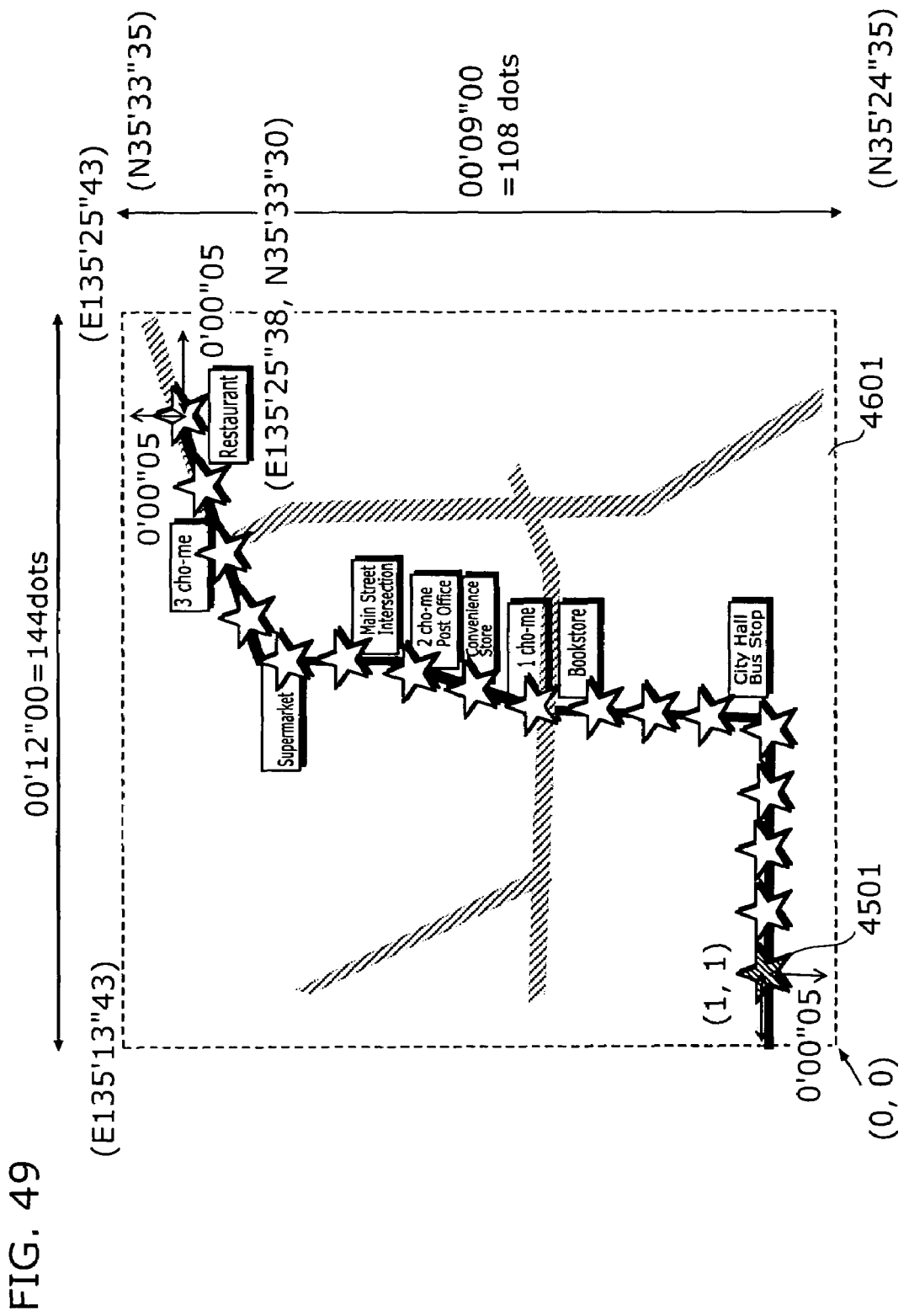
Figure 50:
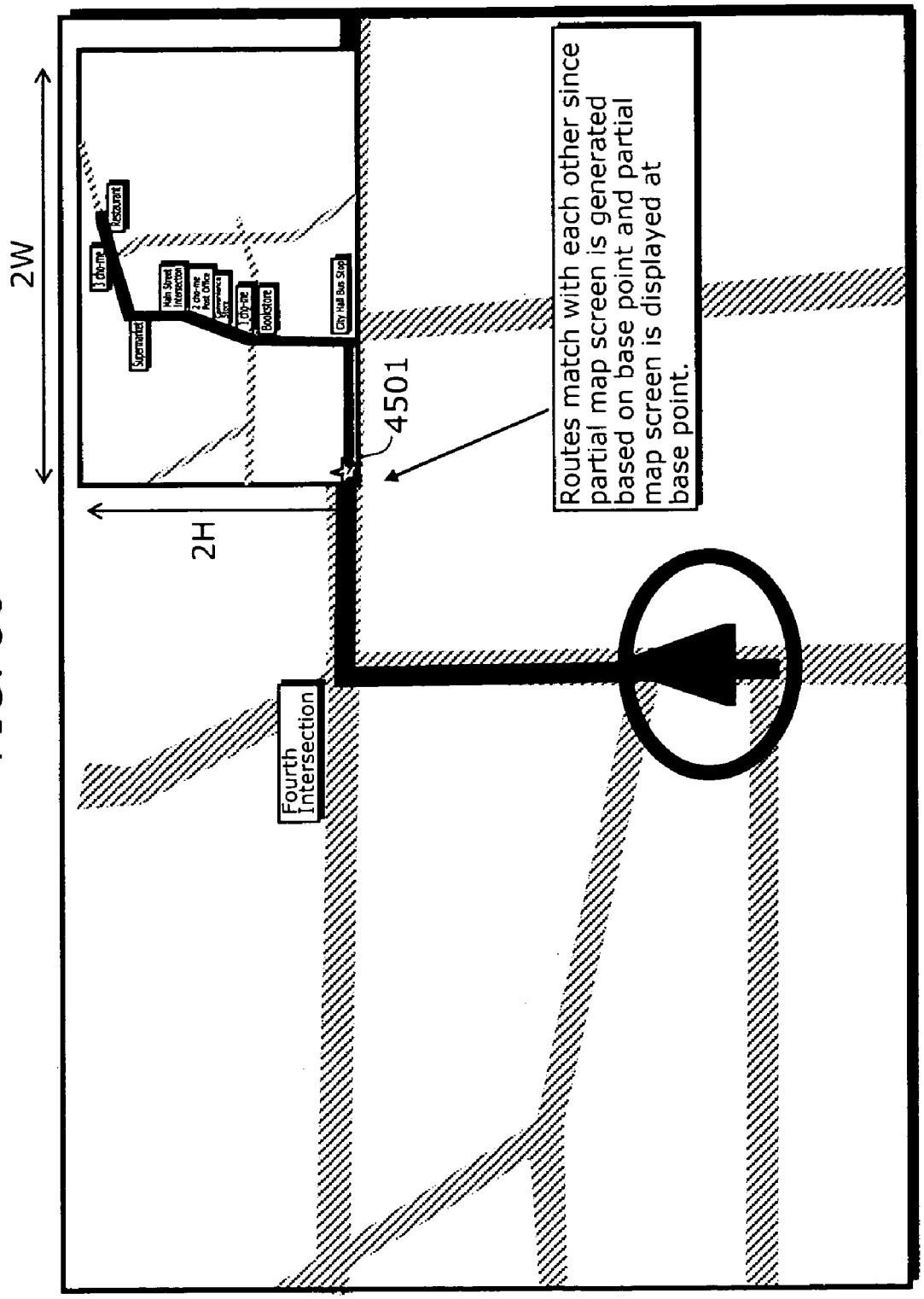
Figure 51:
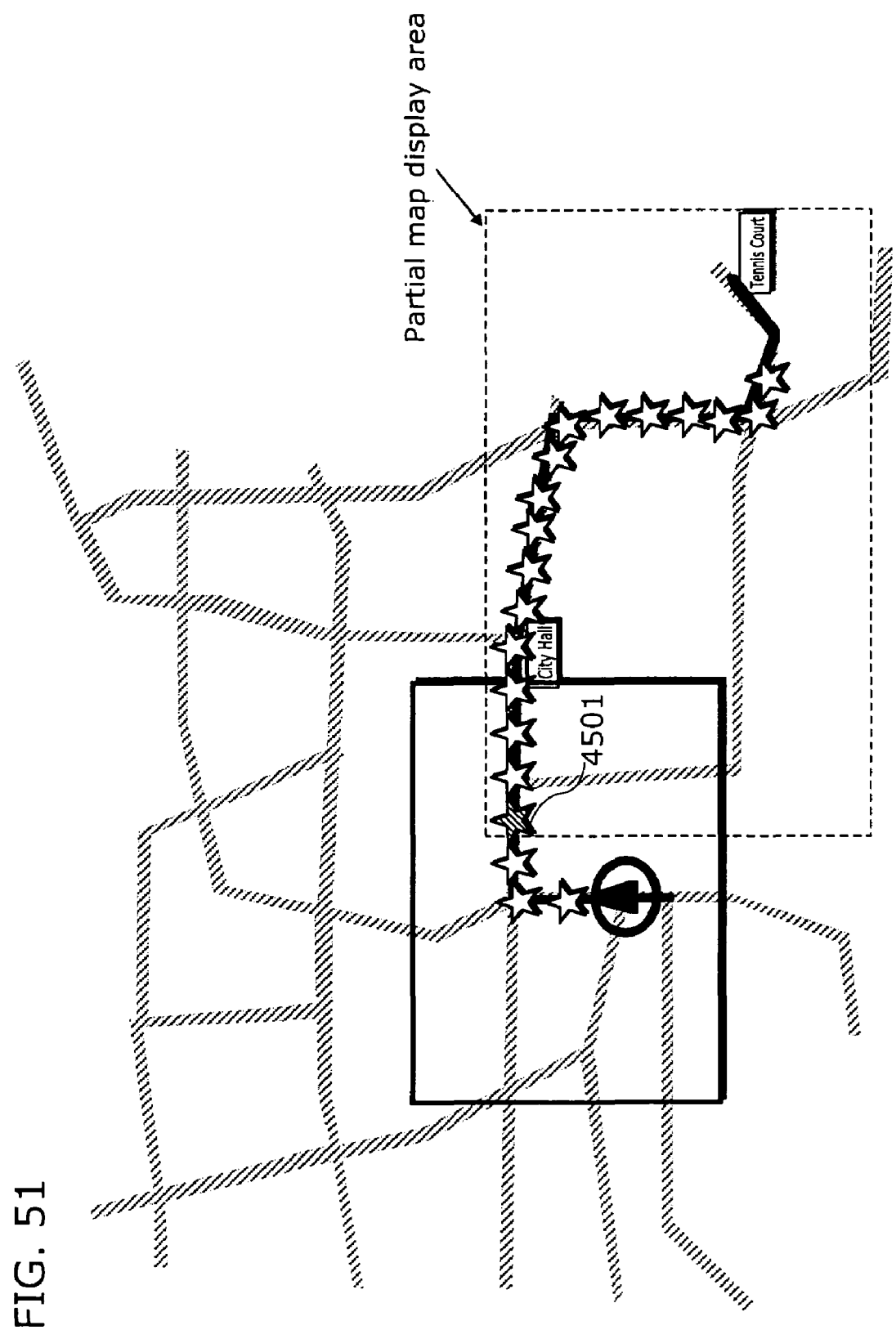
Figure 52:
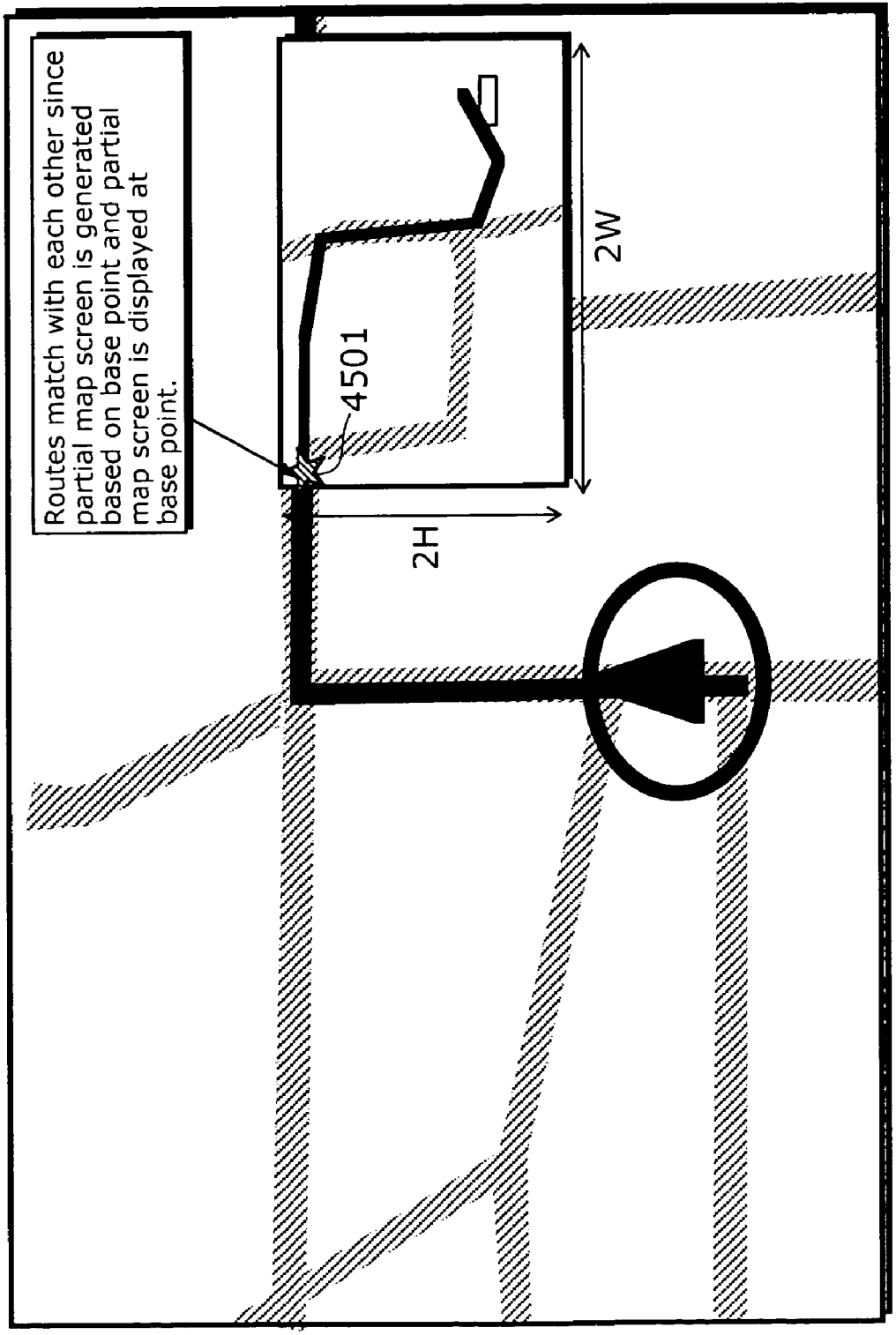
Figure 53:
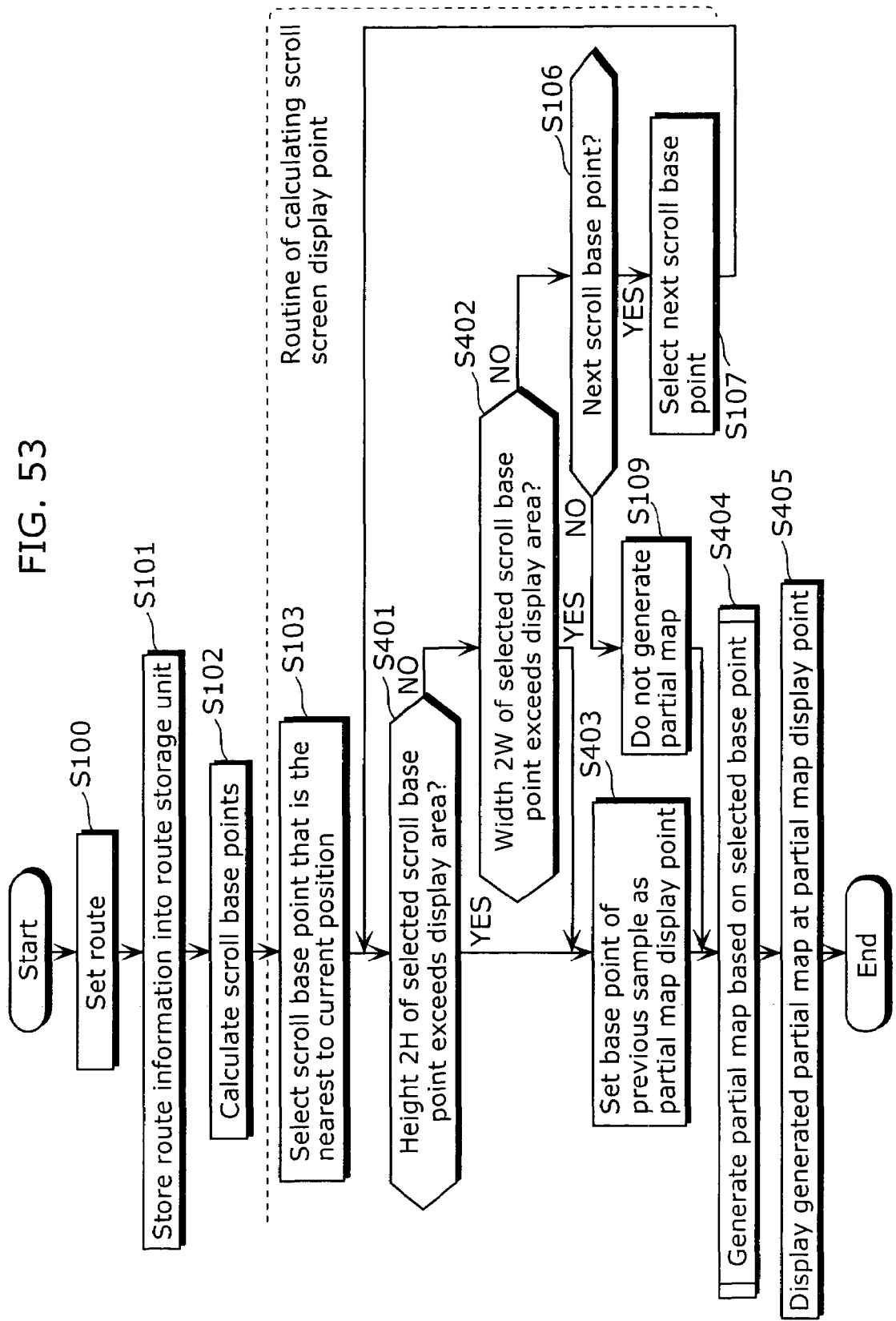
Figure 54:
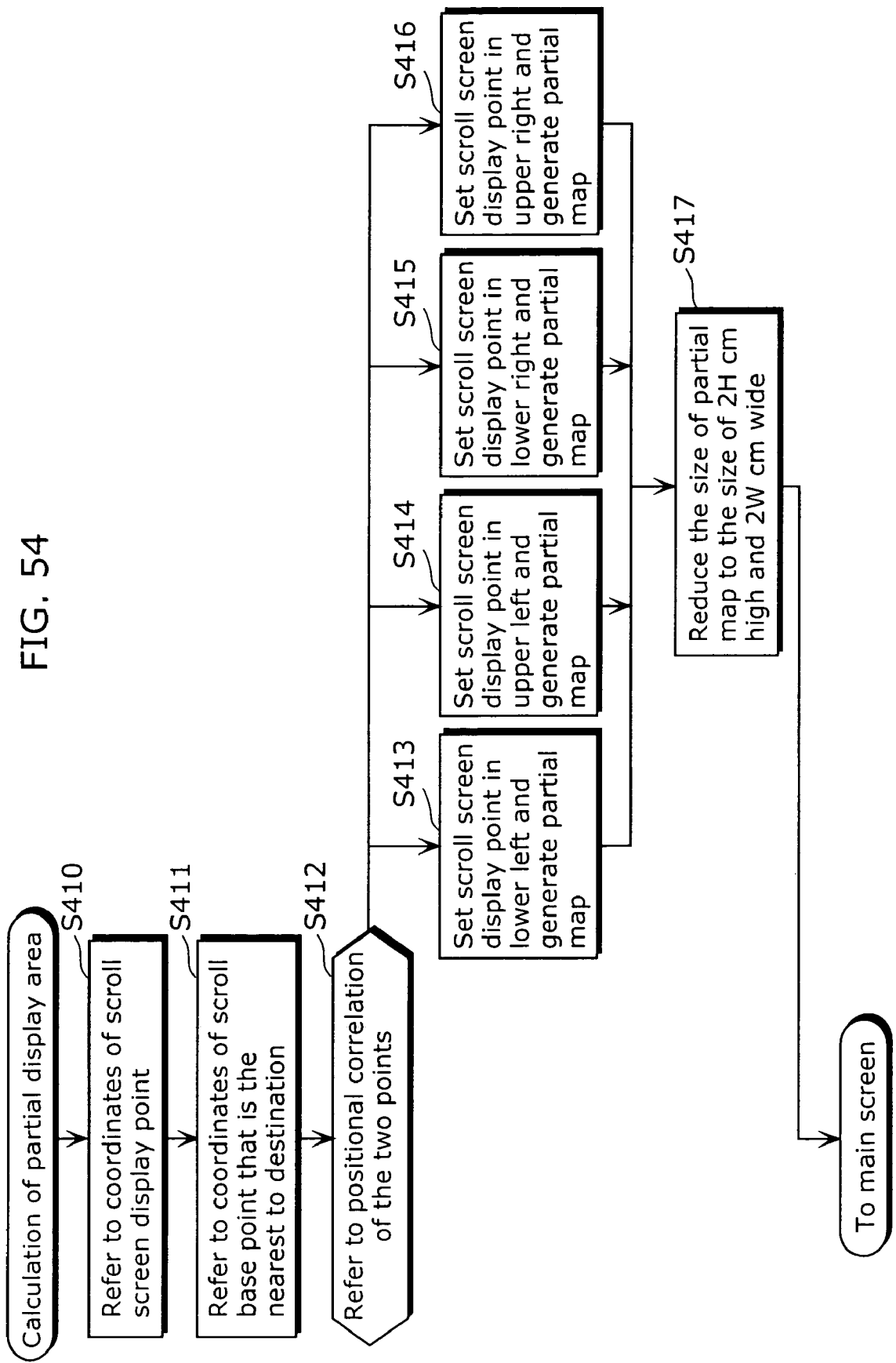
Figure 55C:
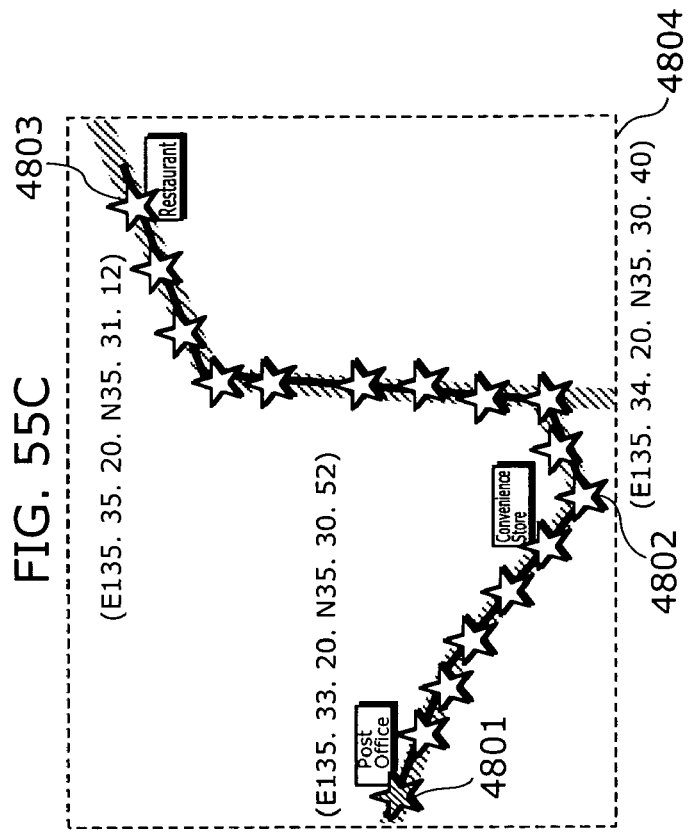
Figure 55A:
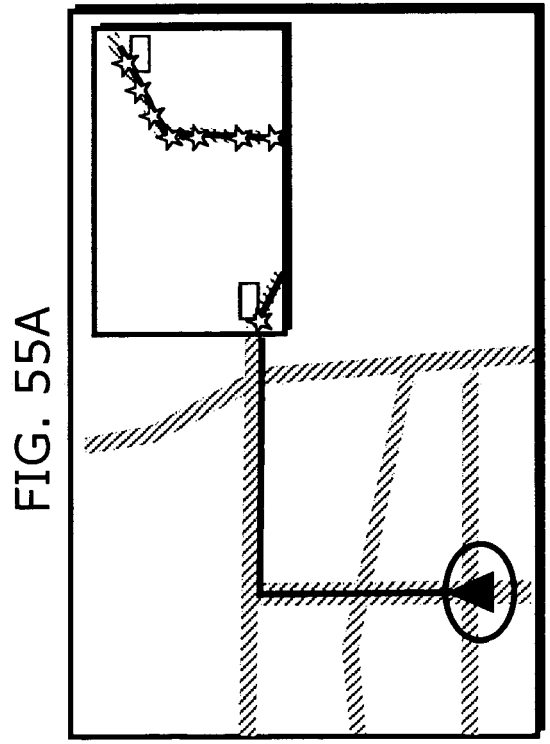
Figure 55B:
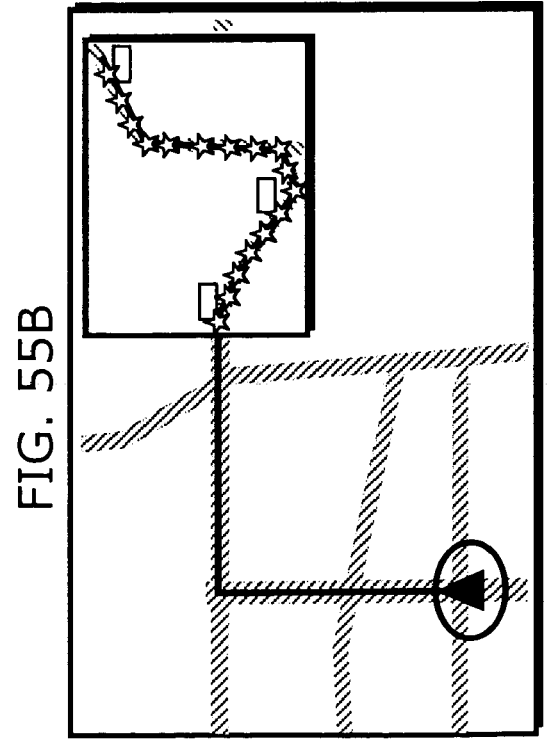
Figure 56:
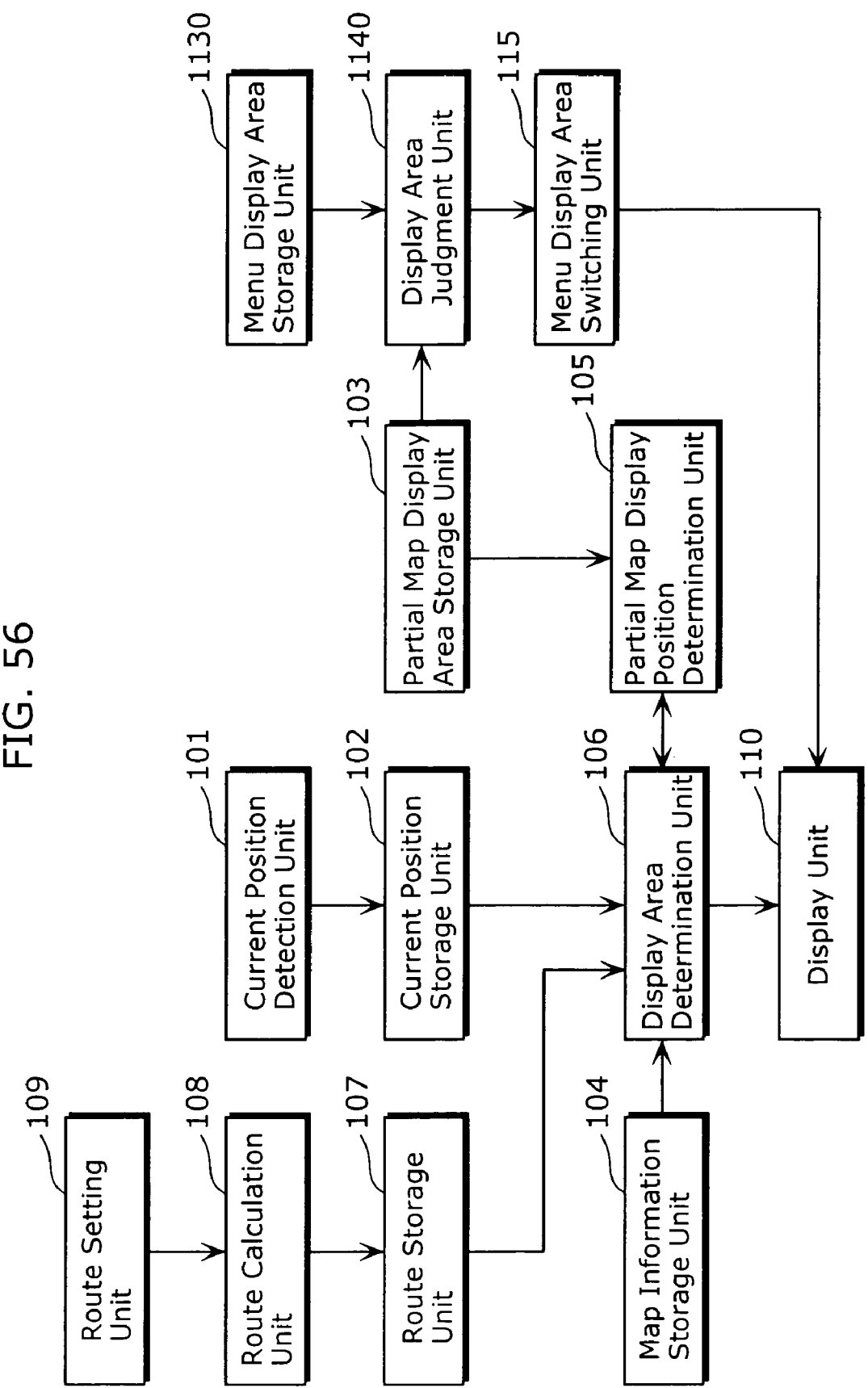
Figure 57:
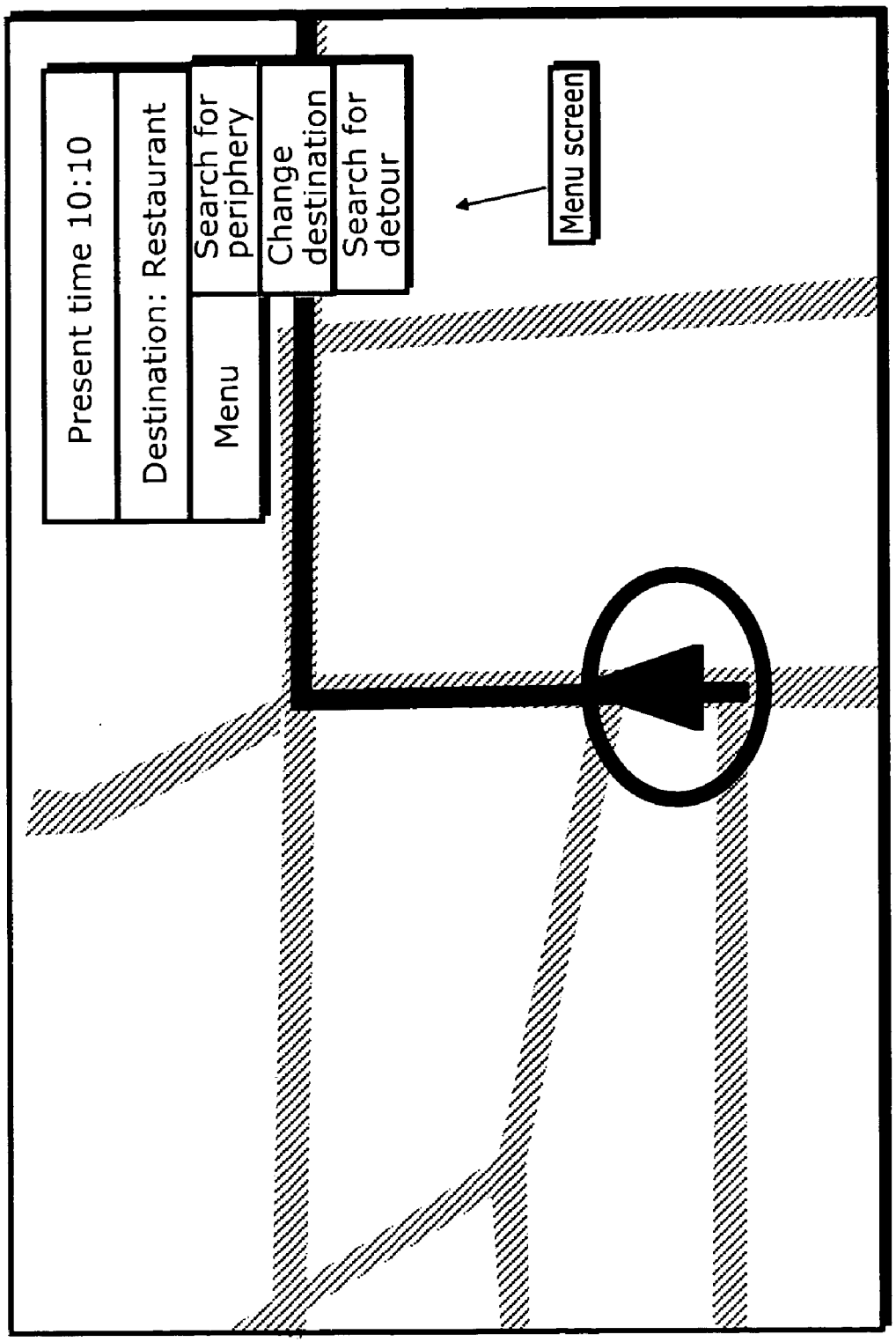
Figure 58:
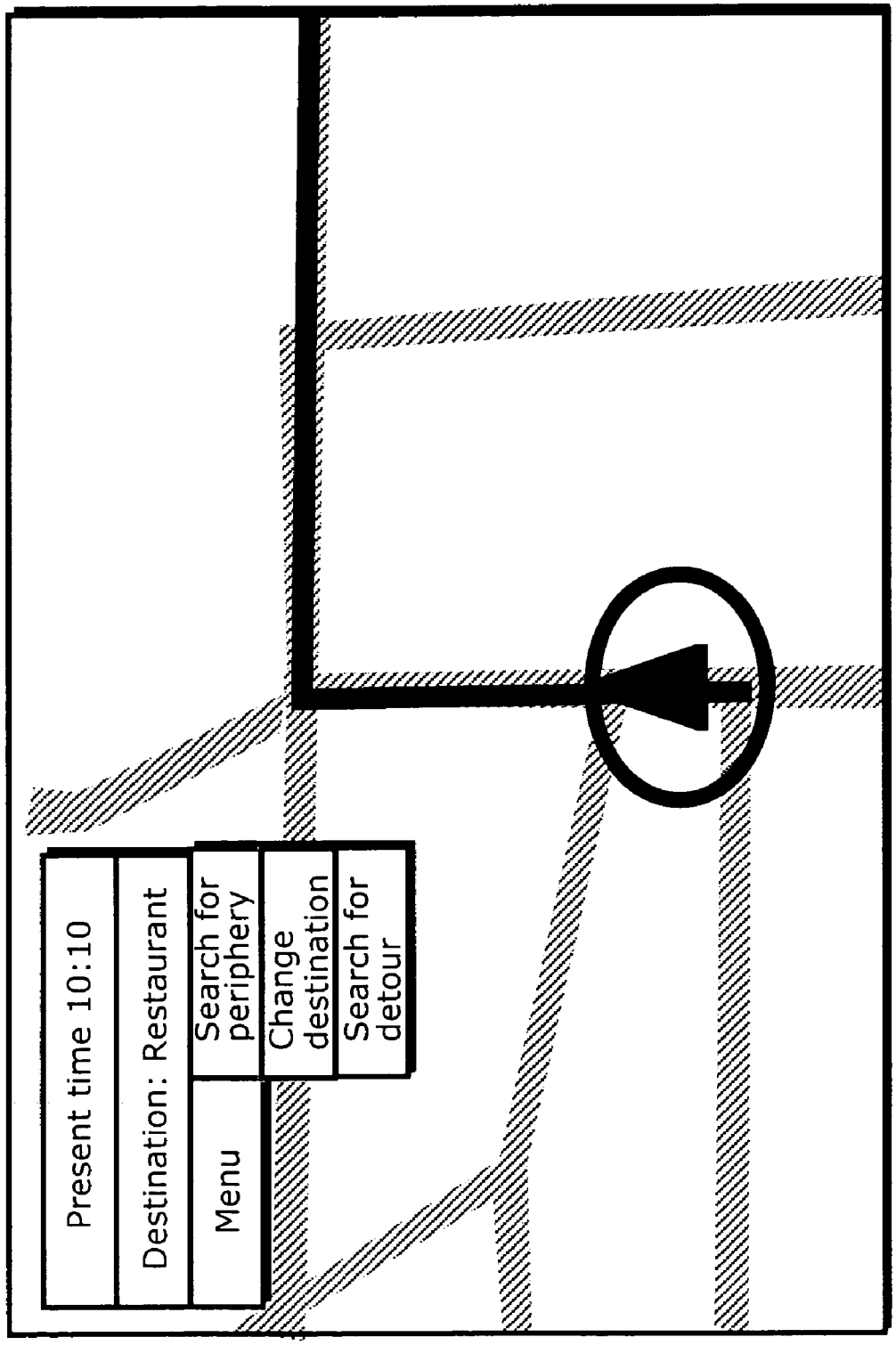
Figure 59:
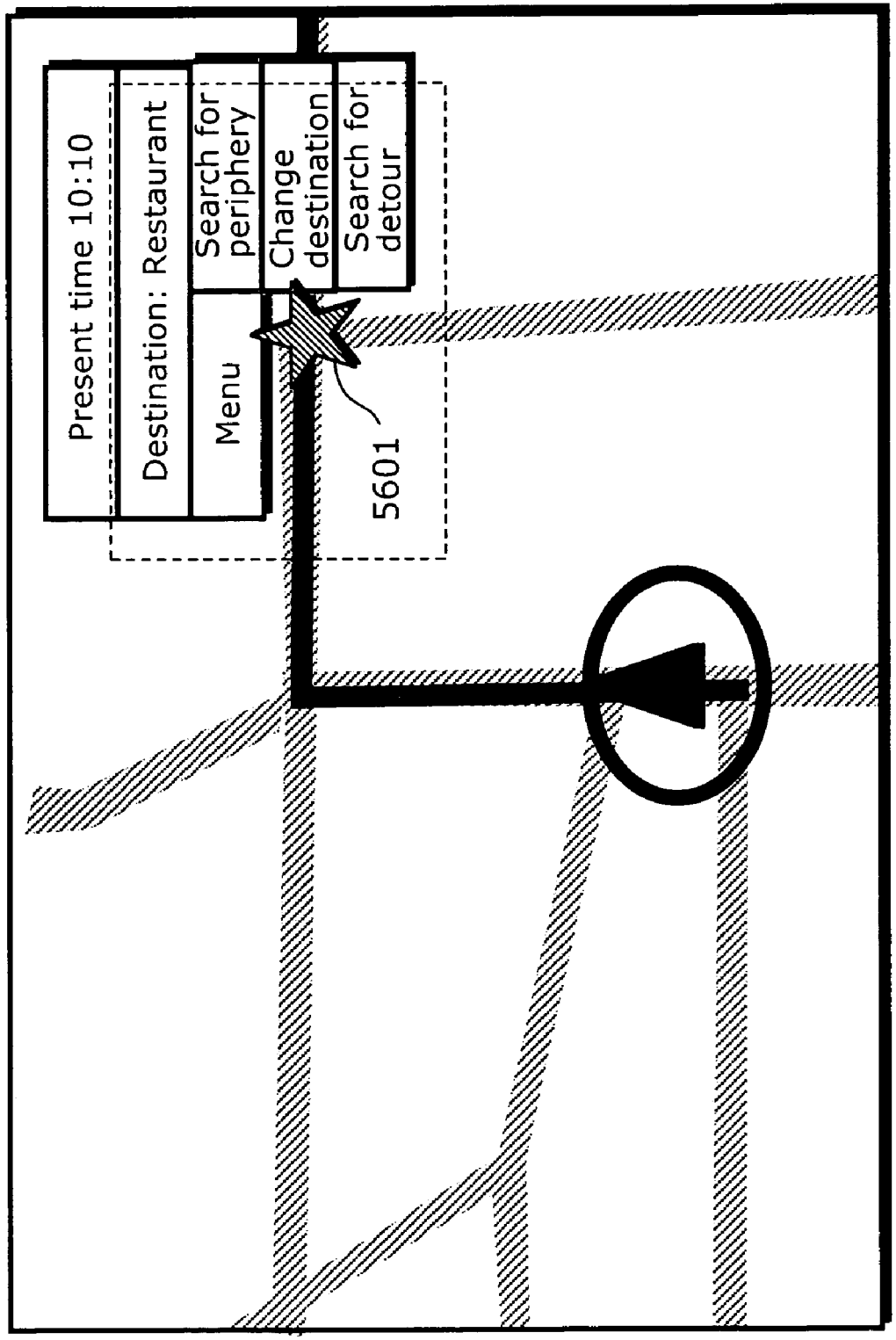
Figure 60:
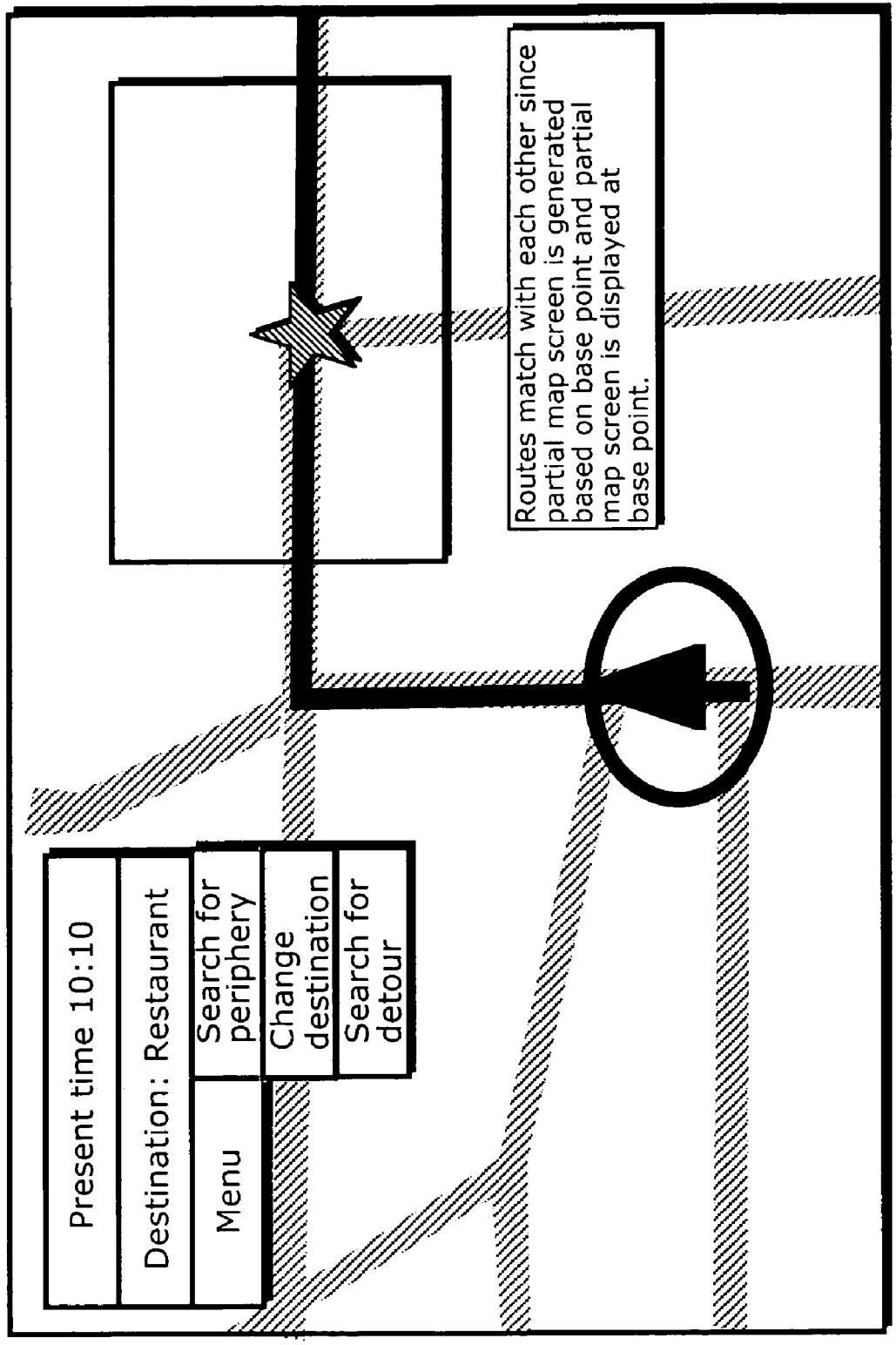
Figure 61:
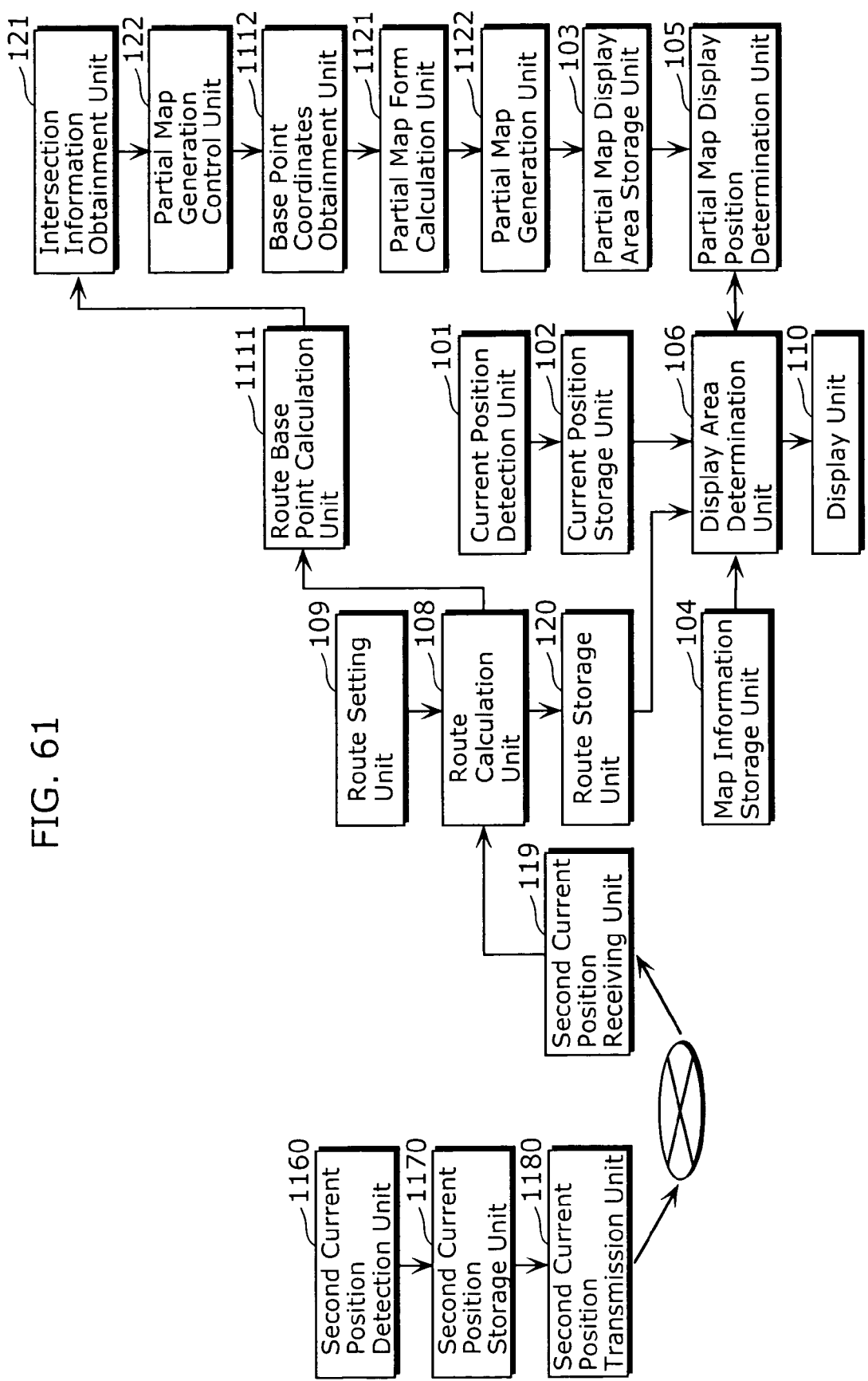
Figure 62:
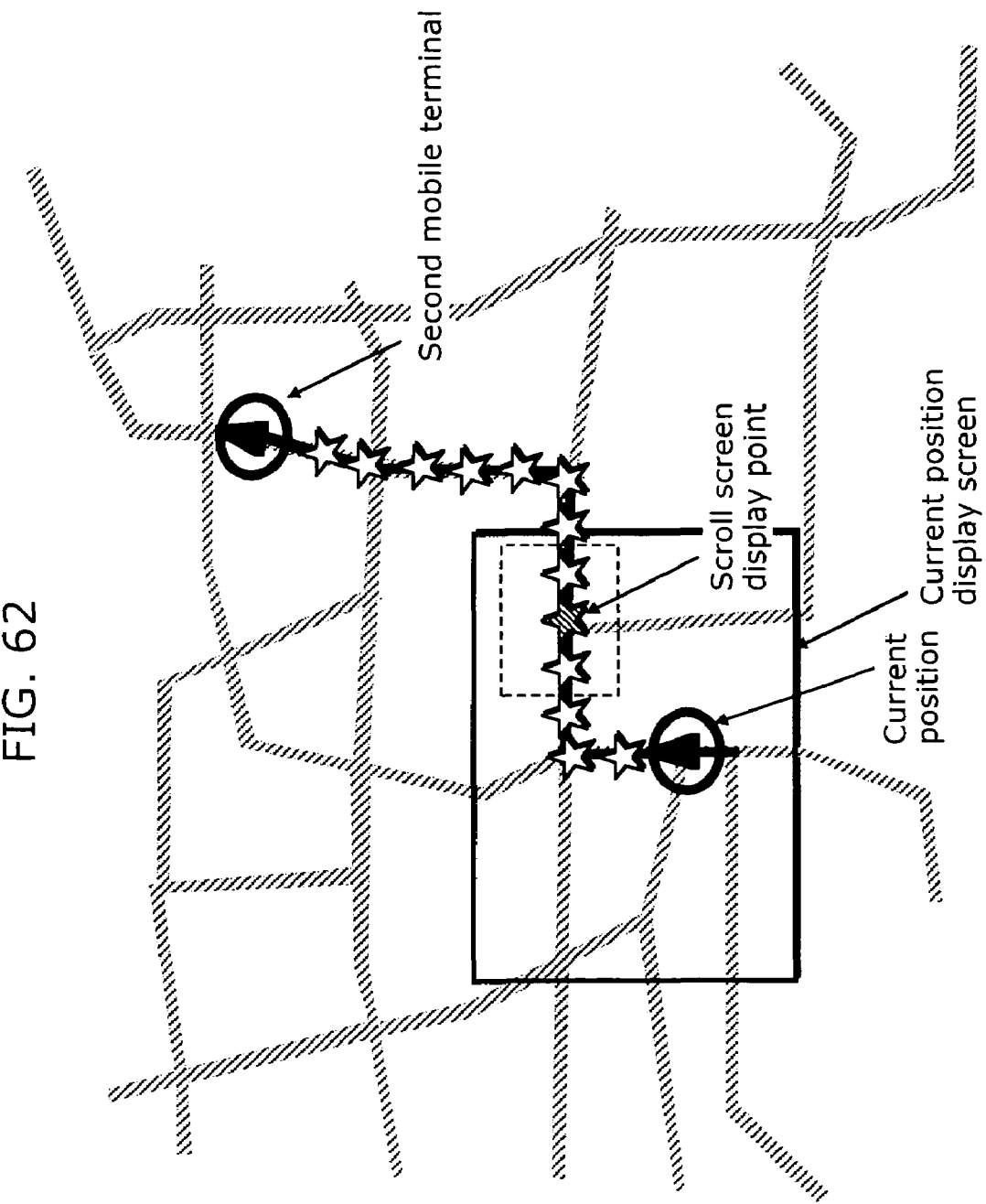
Figure 63:
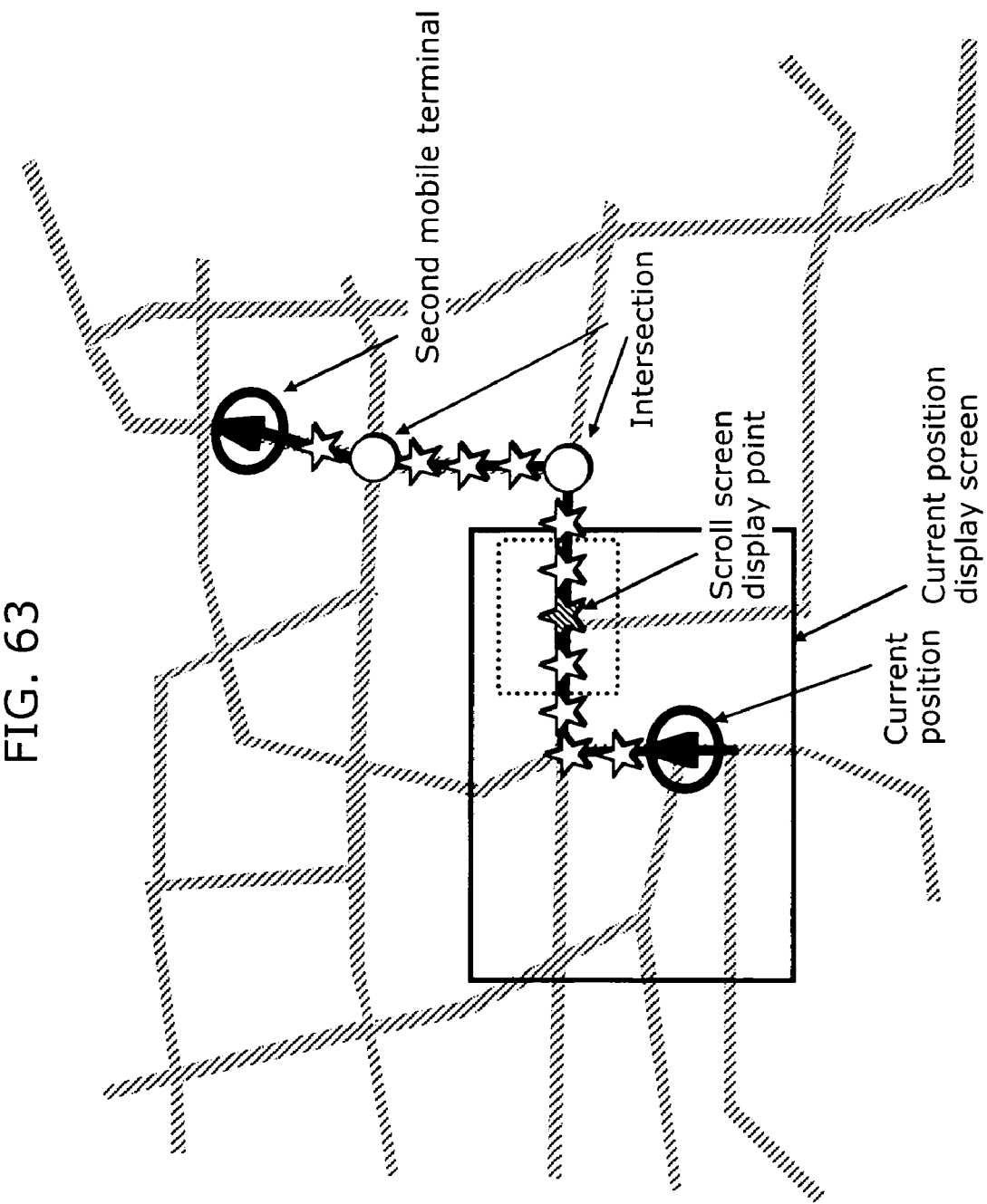
Figure 64:
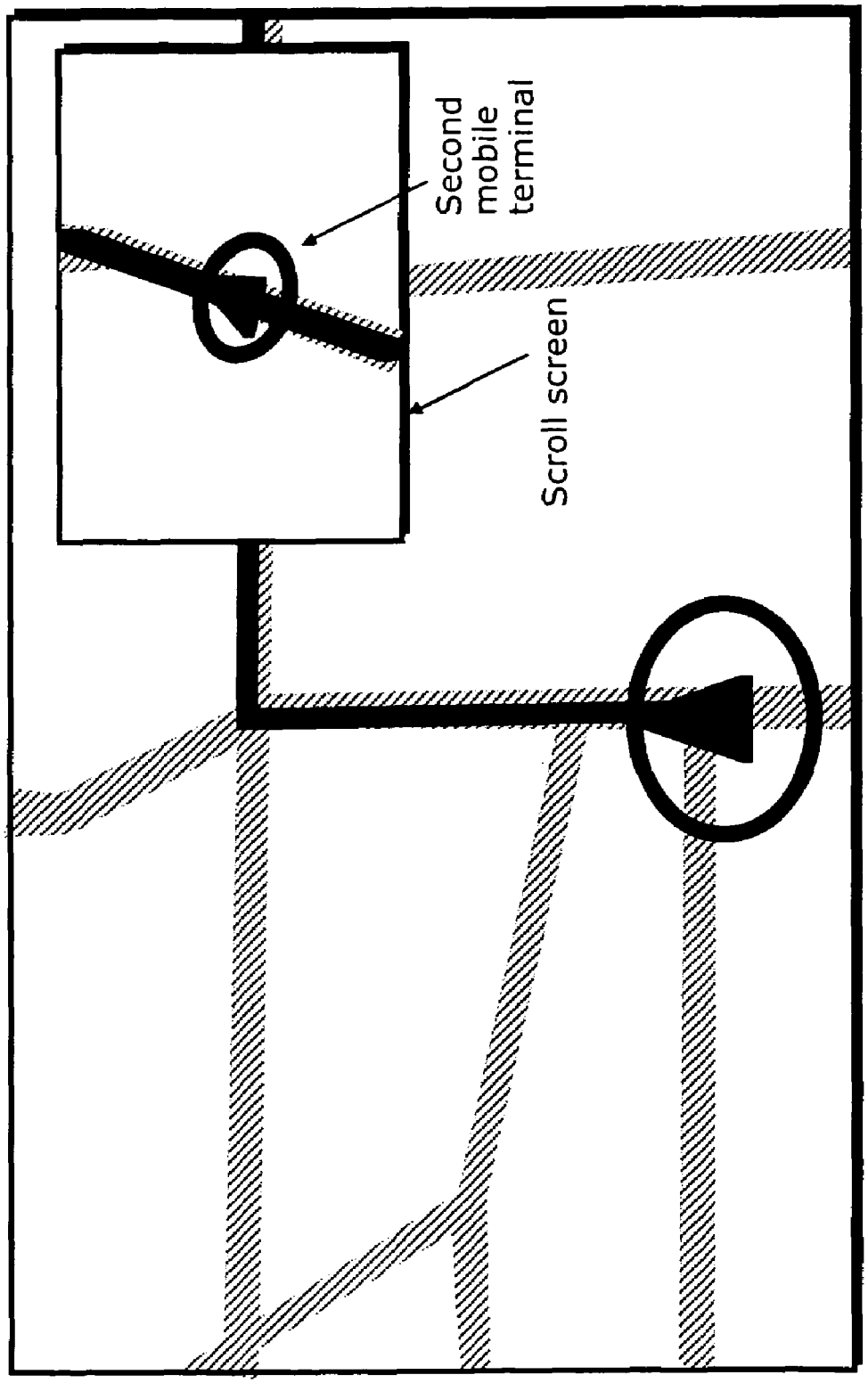

(a) to (f) in FIG. 5 are diagrams showing an example of how the display screen of the car navigation system, which sequentially displays a scroll screen in a direction from a destination toward a current position;

FIG. 6 is a diagram showing an example of each scroll screen in the case where the user has followed an optimal route from a destination to a current position;

FIG. 7 is a diagram showing an example of a scroll screen which shows a position that is the nearest to a current position in the case where the user has followed an optimal route from a destination to the current position;

FIG. 8 is a diagram showing another example of a scroll screen which shows a position that is the nearest to a current position in the case where the user has followed an optimal route from a destination to the current position;

FIG. 9 is a diagram showing yet another example of a scroll screen which shows a position that is the nearest to a current position in the case where the user has followed an optimal route from a destination to the current position;

FIG. 10 is a flowchart showing an example of the procedure used in the calculation of a scroll screen display point performed by a partial map display position determination unit shown in FIG. 2;

FIG. 11 is a diagram showing a procedure used in the calculation of a scroll screen display point on a map;

FIG. 12 is a diagram showing an example of a scroll screen displayed in a scroll screen display point of a current position display screen;

FIG. 13 is a diagram showing an example of a scroll screen displayed in various positions according to the position of an optimal route within the current position display screen;

FIG. 14 is a diagram showing another example of a scroll screen displayed in various positions according to the position of an optimal route within the current position display screen;

FIG. 15 is a diagram showing yet another example of a scroll screen displayed in various positions according to the position of an optimal route within the current position display screen;

FIG. 16 is a diagram showing an example of a display of the current position display screen in the case where a display area of the current position display screen is moved on the map depending on the circumstances;

FIG. 17 is a diagram showing an example of a display in the case where the current position display screen is moved so that the scroll screen display point is located in a suitable position on the current position display screen;

FIG. 18 is a diagram showing an example of a display in the case where a scroll screen is displayed on the current position display screen which has been moved to the suitable position;

FIGS. 19A and 19B are diagrams respectively showing an example of a display of the form of an optimal route in the case where the optimal route is stored in an approximate form;

FIGS. 20A and 20B are diagrams respectively showing an example of a display in the case where a scroll screen that is based on an important scroll base point is displayed larger than a scroll screen that is based on a normal scroll base point;

FIG. 21 is a diagram showing a sampling example of the scroll base point in the case where the numbers of samples of scroll base point on the respective routes are synchronized so that the respective scrolls terminate at the same time on the respective routes directed to plural destinations;

FIGS. 22A and 22B are diagrams respectively showing a display example of the scroll screen which has an important scroll base point in the center;

FIG. 23 is a diagram showing an example in the case of performing scroll display by synchronizing the scroll base points which are to reached at the same time on the respective routes directed to plural destinations;

FIG. 24 is a diagram showing an example of a scroll display using plural scroll screens in the case where plural routes are derived for one destination;

FIGS. 25A and 25B are diagrams respectively showing examples of an input area in the case of defining a peripheral area of the scroll screen display point on the current position display screen as an area for inputting a scroll display start instruction;

FIG. 26 is a block diagram showing a configuration of a map display device in the case where the map display device is equipped with an operation input unit such as a touch panel;

FIGS. 27A and 27B are diagrams illustrating control to display a scroll screen in the case where a user's operational input is performed within a valid range;

FIGS. 28A and 28B are diagrams respectively showing an example of a scroll display in the case where traffic information or the like is updated in relation to the scroll base point on the route the vehicle is running;

FIG. 29 is a block diagram showing a configuration of the map display device which controls the form of the scroll screen;

FIG. 30 is a diagram illustrating an example of the route that is scroll-displayed along with the control on the form of the scroll screen;

FIG. 31 is a diagram showing an example of the form control on the scroll screen which is scroll-displayed with the scroll base point located in the center, on the route from the destination;

FIG. 32 is a detailed diagram showing a method for generating a scroll screen based on the scroll base points shown in FIG. 31;

FIG. 33 is a diagram showing another example of the form control on the scroll screen which is scroll-displayed with the scroll base point located in the center, on the route from the destination;

FIG. 34 is a diagram illustrating the calculation of a display point of scroll screen within the current position display screen;

(a) to (d) in FIG. 35 are diagrams illustrating scroll display operation together with the form control on the scroll screen;

FIG. 36 is a flowchart showing a procedure used in the scroll display of a partial map, having the scroll base point on the route in the center, on the scroll screen within the current position display screen;

FIG. 37 is a flowchart showing a procedure used in form control on the scroll screen (partial display area);

FIG. 38 is a block diagram showing a detailed configuration of a partial map form calculation unit shown in FIG. 29;

FIG. 39 is a diagram showing an example in the case where the form control on the scroll screen is performed based on coordinates of a destination and coordinates of the scroll base point that is the nearest to a current position;

FIG. 40 is a diagram showing an example of deriving a scroll screen that is vertically long and of a predetermined form, based on the coordinates of a destination and the coordinates of the scroll base point that is the nearest to the current position;

FIG. 41 is a diagram showing an example in which the vertically long scroll screen as derived in FIG. 40 is displayed on the current position display screen;

FIG. 42 is a diagram showing an example of deriving a scroll screen that is horizontally long, based on the coordinates of a destination and the coordinates of the scroll base point that is the nearest to the current position;

FIG. 43 is a diagram showing a more detailed configuration of a map display device which reduces the size of the partial map which goes along the route to the destination, and displays the reduced-size partial map on the scroll screen with less scrolling times;

FIG. 44 is a diagram showing a more detailed configuration of the partial map area reduction scale calculation unit shown in FIG. 43;

FIG. 45 is a diagram showing an example of controlling the reduction scale of a partial map in the case of reducing the size of the partial map display area indicating a route to the destination and displaying the reduced-size partial map display area on the scroll screen of a predetermined size;

FIG. 46 is a diagram showing an example of the partial map display area to be displayed on the scroll screen shown in FIG. 45;

FIG. 47 is a diagram showing an example of the method for calculating the reduction scale of the partial map display area shown in FIG. 46;

FIG. 48 is a diagram showing an example in the case of reducing the size of the partial map indicating a route from a base point on the current position display screen to the destination, and displaying the whole map on the scroll screen of predetermined shape and form;

FIG. 49 is a diagram showing an example of the method for calculating the scale for reducing the partial map indicating a route from the partial map display point to the destination;

FIG. 50 is a diagram showing an example of a display displaying, on the current position display screen, the generated partial map in which a partial map display point 4501 is located in the upper left;

FIG. 51 is a diagram showing an example in the case where the partial map display point is located in a different corner of the scroll screen shown in FIG. 46;

FIG. 52 is a diagram showing an example of a display displaying the partial map display area shown in FIG. 51 on the current position display screen;

FIG. 53 is a flowchart showing a procedure used in the case of reducing the size of the partial map display area ranged from the partial map display point to the destination and displaying the entire map on a scroll screen of a predetermined size;

FIG. 54 is a flowchart showing a detailed procedure for the calculation of the partial display area performed in S404 shown in FIG. 53;

FIGS. 55A, 55B and 55C are diagrams illustrating the case of deriving base points to indicate, for example, the largest value and the smallest value in each axis out of the base points, and generating a partial map based on the calculated base points;

FIG. 56 is a block diagram showing a configuration of the map display device according to the variation in the case of holding plural display patterns of a menu screen and displaying the menu screen in a different position in the case where the menu screen and the scroll screen overlaps with each other;

FIG. 57 is a diagram showing an example (pattern 1) of the menu screen displayed on the current position display screen which displays a current position or the like;

FIG. 58 is a diagram showing another example (pattern 2) of the menu screen displayed on the current position display screen;

FIG. 59 is a diagram showing an example of the current position display screen in the case where the scroll screen and the menu screen overlap with each other due to the calculated scroll screen display point;

FIG. 60 is a diagram showing a display example of the current position display screen in which the menu screen is displayed on the left side as a result of switching the display pattern of the menu screen in the case where the scroll screen is displayed on the right side of the current position display screen as shown in FIG. 59;

FIG. 61 is a diagram showing a configuration of the map display device according to the variation in the case of setting the destination of an accompanying vehicle which accompanies the driver's vehicle, as a destination, and scroll displaying a route to the accompanying vehicle;

FIG. 62 is a diagram showing the current position display screen which displays a current position, or the like, of the mobile terminal;

FIG. 63 is a diagram showing an example of the positional relationship between a second mobile terminal and a vehicle which is to become a trigger of the partial map scroll display showing a route from the vehicle to the second mobile terminal; and FIG. 64 is a diagram showing an example in the case where the scroll screen displaying a route from the vehicle to the second mobile terminal is displayed on the current position display screen.

DESCRIPTION OF THE PREFERRED EMBODIMENT(S)

In order to solve the above-mentioned problems, according to the map display device according to the present invention, the travel route is a route from the current position of the mobile object to a destination, and the partial-display unit displays the partial map while causing the partial map to be scrolled in one of the following directions: a direction from the current position to the destination, and a direction from the destination to the current position. Thus, it is effective in that the user of the map display device can verify the partial map through scroll display in a direction from a current position to a destination or from a destination to a current position, while looking at a map indicated by map information regarding the current position.

The map display device further includes a position detection unit which detects a current position of the mobile body, and each time the position detection unit detects a new current position, the map information obtainment unit obtains map information regarding the new current position and a travel route from the new current position to the destination, and the whole-display unit and the partial-display unit respectively display the obtained new current position and the map information regarding the travel route. Thus, it is effective in that the user can view the current position and the map indicated by the latest map information regarding the travel route, according to the movement of the mobile body.

In the case where a point on the travel route included in the map displayed by the whole-display unit is defined as a base point, the partial-display unit defines a display area as the partial display area and displays the partial map while causing the partial map to be scrolled. The display area includes the base point and is associated with the base point by a predetermined distance. As a result, the partial display area is positioned on the travel route included in the map displayed by the whole-display unit. Therefore, it is effective in that the user can check the route to the destination by looking at the partial display area displayed on the route of the same map, while verifying the current position in the map displayed by the whole-display unit.

In addition, the partial-display unit defines a base point as a starting point or an ending point of the scroll and displays the partial map while causing the partial map to be scrolled. The base point is a point at which the partial map displayed in the partial display area matches a map in the partial display area on the map displayed by the whole-display unit. Thus, it is effective in that the user can intuitively perceive a relative positional relationship between the current position of the mobile body and the destination, a direction to the destination or the like.

Moreover, when the partial-display unit displays the partial map in the partial display area, the whole-display unit changes the display area of the map displayed on the whole display screen, based on the travel route included in the map displayed on the whole display screen. Therefore, the map display device of the present invention is effective in displaying a map indicated by the map information of a new current position according to the movement of the mobile body, while scroll displaying the partial map in the partial display area.

The partial-display unit displays the partial map while causing the partial map to be scrolled, by sequentially setting plural predetermined points on the travel route as the base points. Therefore, the map display device according to the present invention can display the partial map which includes plural predetermined points on the route while scrolling the partial map.

The map display device further includes an input unit which receives a user's operational input, wherein the partial-display unit starts causing the partial map to be scrolled when the input unit has received the user's operational input. Thus, the map display device of the present invention can display the partial map at the user's desired timing while scrolling the partial map.

The partial-display calculates the points on the travel route indicated in the displayed partial map, by predicting a time when the mobile object passes the respective points, and to display the calculated time together with the partial map. Therefore, the user can easily know the time at which the point on the route to the destination is passed, and it is effective in that the user can set such a time as a reference for judging whether to change or continue the schedule thereafter.

Moreover, the partial-display unit displays different partial maps in plural partial display areas while scrolling the respective partial maps. Thus, the user can change the route to the destination based on the partial map which is scroll-displayed on the plural partial display areas.

The map information obtainment unit obtains map information regarding plural travel routes from the current position to plural destinations, the partial-display unit displays the obtained plural travel routes in the plural partial display areas while scrolling the respective partial maps. Thus, the user can change the destination or the route to the destination based on the partial map scroll-displayed in the plural partial display areas.

The partial-display unit simultaneously displays the partial maps showing the plural travel routes, so that the time from when scroll is started until the time when scroll is terminated is the same for the travel routes.

The partial-display unit displays the partial maps of the respective travel routes by scrolling the respective partial maps, so that the partial maps for which the predicted time at which the mobile body passes are the same. Thus, it is effective in that the user can know at a glance the quickest route to the destination.

The map display device further includes a partial map area calculation unit which calculates a form or a reduction scale of the partial map based on the base point on the travel route, and the partial-display unit displays the partial map in the form or at the reduction scale calculated by the partial map area calculation unit.

In addition, the partial map area calculation unit calculates plural base points on the travel route, and derives the form of the partial map based on the position of the calculated base points. Thus, the map display device can calculate the form of the partial map display area in accordance with the form of the travel route, and thus can display a long travel route in one partial map.

The partial map area calculation unit calculates plural base points on the travel route, and calculates a reduction scale of the partial map to be displayed in the partial display area, based on the calculated base points. In this way, it is possible to change the reduction scale of the partial map to be displayed in the partial display area according to the position of the base points on the travel route.

Furthermore, the travel route is a route from a current position to a destination, and the map display device further includes: a second mobile body detection unit which detects a position of a second mobile body which is different from the mobile body; and intersection information obtainment unit which obtains information related to intersection in the case where the position detected by the second mobile body detection unit is set as the destination, in which the partial-display unit judges whether or not the number of intersections to the destination exceeds a predetermined number based on the information related to intersection and starts scrolling when the number of intersections exceeds the predetermined number. Thus, with the map display device according to the present invention, it is effective in that when the number of the intersections on the route from where the mobile body is located to where the second mobile body is located exceeds the predetermined number, the user can immediately check the route to the second mobile body through scroll display.

The map display device further includes an input unit which receives a user's operational input and an input valid range control unit which controls the valid range of the user's operation, in which the input valid range control unit defines, as the valid range, an area which includes the base point and is associated with the base point by a predetermined distance, and the partial-display unit starts scrolling in the case where the input unit receives the user's operational input within the valid range.

The map display device further includes a current position information display unit which displays, in a menu form, information related to the current position not indicated in the map in a predetermined area within the display screen, and in the case where the area which displays, in a menu form, the information related to the current position overlaps with the partial display area, the information related to the current position is moved in a different predetermined area in which the information does not overlap with the partial display area, and then displayed. Therefore, it is effective in that the user can simultaneously check the partial map and the information related to the current position within one screen on which the whole-display unit displays a map.

First Embodiment

The following describes the embodiment of the present invention with reference to the drawings.

FIG. 2 is a block diagram showing an overall structure of a map display device 100 according to the first embodiment of the present invention. Hereinafter, each of the units shall be described, and then the operation of the map display method according to the present invention will be described. The map display device 100 is a car navigation device which displays a peripheral map showing a current position on a main map, and scroll displays, along a route to a destination, a partial map showing a part of the map which indicates the route and is not displayed on the main map, in another window that is set in the edge on the destination side of the route displayed on the main map. Such map display device 100 is configured of a current position detection unit 101, a current position storage unit 102, a partial map display area storage unit 103, a map information storage unit 104, a partial map display position determination unit 105, a display area determination unit 106, a route storage unit 107, a route calculation unit 108, a route setting unit 109 and a display unit 110.

In FIG. 2, the current position detection unit 101 is configured of a Global Positioning System (GPS) for detecting the current position of a mobile body, an antenna or the like. The current position storage unit 102 is a memory for storing the current position detected by the current position detection unit 101.

The partial map display area storage unit 103 stores size and position for displaying a partial map in the part of a display area of a main screen displaying current position information, and controls the display of the partial map (the partial map display control shall be described in the description of the operation).

The partial display position determination unit 105 determines a position for displaying the partial map generated by the partial map display area storage unit 103, and controls the display of the partial map (the partial map display control shall be described in the description of the operation).

The map information storage unit 104 is a memory such as an IC memory or a hard disc for storing map information, commercial information on stores and facility information, or a storage medium such as a CD in which such information is written. The map information is information indicating a map to be displayed by the display unit 110, and includes scales, latitude and longitude. Note that the map information storage unit 104 may be equipped in the map display device body of the present invention, or the information may be obtained from an information providing server or the like, via a network.

The route storage unit 107 stores a destination and a route to the destination which are set through a user's input via the route setting unit 109 which sets a destination and a route, or the like. The route calculation unit 108 calculates an optimal route based, for example, on the destination set by the route setting unit 109, the map information stored in the map information storage unit 104 which stores a route to a destination, and the traffic information, such as a traffic jam, obtained from the information providing server via a network. The route storage unit 107 stores the information related to the route such as the traffic information related to a route and the optimal route calculated by the route calculation unit 108 and information related to intersections. Moreover, commercial information and facility information related to a destination may be stored at the same time. Hereinafter, a destination, the commercial information and facility information related to the destination, a route to the destination, and traffic information related to the route to the destination shall be defined as "route information". The route storage unit 107 may also store a destination and a route to the destination which are predicted by a processing unit that is separately equipped.

Note that the route setting unit 109 may include a touch panel equipped to a display, or voice may be inputted via a voice recognition function. A terminal with limited operationality as used in the navigation does not necessarily need to be equipped with operation buttons. By equipping a touch panel or a voice recognition function, a driver can easily operate the terminal.

Figure 3:
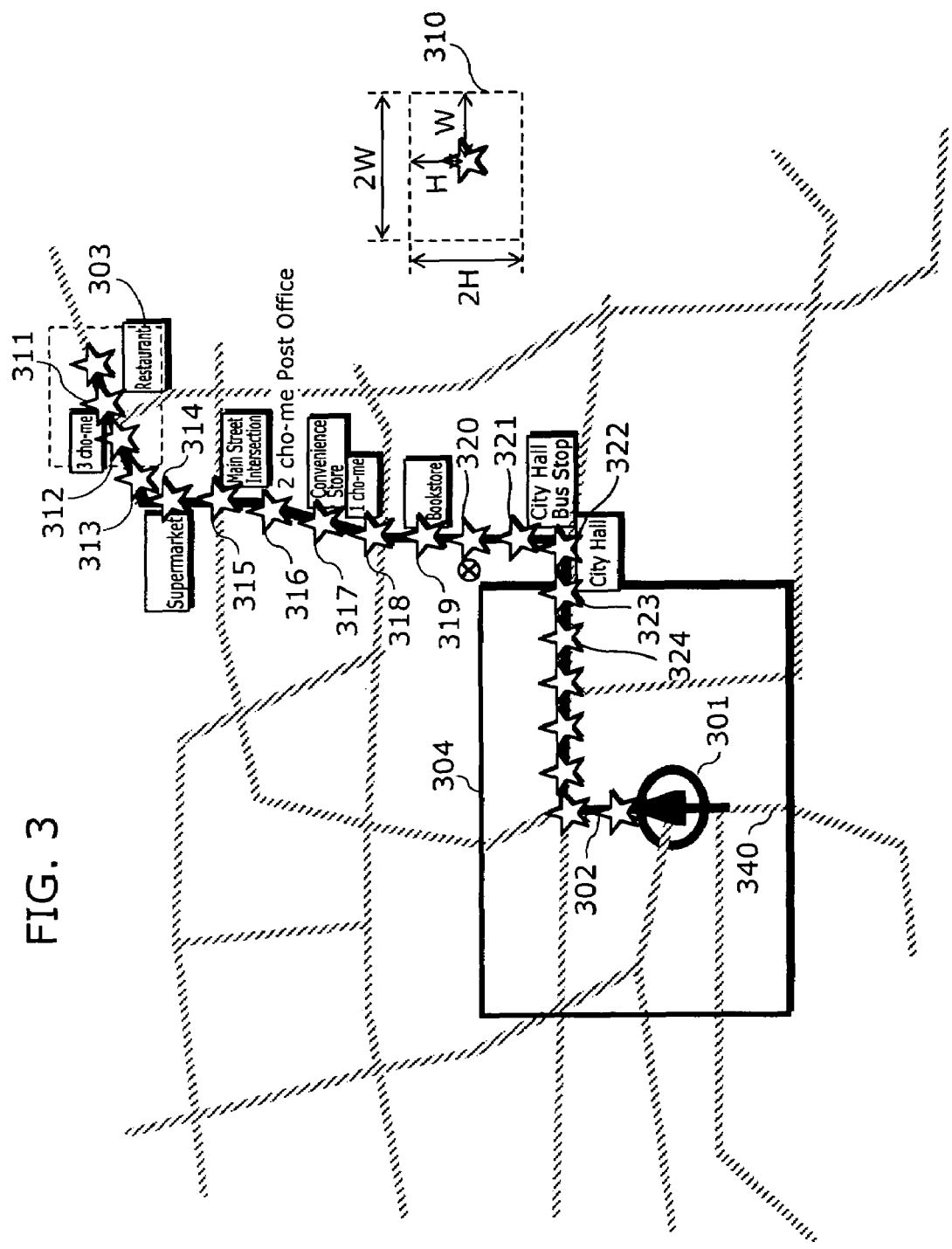
FIG. 3 is a diagram showing an example of a scroll base point that is calculated on the current position display screen and an optimal route which are displayed by a display area determination unit shown in FIG. 2.

The display area determination unit 106 displays, via the display unit 110 such as a display, the current position detected by the current position detection unit 101 and stored by the current position storage unit 102, as well as the map information related to the current position, or the like. FIG. 3 is a diagram showing an example of a current position display screen 304 displayed by the display area determination unit 106 and examples of the scroll base points calculated on the optimal route 302. For example, 304 in FIG. 3 is a current position display screen displayed on a display screen which is a display unit, and displays the information on a current position (hereinafter defined as "current position information") such as a current travel route (340 in FIG. 3) based on the current position information such as the position (301 in FIG. 3) of the user's vehicle detected by the current position storage unit 102 and the map information stored in the map information storage unit 104. The display area determination unit 106 further controls a map area to be displayed or the like out of the current position information to be displayed (the control of the current position display area shall be described in the description of the operation).

Note that the following describes a correspondence between each of the processing units equipped in the map display device and each unit recited in the Claims. The route calculation unit 108 is an example of a map information obtainment unit which reads the map information stored in the map information storage unit 104 or obtains the map information through the reception from an external information providing server connected via a network.

The current position detection unit 101, the current position storage unit 102, the display unit 110 and the route calculation unit 108 are examples of a whole-display unit which displays a map indicated by the map information which is related to the current position of the mobile body and is stored in the map information storage unit 104, on the entire display screen (display unit 110).

The route setting unit 109, the route calculation unit 108, the route storage unit 107, the map information storage unit 104, the display area determination unit 106 and the display unit 110 are examples of a partial display unit which displays a map indicated by the map information related to a travel route on a partial display area which is a part of the display unit 110. Note that the term "partial display area" in the Claims is equivalent to "scroll screen" or "partial map screen" in the embodiment, and is different from the term "partial display area" in the embodiment. As will be described below, "partial display area" according to the embodiment means a range on the map to be displayed once on a partial map screen. The term "base points" in the Claims means points indicated on the route displayed on the current position display screen, whereas according to the embodiment, it means points which are set at regular intervals on the route from a current position to a destination.

The current position detection unit 101 is an example of a location detection unit which detects a current position of a mobile body.

The operation input unit 116 is an example of an input unit which receives an operational input from the user.

The valid input judgment unit 117 is an example of an input valid range limitation unit which controls a valid range of the user's operation inputted by the input unit.

The route base point calculation unit 1111, the base point coordinates obtainment unit 1112, the partial map form calculation unit 1121 and the partial map area reduction scale calculation unit 113 are examples of a partial map area calculation unit which calculates a form or a reduction scale of the partial map. Note that the term "base points" in the Claims is equivalent to "base points" according to the embodiment. In other words, among the base points, the base points to become the largest value and the smallest value with respect to the respective vertical and horizontal axes of the partial map are derived, and the derived base points are to be referred to in the generation of a partial map.

The second current position detection unit 1160, the second current position storage unit 1170, the second current position transmission unit 1180 and the second current position reception unit 119 are examples of a second mobile body detection unit which detects a position of the second mobile body which is different from the mobile body as mentioned earlier.

The intersection information obtainment unit 121 is an example of an intersection information obtainment unit which obtains the information related to intersections to be crossed until a destination is reached, in the case of setting the position detected by the second mobile body detection unit as the destination.

The menu display area storage unit 1130, the display area judgment unit 1140 and the menu display area switching unit 115 are examples of a current position information display unit which displays, in a menu form in a predetermined area on the display screen, the information related to the current position not indicated in the map.

Next, the operation of displaying a map, according to the present invention equipped with the above-mentioned processing units will be described.

The partial map display area storage unit 103 and the partial map display position determination unit 105 perform control so that the traffic information related to the destination stored in the route storage unit 107, an optimal route to the destination, commercial information and route information are displayed using, for example, another window while scrolling the whole route.

Figure 4:
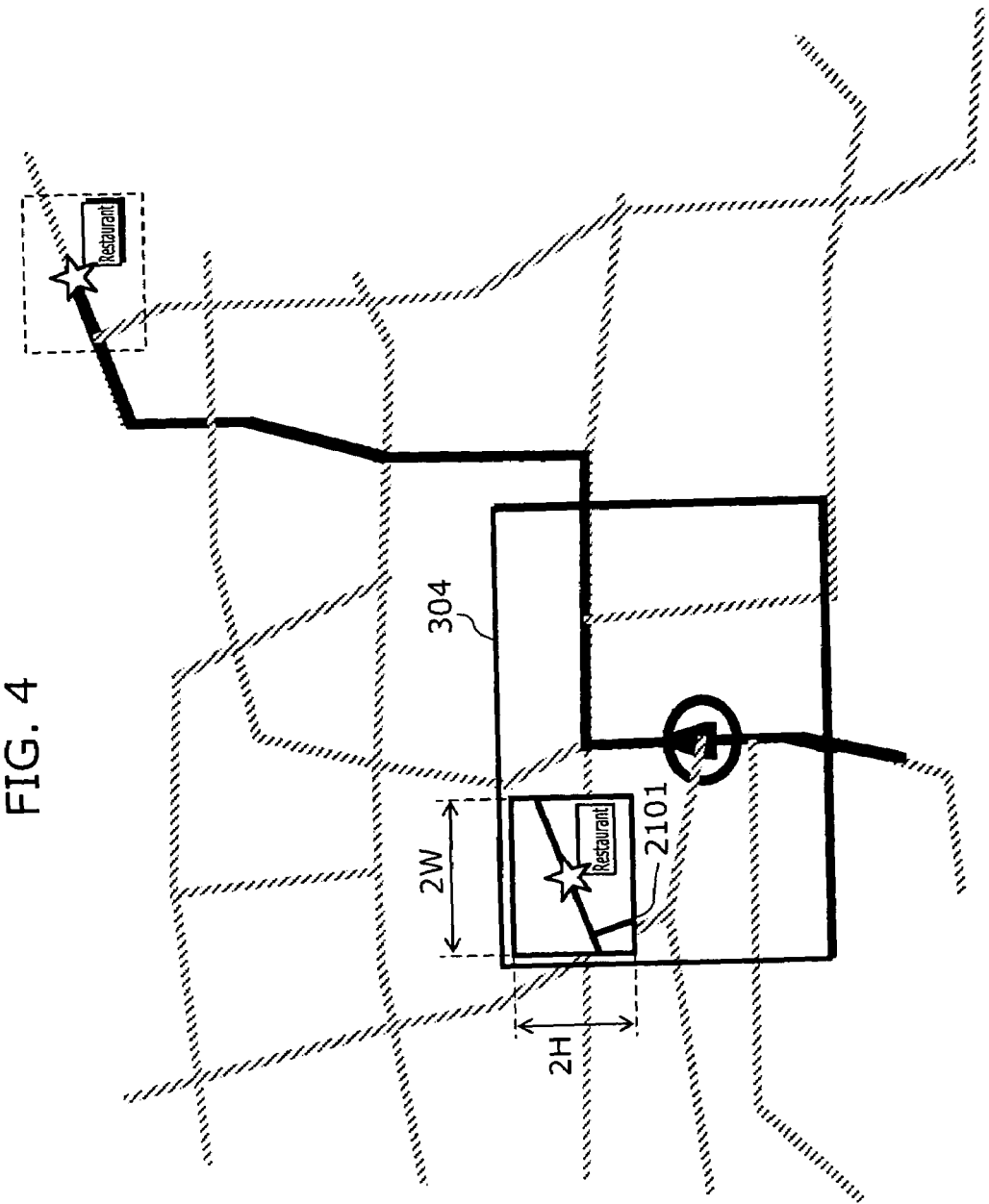
FIG. 4 is a diagram showing an example of a display in the case where another window is set in a fixed position on the current position display screen shown in FIG. 3 and a partial map is displayed therein.

In order to display the current position information including a current position of the user, traffic information related to the current position, commercial information and facility information, as well as route information (destination and route to a destination) in the display unit with limitation as such that is equipped in the car navigation system, it has been necessary to display an enlarged screen so as to display the whole route, or to pause the display of the current position information and scroll the route. With the former method, however, it is difficult for the user to get detailed information through the enlargement of the screen. With the latter method, the current information that the driver needs during the drive is prevented from being visible. Setting another window for the display of the information decreases the consistency between the window displaying the route information and the main screen displaying the current position information. In other words, when the periphery of the current position is displayed, the road on the main map cannot be joined with the road displayed in another window, which renders it difficult for the driver to view the road. There is also a risk of preventing the user from perceiving the information depending on the position in which the window is set. FIG. 4 is a diagram showing an example of a display in the case where another window is set in a fixed position on the current position display screen 304 shown in FIG. 3 and a partial map is displayed therein. For example, FIG. 4 shows an example (2101 in FIG. 4) in which a main screen is displayed in a current position area and a partial map being a periphery of "Restaurant" that is set as a destination further displayed in a predetermined size (e.g. 2W (width)×2H (height))in a predetermined position (e.g. upper left of the screen). When another window is set in a fixed position and the partial map is scrolled therein, consistency between the window and the main map cannot be assured. Note that, in the conventional example, another window is set within a display area on the map of the main screen and the partial map is displayed in the window. However, the screen of the window displays a still image, and the effects of the present invention of scroll displaying the information related to a route to a destination in the window cannot be obtained.

With the present invention, scroll displaying the route information by the partial map display area storage unit 103 and the partial map display position determination unit 105 without preventing the current position information enables the driver to easily perceive the route information.

In FIG. 3, 303 denotes the destination "Restaurant" that is set through the route setting, and 302 (black bold line) denotes an optimal route that is set in the search of optimal route. Note that, as for the search of a route to a destination, Dijkstra method or the like has conventionally been disclosed in various inventions, which is not to be questioned here. The map display device 100 stores, in the route storage unit 107, the route information such as the pre-set optimal route 302, the commercial information related to the destination "Restaurant", the traffic jam information related to the optimal route 302 and the information on complex intersections or the like. In the display of the partial map according to the present invention, such route information is displayed while the entire route is scrolled so as to track back from the destination to the current driving location.

On the other hand, the partial map display position determination unit 105 calculates base points, and the partial map screen (hereinafter to be referred to as "scroll screen") displayed through scrolling is scroll-displayed along the calculated base points. For example, the base points are calculated based on the intervals (e.g. sampling at intervals of 1 cm) to be scrolled on the route and the route information such as the map information of H cm high and W cm wide (i.e. a partial map is of 2H cm high, 2W cm wide), commercial information and traffic information are displayed in a scroll screen (310 in FIG. 3) with the base points in the center, for instance. Note that H and W may be determined by the number of dots of pixels. Hereinafter, these base points are defined as "scroll base points". The stars indicated by 311, 312, 313, 314, 315, . . . , 328 are the scroll base points calculated on the route.

The partial map display position determination unit 105 generates a scroll screen based on the calculated scroll base points. From (a) to (f) in FIG. 5 are diagrams showing an example of how the display screen of the car navigation system, which sequentially displays a scroll screen in a direction from the destination toward the current position. FIG. 6 is a diagram showing an example of each scroll screen in the case where the user has followed the optimal route 302 in a direction from the destination to the current position. As shown in FIG. 3, for example, when tracking the optimal route 302 from the destination restaurant 303 to the current position 301, a junction of three streets in "3 cho-me", "supermarket", "intersection on the main street", "2 cho-me Post Office", "Convenience Store", "1 cho-me Intersection", "Bookstore", "City Hall Bus Stop" and "City Hall" appears along the optimal route 302 in this order. 401 in FIG. 6 is a scroll screen generated as an area of H cm high (in a vertical direction) and W cm wide (in a horizontal direction) with the scroll base point 311 in the center (a scroll screen is of 2H cm high, 2W cm wide), and the periphery of a parking lot as facility information as well as the optimal route 302 are displayed in the scroll screen. The scroll screen 401 is displayed in the window that is set in the current position display screen, as shown in (a) in FIG. 5. Furthermore, a distance to the destination and a pre-scheduled arrival time are displayed as a part of the route information. In the scroll screen 401, a junction of three streets in "3 cho-me" is displayed in a direction from the destination restaurant 303 toward the current position.

Note that traffic information such as traffic jams may be displayed at the same time. In addition, commercial information such as recommended menu in the restaurant may be simultaneously displayed on the scroll screen. Due to the limitation imposed on the scroll screen such as an amount of information that can be displayed on the screen and a display screen, the contents to be displayed may be controlled depending on the level of importance with respect to a destination. Similarly, the scroll screen 402 is generated based on the scroll base point 312 while the scroll screen 403 is generated based on the scroll base point 313. The scroll screen 402 displays the partial map showing the area just after the junction of three streets in "3 cho-me" displayed in the scroll screen 401. The scroll screen 403 displays the partial map showing the optimal route 302 that curves downward in the south. The scroll screen 402 is displayed in the window that is set in the current position display screen, as shown in (b) in FIG. 5, whereas the scroll screen 403 is displayed in the window that is set in the current position display screen, as shown in (c) in FIG. 5. Thus, by displaying the scroll screens 401, 402 and 403 as needed for scrolling, the scroll screen is to be displayed in a direction from the destination restaurant 303 to the current position.

FIG. 7 is a diagram showing an example of the scroll screen which indicates a position that is the nearest to the current position in the case where the optimal route 302 is tracked back in a direction from the destination to the current position. In the same manner as in FIG. 6, the scroll screen 404 is generated based on the scroll base point 314, the scroll screen 405 is generated based on the scroll base point 315, and the scroll screen 406 is generated based on the scroll base point 316. The scroll screen 404 displays that "supermarket" is located in a position that is near the current position 301, compared with the scroll screen 403. In the scroll screens 405 and 406, "Main Street Intersection" and "2 cho-me Post Office" are displayed as landmarks. The scroll screen 404 is displayed in another window on the current position display screen shown in (d) in FIG. 5, the scroll screen 405 is displayed in another window on the current position display screen shown in FIG. 5(e), and the scroll screen 406 is displayed in another window on the current position display screen shown in FIG. 5(f). FIG. 8 is a diagram showing another example of the scroll screen which indicates a position that is nearer to the current position in the case where the optimal route 302 is tracked back in a direction from the destination to the current position. The scroll screen 407 is generated based on the scroll base point 317, the scroll screen 408 is generated based on the scroll base point 318, and the scroll screen 409 is generated based on the scroll base point 319. The scroll screen 407 shows that there is "Convenience Store". The scroll screen 408 shows that after passing "Convenience Store" on the scroll screen 407 there is an intersection in "1 cho-me", while the scroll screen 408 shows that "Bookstore" is displayed as a landmark located in a position near the current position from the intersection in "1 cho-me". FIG. 9 is a diagram showing another example of the scroll screen which indicates a position that is nearer to the current position in the case where the optimal route 302 is tracked back in a direction from the destination to the current position. Moreover, the scroll screen 410 is generated based on the scroll base point 320, the scroll screen 411 is generated based on the scroll base point 321, and the scroll screen 412 is generated based on the scroll base point 322. The scroll screen 410 shows that there is "Police Station" when further proceeding toward the current position from "Bookstore" indicated on the scroll screen 409 in FIG. 8. The scroll screen 411 shows that after passing "police station" on the scroll screen 410, "City Hall Bus Stop", while the scroll screen 412 shows that T intersection in which "City Hall" is located in a position nearer to the current position from "City Hall Bus Stop".

Note that two scroll screens are displayed based on the scroll base points 323 and 324 after the display of the scroll screen 412. Since the two scroll screens are the same as the scroll screens described above, descriptions and reference to the drawings will be omitted. As described above, the map display device 100 sequentially displays the scroll screens based on the scroll base points 311 through 323 on the optimal route 302 from the restaurant 303 that is a destination to the current position.

Note that 401 in FIG. 6 displays a distance to the restaurant and a pre-scheduled arrival time. However, a distance to a scroll base point and a pre-scheduled arrival time may be displayed instead, as shown in 403 in FIG. 6. In some cases, the driver may desire to know not only a distance and a time to the destination, but also a required time and a distance to reach a certain intersection. Therefore, by displaying such information at the same time when the screen is scrolled, it is possible for the driver to easily perceive the information. Moreover, it is possible to perceive an entire route and route information related to the route at the same time.

Meanwhile, the partial map display position determination unit 105 determines a position to display the scroll screen generated based on the scroll base point (hereinafter to be defined as "scroll screen display point"). The determination operation will be described with reference to a flowchart shown in FIG. 10 as well as FIGS. 11 and 12.

FIG. 10 is a flowchart showing an example of a procedure used for the calculation of a scroll screen display point carried out by the partial map display position determination unit 105. The route setting unit 109 sets a destination (Step S100), while the partial map display position determination unit obtains the destination, commercial information and facility information related to the destination, a route to the destination, and route information such as traffic information of the route via the map information storage unit 104, and further, from an information providing server via a network, and stores the obtained information into the route storage unit 107 (Step S101). The storage may be performed as needed when a screen is scroll-displayed. FIG. 11 is a diagram showing, on the map, the procedure for calculating a scroll screen display point. In FIG. 11, 301 denotes a user's vehicle position, and the current position information such as the pre-set optimal route 302 is displayed on the display screen (304 in FIG. 11). Next, the partial map display position determination unit 105 calculates scroll base points which are to be base points of the scroll display screen on the stored route (Step S102), and selects a scroll base point that is the nearest to the current position (Step S103). The stars in FIG. 11 are the scroll base points calculated by the partial map display position determination unit 105. In this case, the scroll base point 501 that is the nearest to the current position of the user's vehicle is selected.

Based on the selected scroll base point, the partial map display position determination unit 105 firstly judges whether the height exceeds a display area (H cm in the embodiment) on the main screen which displays the current position display area (Step S104). In the case where the height does not exceed the display area (No in Step S104), the partial map display position determination unit 105 then judges whether the width exceeds the display area (Step S105). If the width does not exceed the display area (No in Step S105), the partial map display position determination unit 105 judges whether there is the next scroll base point (Step S106), and in the case there is (Yes in Step S106), selects the next scroll point (Step S107). In repeating this process, in the case where the height exceeds H cm (Yes in Step S104), or in the case where the width exceeds W cm (Yes in Step S105), the partial map display position determination unit 105 goes back to the previous scroll base point and determines it to be the scroll screen display point, and displays the scroll screen of H cm high and W cm wide having the scroll screen display point in the center (Step S108). Meanwhile, in repeating the steps Step 104 to Step 107, in the case where there is no next scroll base point (No in Step S106), that is, in the case where a destination is displayed within the current position display screen, the partial map display position determination unit 105 does not need to display a scroll screen in another window, and thus does not generate a scroll screen (Step S109).

The description will be provided with reference to FIG. 11. Since the scroll base point 501 that is the nearest to the current position does not exceed the size of H cm high and W cm wide on the current position display screen 304, the partial map display position determination unit 105 selects the next scroll base point 502 and determines a display area in the same way (loop of steps S104 to Step 107). As the determination process further proceeds, the width W cm of the display area is exceeded in the case of the scroll base point 503 (Yes in Step S105). Then, the previous scroll base point 504 is determined as a scroll screen display point, and a scroll screen is displayed. FIG. 12 is a diagram showing an example of the scroll screen 601 displayed at the scroll screen display point on the current position display screen 304. In other words, a scroll screen 601 is displayed on the current position display screen (main screen that displays current position information) 304 using the above-mentioned method. The previous scroll base point which exceeds the display area is determined as a scroll screen display point, and a scroll screen of 2H high cm and 2W cm wide is displayed as a whole scroll screen. By using the display method according to the present invention, a scroll screen is displayed in a predetermined position (in a position prior to the position that exceeds the area) according to the current position display area (2H cm high and 2W cm wide in the embodiment).

In the case of using a terminal with limitation on a display screen, as used in the car navigation system, there is also a limitation on the amount of information that can be displayed and it is necessary to effectively use a screen. In the case of the car navigation system, on the other hand, it is important for the driver to perceive the information related to a current position such as a current position of the vehicle and a current travel route on the map. Accordingly, it is also necessary not to block the display of other information. By thus scroll displaying a destination and information on a route to the destination in another window, together with the current position information, the user can easily perceive the route information such as a destination, a route to the destination and traffic information related to the route, while perceiving the current position information. In addition, an effect of grasping the entire route is produced by scroll display.

Furthermore, according to the present invention, the display position of a scroll screen is located on the scroll screen display point calculated on the route. Also, the scroll screen display point is updated as needed, using the procedure described above, as the vehicle position moves. Therefore, in the case of scrolling the scroll screen by tracking back, for instance, from a destination to a current position, the map on the scroll screen is eventually displayed in such a manner that the map matches the map on the current position display screen 304.

FIG. 13 is a diagram showing an example of the scroll screen 901 displayed in various positions according to the position of the optimal route within the current position display screen 304. For example, in the case of FIG. 13, the scroll screen 901 is displayed in the upper right of the current position display screen 304 based on the scroll base points calculated on the route. Therefore, when the scroll base point returns from the destination "R" to the current position display area, the map of the current position display screen shall match the map displayed on the scroll screen. FIG. 14 is a diagram showing an example of the scroll screen 1001 displayed in various positions according to the position of the optimal route on the current position display screen 304. In the case of FIG. 14, the scroll screen 1001 is displayed in the lower right of the current position display screen 304, and when the scroll base point returns back, a partial map to be displayed match with the map on the current position display screen 304. FIG. 15 is a diagram showing an example of the scroll screen 1101 displayed in various positions according to the position of the optimal route on the current position display screen 304. In the case of FIG. 15, the scroll screen 1101 is displayed in the upper left so that the map of the scroll screen 1101 match with the map on the current position display screen 304 when the scroll base point returns back to the current position display screen 304.

When referring to the map of the car navigation system, the driver pays attention to whether or not new information such as traffic information related to a destination, or the like, is obtained. Therefore, by deriving scroll screen display points on the optimal route stored in the route storage unit 107, displaying a scroll screen on the route the driver takes (FIGS. 13, 14 and 15), and displaying the information that the driver might need, the driver can intuitively obtain the information and continue the smooth driving. In the case of displaying the information in the direction different from the direction of the destination, the information of the driver's inspiration, which renders it difficult for the driver to perceive the route to the destination at a glance.

In addition, by scroll displaying the entire route and displaying not only a route but also route information such as traffic information, it is possible to effectively use a display screen, display necessary information in a terminal with limitation on the amount to be displayed on the screen, as such that is used in the car navigation system or the like, so that the driver can perceive the information. Furthermore, by allowing the consistency between the scroll screen and the current position display screen, it is possible to change the display of the route information on the scroll screen as well as the display of the current position information such as the position of the driver's vehicle, without switching a large screen and without increasing the loads in driver's driving. Complex display of the information on the entire screen risks excessively attracting the driver's attention for reading the car navigation information. However, by calculating the scroll screen display points and displaying a scroll screen in a predetermined position (a position which is located on the travel route and does not prevent the current position information) on the screen, it is possible to reduce the movement of the driver's eye-point to minimum, which produces the effect of enhancing the visibility of the current position information and the information on the route to the destination.

<Movement of Current Position Display Screen>

Moreover, the display area determination unit 106 may move a current position display screen (main screen which displays current position information) and display a scroll screen. Hereinafter, the description will be provided with reference to FIGS. 16, 17 and 18. FIG. 16 is a diagram showing an example of a display of the current position display screen in the case of moving a display area of the current position display screen on the map according to the circumstances. In FIG. 16, 1401 denotes a current position display screen, and when it is attempted to display a scroll screen at the scroll screen display point on the screen 1401, there is a risk of displaying the scroll screen in a position near the current position of the vehicle. For example, as in the current position display screen 1401, in the case where many of scroll base points which are located nearer to the destination within the current position display screen 1401 are located in the periphery of the current position display screen 1401, and it is assumingly attempted to display a scroll screen of 2H cm×2W cm having these scroll base points in the center, the scroll screen shall get out of the upper edge of the current position display screen 1401. Therefore, as a result, the position of the scroll screen display point is determined to be the scroll base point that is the nearest to the present vehicle position in the direction of moving. In addition, in such a case, scroll screens have to be displayed with respect to many scroll base points, within the current position display screen 1401. Therefore, the scroll screen located directly in front of the present vehicle position is displayed for a relatively long time, and the scroll screen gets into the driver's sight when the driver desires to know the circumstances around the present vehicle position.

In contrast, the display area determination unit 106 can control a display area of the main screen having the present vehicle position in the center, without fixing the position of the screen. For example, the display area determination unit 106 can control the display areas 1402, 1403 and 1404. The display area determination unit 106 controls the display areas based on the scroll base points and also controls the display of the current position display screen so that the current position display screen and the scroll screen have consistency. FIG. 17 is a diagram showing an example of a display in the case where the current position display screen is moved so that the scroll screen display point is located in a suitable position on the current position display screen. FIG. 18 is a diagram showing an example of a display in the case where a scroll screen 1602 is displayed within the current position display screen 1601 which has been moved to the suitable position. For example, the current position display area 1501 is shifted to the upper right based on the scroll base point (FIG. 17), while the current position information is displayed and the scroll screen 1602 is displayed (FIG. 18). For example, the display area determination unit 106 changes the display area of the main screen in either of the following cases: (1) when the number of scroll base points located in the range from a destination to a current position display screen exceeds 10; (2) when the number of scroll base points located in the area from the edge of the destination side to the current position on the optimal route within the current position display screen is less than 2. Note that the values shall not be restricted to "10" in the case of (1) or "2" in the case of (2), and other values may be set. In addition, the display area determination unit 106 determines a display area of the main screen which has been changed, so that (1) the distance of the optimal route displayed within the current position display screen is the longest, (2) the number of landmarks such as intersections and stores located along the optimal route displayed within the current position display screen is the largest, or (3) the landmarks located along the optimal route are displayed within but near the boundary of the current position display screen. Note that the method for determining a display area of the main screen which has been changed is not limited to the above-mentioned method, and another method may be applied instead. With such control, it is possible to reduce the number of scrolling times, which enables the user to easily view the optimal route and the current position display screen.

In general, a driver greatly needs to perceive the current position information of the area in the direction of the destination, and further needs to simultaneously perceive the information on a route to the destination. According to the present invention, by displaying route information such as a destination and current position information in the direction of the destination, using scroll display, it is possible for the driver to easily perceive such information.

Note that scroll base points and scroll screen display points are set and scroll screens are displayed on the route. However, the present invention is not limited to this. The present invention includes all the conception that produces an effect of smoothly matching the route information with the current position information without complicating the driver's perception of the information when the route information is scroll-displayed and, for example, the route from the destination to the current position is tracked back.

<Storage of Optimal Route>

For instance, it may be defined that the route storage unit 107 stores an optimal route in a form, further stores it in an approximate form. When scrolling is performed, it may be defined that route information is scroll-displayed from a destination to a present vehicle position while tracking back the form and that a map on the optimal route matches a map on the scroll screen when the scroll screen returns to display the current position information on the main screen. Hereinafter, the description shall be provided with reference to FIGS. 19A and 19B. FIGS. 19A and 19B are diagrams respectively showing an example of a display of a form of an optimal route in the case where the optimal route is stored in an approximate form. 801 in FIG. 19A denotes "Restaurant" which is set as a destination by the route setting unit 109. An optimal route (802 in FIG. 19A) is calculated based on the destination "Restaurant" and is stored in the route storage unit 107. A scroll start point (803 in FIG. 19A) and a scroll end point (804 in FIG. 19A) are calculated based on the stored optimal route, and furthermore, a form of the route that connects these points is made approximate. For example, in the case of FIG. 19A, the route is approximate to a straight line (805 in FIG. 19A). The partial map display position determination unit 105 generates a scroll screen 807 indicating the route from the scroll start point 803 to the scroll end point 804 in an approximate form, and displays the current position display screen 806. Therefore, in the scroll screen 807, the optimal route from the scroll start point 803 to the scroll end point 804 is displayed in a straight line.

The scroll base points on the route are not stored from point to point, and thus the following effects can be produced: memory reduction; simplification in scrolling when a route gets more complicated; and driver's easy perception of a route.

<Scrolling Speed and Size of Scroll Screen>

Note that, according to the embodiment, predetermined values are set for the size of a scroll screen to be scrolled and a speed of scrolling. However, traffic jam information of the route, whether or not the vehicle nears an intersection,. and the information amount of commercial information may be controlled by route information.

The driver needs to perceive not only the entire route to the destination, but also the information necessary for taking the route to the destination, such as traffic jam information, an intersection at which an accident frequently occurs, a point at which it is difficult to change one's driving lane and commercial information of the area. FIGS. 20A and 20B are diagrams respectively showing an example of a display in the case where a scroll screen based on an important scroll base point is displayed larger than a scroll screen based on a normal scroll base point. For example, in the case where the scroll screen shifts to the vicinity of the ABC Intersection where the traffic is jammed, as shown in FIG. 20A, by enlarging the size of the scroll screen and reducing the scrolling speed, it is possible to allow the driver to easily perceive route information. For example, as in the vicinity near the ABC Intersection in FIG. 20A, in the case where a point at which the driver should be alerted is obtained by the route storage unit 107 and scroll base points are calculated, this point is determined as an important scroll base point. The right side in FIG. 20 shows a scroll screen displayed with respect to a normal scroll base point while the left side in FIG. 20 shows a scroll screen displayed with respect to an important scroll base point. The partial map display position determination unit 105, for instance, attaches a flag which indicates that the point is an important scroll base point on the coordinates indicating the important scroll base point, and stores the coordinates into the partial map display area storage unit 103. Thus, whether or not the point is an important scroll base point is discerned with reference to the flag at each scroll base point. When displaying an important scroll base point, it is possible to display the point in the screen size and at the scrolling speed which are different from those of the normal scroll base point. The important scroll base point 1701 (star in FIGS. 20A and 20B) is different from other scroll base points, and may be displayed larger (e.g. HA cm×WA cm obtained as a result of adding a predetermined value to a predetermined size of H×W), and at a lower speed.

<Scroll Display by Synchronizing Routes to Plural Destinations>

Note that, in the embodiment, a destination is set through destination setting; however, a destination may be predicted using a destination prediction unit or the like, and the predicted destination may be displayed on a scroll screen using the method as described above. In addition, in the case where plural destinations are derived, plural destinations and plural information on routes to the destinations may be displayed on plural scroll screens. Hereinafter the description shall be provided with reference to FIG. 21.

FIG. 21 is a diagram showing a sampling example of the scroll base point in the case where the numbers of samples of the scroll base points on the respective routes are synchronized so that the respective scrolls terminate at the same time on the respective routes for plural destinations. In other words, FIG. 21 shows that a destination 1 "Restaurant" and a destination 2 "supermarket" are derived later by the destination prediction unit. Note that the destination prediction method is disclosed as the conventional technology (e.g. Japanese Laid-Open Patent Application No. 2003-173145), and it is not to be questioned here. 1801 and 1802 in FIG. 21 are the scroll screens displayed on the current position display screen using the method based on the predicted destinations. By scroll-displaying the thus predicted destinations, it is possible for the driver to perceive in advance a destination as well as information on a route to the destination.

Note that in the case of scrolling a route to a destination, or in the case of scrolling by tracking back from the destination to a current position, the scroll timings of plural scroll screens may be synchronized by pressing an operational button. For example, in the case of FIG. 21, the destination 2 "supermarket" is located in a point nearer to the present vehicle position compared with the destination 1 "Restaurant". Therefore, when scrolling is performed in the same manner as above, timings to terminate the scrolling are not synchronized, and in some cases, this may render the driver's perception of the information difficult. By synchronizing the number of samples of the scroll base points so that the respective scrolling terminate at the same time in both of the destinations, or by controlling the speed, scrolling may be synchronized. Furthermore, by setting an area in which a signal which indicates that the scroll screen is touched can be inputted via a touch panel or the like, a destination is set only by touching a scroll display, or the like, and thus it is possible to reduce the number of complicate operations.

<Change in Range of Display Area>

Moreover, instead of changing the size of a display screen, a range of display area may be changed. FIGS. 22A and 22B are diagrams respectively showing the scroll screen having the important scroll base point 1701 in the center. For example, in FIGS. 22A and 22B, the size of a scroll display screen is 2H cm high and 2W cm wide. However, an area to be displayed is not limited to this, and the screen which is obtained by reducing the size of 3H cm high and 3W cm wide, which has the important scroll base point 1701 in the center, to the size of a normal scroll screen may be displayed (2301 in the left side of FIG. 22). Alternatively, the screen smaller than the size of H cm high and W cm wide of normal scroll display may be enlarged to show the details and displayed on the normal scroll screen of 2H cm high and 2W cm wide (2302 shown in the right side of FIG. 22).

<Synchronization Based on Arrival Time>

Note that respective scrolling may be synchronized based on an arrival time of the scroll base point. Hereinafter, the description will be provided with reference to FIG. 23.

FIG. 23 is a diagram showing an example in the case of synchronizing the scroll base points to be reached at the same time on the respective routes for plural destinations and scroll displaying the area up to these scroll base points. In FIG. 23, "Restaurant" is predicted as a destination 1 and "supermarket" is predicted as a destination 2, as in FIG. 21. Through the driver's operations such as button operation of "scroll display" or the like and voice input, the respective route information for the two destinations are displayed on the scroll screens 1902 and 1903 on the current position display screen 1901. Moreover, respective pre-scheduled arrival times of the scroll base points which are references for scrolling are also displayed at the same time. In this case, the pre-scheduled arrival time 11:50 for arriving at "ABC intersection" on the route to the restaurant is displayed. On the other hand, the point in which the driver will arrive at the same pre-scheduled arrival time 11:50 is displayed on the route to the supermarket. The scroll display may be thus performed by the synchronization based on the arrival time to reach the point. The driver needs to know not only a predicted destination but also route information to the destination, an elapsed time to a certain point on the route. By previously getting the information about the arrival time to a given passing point on the route, it is possible to support the driver, without any complicated operation, in encouraging the driver to select a destination or a passing point with the earlier arrival time.

<Display of Both of Selected Route and Detour>

Note that, in the above example, plural destinations are derived through destination prediction and plural scroll windows are displayed for the respective routes. However, in the case one destination is selected through destination setting and plural routes are derived, plural windows may be displayed as in the above-mentioned case. Hereinafter, the description will be provided with reference to FIG. 24.

FIG. 24 is a diagram showing an example of a scroll display using plural scroll screens in the case where plural routes are derived for one destination. 2001 in FIG. 24 denotes the destination "Restaurant" that is set through destination setting. The route storage unit 107 calculates a route to the restaurant. In this case, plural routes such as a main route (route 2002 in FIG. 24) and a detour (route 2003 in FIG. 24) are derived as routes, and route information and traffic information of the respective routes are stored in the route storage unit 107. Through the partial map display area storage unit 103 and the partial map display position determination unit 105, scroll display is performed using the above-mentioned method. 2004 in FIG. 24 denotes a scroll screen in the case where the driver drives the route 2002 and scrolls the screen in the direction from the current position toward the destination. The screen 2004 shows that the vehicle is scheduled to arrive near ABC intersection at 11:50 after passing 10 minutes from the present time 11:40, and also displays traffic information indicating that the traffic is jammed near ABC intersection. On the other hand, the scroll screen of the route 2003 scroll displays the vicinity of the point at which the vehicle will arrive at 11:50.

Thus, in the case of scrolling the screens in the direction from the current position to the destination for the respective routes 2002 and 2003, respective pre-scheduled arrival times are simultaneously displayed on the routes. Therefore, for example, it is possible to know a route to and an arrival time at a predetermined point in the respective cases of taking a main road and of taking a detour. Thus, it is possible to allow the driver to easily get the information beforehand without complicate operations such as that required for avoiding traffic jams or the like.

<Touch Panel>

Note that, according to the embodiment, the scroll screen display points are used as the base points for displaying scroll screens; however, they may be used for the operation for scroll display using the base points.

It is surely not preferable that the driver performs complicated operation using a remote controller of a mobile terminal in the car navigation system or the like. Even during the stop, it is troublesome for the driver to perform complicated operations. On the other hand, in the case of using a touch panel, a cursor indicating an operation candidate needs to be displayed on the screen, and there may be a risk of blocking the current position information when plural operation candidates are displayed in a restricted display area in the car navigation system or the like. Therefore, the calculated scroll screen display points may be used in the operation of scroll display by a display unit such as a touch panel. Hereinafter, the description will be given with reference to FIGS. 25A and 25B.

FIGS. 25A and 25B are diagrams respectively showing an example of an input area in the case of defining a peripheral area of the scroll screen display point on the current position display screen as an area for inputting a scroll display start instruction. 2101 in FIG. 25A denotes a scroll screen display point calculated by the partial map display position determination unit 105 based on the route information of the route to the supermarket pre-set as a destination. In this case, a scroll display is triggered by user's operation such as "scroll display" in the embodiment. However, in the case of touch panel, a certain area that is based on the scroll screen display point, for example, an area within a circle whose radius is R dot having the scroll screen display point in the center is touched, the area may be scroll displayed. An area that can be operated through a touch panel is an area within a circle whose radius is R dot having the scroll base point 2101 shown in FIG. 25A in the center. The scroll screen display point is always calculated on the route to the destination within a predetermined range (the previous size before passing W dot wide and H dot high) using algorithm, so that the scroll screen display point shall be always located near the edge of the screen on the route to the destination. In other words, in the need of information on the route to the destination, the information on the route is displayed simply by touching the edge of the screen in the direction of destination, which allows the driver to easily perceive the necessary information without complicated operations. Here, a circular area is defined as an input part via a touch panel; however, the form of the area which bases the scroll screen display point is not limited to circular and it may be rectangular or oval.

FIG. 26 is a block diagram showing a configuration of a map display device 100 in the case where the map display device 100 is configured of an operation input unit 116 such as a touch panel. The operation input unit 116 is a unit which receives operational input from the user. In the case of touch panel, the coordinates of a part of the screen touched by the user shall be received. The valid input judgment unit 117 is a unit which refers to the coordinates received by the operation input unit 116, and judges whether or not the coordinates are located in a valid range. The valid input judgment unit 117 refers to the coordinates of the scroll base point calculated by the partial map display area storage unit 103, and calculates a predetermined valid range. In the case where the operation is performed within the valid range, the partial map display control unit 118 controls the display of a scroll screen and the scroll screen is displayed. FIGS. 27A and 27B are diagrams illustrating a control to display a scroll screen in the case where a user's operational input is performed within a valid range. The description will be given with reference to FIGS. 27A and 27B.

2101 in FIG. 27A denotes a calculated scroll screen display point. Then, the coordinates of the scroll screen display point 2101 are obtained. Assuming that the coordinates are expressed by setting an upper left corner of the screen as an origin, and a horizontal line presents an X coordinate and a vertical line presents a Y coordinate (unit is pixel for example). In this case, the scroll screen display point 2501 is defined to be positioned in the $150^{th}$ pixel on the X coordinate and the $120^{th}$ pixel on the Y coordinate. In addition, an area which validates user's operation is set within the range of a radius of 100 pixels having the scroll screen display point 2501 in the center.

On the other hand, it is assumed that the point located in the $150^{th}$ pixel on the X coordinate and in the $120^{th}$ pixel on the Y coordinate is pressed by the operation input unit 116. The valid input judgment unit 117 judges that the operation is valid since the point within the valid area is pressed, and displays a scroll screen.

<Start Scroll Display Based on Route Information Obtained as Needed>

Note that the screen is not only scroll-displayed by the user's operation, but may be also controlled according to the route information that is obtained as needed. For example, in the case where the condition of the road changes in traffic information which is one of the route information and new information is obtained, the screen may be scroll-displayed based on the new information. The description will be provided with reference to FIGS. 28A and 28B.

FIGS. 28A and 28B are diagrams respectively showing an example of a scroll display in the case where traffic information or the like is updated in relation to the scroll base point on the route the vehicle is taking. 2401 in FIGS. 28A and 28B denotes one of the scroll base points. The route storage unit 107 stores route information, that is, a route, traffic information related to the route and the like, and updates the information as needed. Here, assumed that traffic information indicating "3 km traffic jam near ABC Intersection" is newly obtained. Since the scroll base point 2401 is also a base point for displaying the area around ABC Intersection, the scroll screen showing the area around "ABC Intersection" may be displayed using the scroll display according to the present invention, so that the scroll screen is scrolled down to the current position, for instance. Also, when the route information is obtained while the optimal route on the destination side from the scroll base point 2401 is being scroll-displayed, the scroll base point 2401 may be set as an important scroll base point so that the scroll screen based on the scroll base point 2401 is enlarged or slowly scrolled or paused for a predetermined time (e.g. 3 seconds) for display.

The driver needs to get not only the information on a destination, but also the information related to a route to the destination. For example, in the case of obtaining new information such as traffic information of the route to the destination, it is possible to let the driver perceive the information in advance, by automatically scroll displaying the screen as shown in FIGS. 28A and 28B.

With the mobile terminal used in a car navigation system or the like, the user needs to get not only the information related to a current position, but also the route information related to a destination and a route to the destination. For example, by previously knowing a destination, opening hours and lunch time of a restaurant, for instance, the user can get other business done by dropping in at another place, or by getting the traffic jam information of the route to the destination, the user may be alerted to take a detour.

In contrast, in a terminal with limitation on a screen, as used in the car navigation or the like, it is difficult to display all the information. Scrolling the route information by switching between the screens may cause the problem of blocking the current position information. By using the route display according to the present invention, it is possible to let the driver easily perceive the route information without complicated operation. In addition, setting a display position on the route of destination of which the driver is always conscious is effective for the driver's easier perception of the information. Furthermore, reversely scrolling the screen in the direction from the destination to the current position and displaying the route information in such a manner to correspond with the current position information, it is possible for the driver to concentrate on the task of driving smoothly without being confused by switching of the screens.

Second Embodiment

In the first embodiment, it is shown that a display position for displaying a scroll screen on a current position display screen is controlled and route information or the like can be perceived easier. To be more precise, it is controlled so that the partial map display area storage unit 103 generates a scroll screen within a predetermined area based on a scroll base point, and the partial map display position determination unit 105 calculates a scroll screen display point and displays it on the current position display screen. Thus, when the scroll screen is scrolled, the map on the scroll screen matches the map on the current position display screen, and the driver can easily perceive the route information while easily getting the information on the current driving.

Moreover, the first embodiment shows that the size and the reduction scale of the generated scroll screen can be changed, and it is also possible to control the form of the scroll screen. With a mobile terminal used in the car navigation system or the like, the size of the screen is limited and the amount of information that can be displayed is also restricted. In the case of the car navigation system, there is a high need to get the route information while getting the current position information which is information related to current driving. Therefore, by controlling the form and the size of the scroll screen according to the route information, it is possible to smoothly provide the necessary information.

Therefore, in the present embodiment, the method for controlling the size, reduction scale and form of a scroll screen shall be described with reference to the drawings.

FIG. 29 is a block diagram showing a configuration of the map display device which controls the form of the scroll screen. The same referential marks are provided for the components indicated in the first embodiment and the description is omitted.

The current position detection unit 101, the current position storage unit 102 are, as in the first embodiment, units which detect a user's current position and stores the detected latitude longitude information. The route setting unit 109 sets a destination or the like, the route calculation unit 108 calculates a route to the pre-set destination and the route storage unit 107 stores the calculated route, as in the first embodiment. The map information storage unit 104 is a unit which stores map information, as in the first embodiment. A display area of the current position display screen is determined by the display area determination unit 1061 using the map information, the detected current position, the calculated route to the destination and the like, and is displayed by the display unit 110 under the control of the display control unit 2901.

In FIG. 30, an area indicated by a rectangular in black bold is a current position display screen. The map shows the current position display screen displaying the detected user's current position, the pre-set route to the destination and the like.

Note that, in the first embodiment, the control on the display of the two screens of the current position display screen and the scroll screen is performed by the display area determination unit 106 (FIG. 2). However, according to the first embodiment, a display control unit 2901 is newly equipped and the display control of the two screens shall be performed by the display control unit 2901.

The route base point calculation unit 1111 is a unit which calculates a scroll base point at predetermined intervals (e.g. interval of 10 dots) on the route set by the route setting unit 109. The base point coordinates obtainment unit 1112 is a unit which obtains coordinate information of the calculated scroll base points, for instance, the coordinates represented by latitude and longitude or the like. In the first embodiment, the calculation of these scroll base points is performed by the route calculation unit 108. In the present embodiment, the route base point calculation unit 1111 and the base point coordinates obtainment unit 1112 are newly equipped, and the route base point calculation unit 1111 calculates scroll base points and the base point coordinates obtainment unit 1112 obtains the coordinates.

FIG. 30 is a diagram illustrating an example of the route that is scroll-displayed along with the control on the form of the scroll screen. FIG. 30 is a current position display screen that displays user's current position information or the like, as in FIG. 3. The pre-set route is indicated in black bold while the scroll base points which are calculated at predetermined intervals are indicated by stars (scroll base points 3201 through 3215) on the route. The base point coordinates obtainment unit 1112 obtains the coordinates of these scroll base points. Note that the map information includes form points indicating a form of a route, and such a form point generally has a value which can identify the position such as latitude-longitude coordinates and x-y coordinates on the screen. In the present embodiment, it is assumed that the map information is stored in the form of, for instance, latitude-longitude coordinates, and the coordinates of a scroll base point is obtained by the latitude-longitude information.

The partial map form calculation unit 1121 is a unit which calculates a form of a scroll screen using a set of coordinates of the scroll base points. In the first embodiment, an area of a scroll map to be generated shall be a predetermined area of, for instance, H dots vertical W dots horizontal with a scroll base point in the center. In the present embodiment, a form of the route or the like is taken into consideration and the form of a scroll screen is controlled. Here, scroll base points are used in order to take the form of the route into account.

Moreover, a scroll screen is generated based on the form calculated by the partial map generation unit 1022, a scroll screen display point is calculated by the partial map display position determination unit 105, and a current position display screen is displayed.

Note that, in the first embodiment, the generation of a scroll map is performed by the partial map display area storage unit 103 and the partial map display position determination unit 105. In the present embodiment, however, a partial map generation unit 1122 is newly equipped, and a scroll map shall be generated by the partial map generation unit 1122 and stored by the partial map display area storage unit 103.

In order to determine the position to display the scroll screen stored in the partial map display area storage unit 103, the partial map display position determination unit 105 calculates a scroll screen display point and displays the scroll screen on the current position display screen. Note that, in the first embodiment, the partial map display position determination unit 105 determines the coordinates of a display position (i.e. scroll screen display point) with reference to the current position display screen under the control of the display area determination unit 106. Then, the display unit 110 performs display using the determined scroll screen display point under the control of the display area determination unit 106. In the present embodiment, however, a display control unit 2901 is newly equipped, and display is performed by the display unit 110 using the determined scroll screen display point under the control of the display control unit 2901.

Hereinafter, the calculation and generation of the form of the scroll screen shall be described with reference to FIGS. 31, 32 and 33.

FIG. 31 is a diagram showing an example of the control on the form of the scroll screen scroll-displayed from the destination, which has the scroll base point on the route in the center. The scroll base point 3201 in FIG. 31 is a scroll base point that is the nearest to the pre-set destination "Restaurant". For example, in the case of reverse-scrolling from the destination, the scroll base point 3201 shall be a starting point of the scroll. Accordingly, the partial map form calculation unit 112 calculates a form of the scroll screen based on the scroll base point 3201, and then, the partial map generation unit 1122 generates a scroll screen.

In the case where a scroll base point serves as a starting point, a scroll screen is generated, defining a partial map area to be the size of H dots vertical and W dots horizontal having the scroll base point in the center, as in the case of the first embodiment. In FIG. 31, a scroll screen 3301 of the size of H dots high and W dots wide having the scroll base point 3201 in the center is generated.

Next, assume that a scroll base point is forwarded by one point (in the case of reverse-scrolling, by one point nearer to the current position). In other words, a scroll screen shall be generated based on the scroll base point 3202. In this case, the partial map form calculation unit 1121 does not calculate a display area of the scroll screen in taking only the scroll base point 3202 into consideration, but generates a scroll screen in taking the forward and backward scroll base points into consideration. For example, in the case of the scroll base point 3202, the forward scroll base point 3201 and the backward scroll base point 3203 are considered in the generation of a scroll screen. As a result of considering the scroll base points 3201 and 3203, a scroll screen 3302 of Y1 dots vertical and X1 dots horizontal is generated. Likewise, a scroll screen 3302 of Y2 dots vertical and X2 dots horizontal is generated as a result of considering the forward scroll base point 3202 and the backward scroll base point 3204. The generation of the scroll screen shall be described in detail with reference to FIG. 32.

FIG. 32 is a detailed diagram showing a method for generating a scroll screen 3302 based on the scroll base point 3202 shown in FIG. 31. The base point coordinates obtainment unit 111 obtains the coordinates of each scroll base point based on latitude-longitude information. The coordinates of the scroll base point 3202 is defined as longitude 135 degrees 25 minutes 28 seconds east and latitude 35 degrees 33 minutes 20 seconds north. The coordinates of the forward (i.e. to the restaurant side) scroll base point 3201 is longitude 135 degrees 25 minutes 38 seconds east and the latitude 35 degrees 33 minutes 30 seconds north. The coordinates of the backward (i.e. to the current position side) scroll base point 3203 is the longitude 135 degrees 25 minutes 21 seconds east and the latitude 35 degrees 33 minutes 10 seconds. A scroll screen is generated based on the coordinates of each of the base points. For example, in the present embodiment, it is assumed that a scroll screen shall be formed in a rectangular shape by adding 5 seconds in both latitudinal and longitudinal directions so as to include the forward and backward scroll base points.

Firstly, with reference to the center scroll base point 3202, the forward scroll base point 3201 and the backward scroll base point 3203, the largest coordinates and the smallest coordinates of the three are calculated. Then, a rectangular formed by adding 5 seconds to the latitudinal and longitudinal directions is derived.

In the case of FIG. 32, the largest coordinates with regard to latitude is the latitude 35 degrees 33 minutes 30 seconds north of the scroll base point 3201 and the smallest coordinates is the latitude 35 degrees 33 minutes 10 seconds north of the scroll base point 3203. Accordingly, a screen shall be generated by defining, as an area of Y1 dots in a vertical direction of the scroll screen, a range from the latitude 35 degrees 33 minutes 5 seconds north of the scroll base point obtained as a result of subtracting 5 seconds from the latitude 35 degrees 33 minutes 10 seconds north to the latitude 35 degrees 33 minutes 35 seconds north obtained as a result of adding 5 seconds to the latitude 35 degrees 33 minutes 30 seconds north.

With regard to longitude, the longitude 135 degrees 25 minutes 38 seconds east of the scroll base point 3201 is the largest and the longitude 135 degrees 25 minutes 21 seconds east of the scroll base point 3203 is the smallest. Accordingly, a screen shall be generated by defining, as an area of X1 dots in a horizontal direction of the scroll screen, a range from the longitude 135 degrees 25 minutes 16 seconds east obtained as a result of subtracting 5 seconds from the longitude 135 degrees 25 minutes 21 seconds east to the longitude 135 degrees 25 minutes 43 seconds east obtained as result of adding 5 seconds to the longitude 135 degrees 25 minutes 38 seconds east.

Thus, by taking the forward and backward as well as center scroll base points, it is possible to calculate the form of the scroll screen according to the route. FIG. 33 is a diagram showing another example of the control on the form of the scroll screen scroll-displayed from the destination, which has the scroll base point on the route in the center. In other words, the example shows that the scroll further continues and a scroll screen is generated based on the scroll base points 3205, 3206 and 3207. In the case of the scroll base point 3205, a scroll screen 3501 of Y3 dots vertical and X3 dots horizontal is generated, taking the forward scroll base point 3204 and the backward scroll base point 3206 into consideration. Likewise, in the case of scroll base point 3206, a scroll screen 3502 of Y4 dots vertical and X4 dots horizontal is generated, taking the scroll base points 3205 and 3207 into consideration. In the case of the scroll base point 3207, a scroll screen 3503 of Y5 dots vertical and X dots horizontal is generated, taking the scroll base points 3206 and 3208 into consideration.

In the case of the scroll base points shown in FIG. 31, the route is relatively long in east-west direction (horizontally long route), so that a scroll screen is automatically generated in a horizontally long form. On the other hand, in the case of the scroll base points shown in FIG. 33, the route is relatively long in south-north direction (vertically long route), a scroll screen is automatically generated in a vertically long form.

In scroll displaying a route to the destination, or the like, the information required by the user is, in many cases, turning of left and right at the intersection, the distance to be driven straight, or the information related to the form of the route such as what kind of route to take. It is therefore preferable that the route on the scroll screen is displayed in its entirety so that the route as a whole can be looked over. In the case of the car navigation system, the driver needs to get not only the information related to a route but also the information related to a current driving; therefore, it is not preferable if the scroll screen is occupied with a great amount of information. By controlling the form of the scroll screen according to the route, using the scroll base points calculated on the route, as shown in the present invention, it is possible to display the current position display screen as well as the scroll screen. In the case where the route is relatively long in the east-west direction, it is possible to display a horizontally long scroll screen. In the case where the route is relatively long in the south-north direction, it is possible to display a vertically long scroll screen. Thus, even in such cases, it is possible to display the current position display screen and the scroll screen at the same time.

The partial map display position determination unit 105 is a unit which calculates a scroll screen display point which is a display position in the case of displaying the scroll screen generated as described above on the current position display screen. The calculation of the scroll screen display point shall be performed, for example, starting from the base point that is the nearest to the present point, as in the first embodiment. Note that a display area is derived as a fixed value of 2H dots high and 2W dots wide in the first embodiment. In the present embodiment, the form of the screen is variable as described above, and a scroll screen display point shall be calculated by taking the form of the scroll screen into consideration.

FIG. 34 is a diagram illustrating the calculation of a display point of the scroll screen on the current position display screen. Here, the scroll screen display point in the case where the form of the scroll screen is variable is shown. In FIG. 34, a scroll screen 3302 of Y1 dots vertical and X1 dots horizontal having the scroll base point 3202 in the center is generated by taking the forward backward scroll base points into consideration. The partial map display position determination unit 105 considers the form of the scroll screen of Y1 dots vertical and X1 dots horizontal, and calculates a scroll screen display point. As in the case of the first embodiment, the judgment is performed onto the scroll base points 3601, 3602, 3603, 3604 and 3605 in the order nearest to the present point. At the scroll base point 3606, Y1 horizontal is exceeded so that the scroll base point 3605 becomes a scroll screen display point.

FIG. 35 is a diagram illustrating the scroll display operation which involves the form control on the scroll screen. In other words, the diagram shows the current position display screen in which a scroll screen is sequentially displayed. The scroll screens generated so as to reversely track the route from the destination "Restaurant" are displayed in the order of the current position display screens (a), (b), (c) and (d). In the current position display screen (a), a partial map display area including the periphery of the destination "Restaurant" is displayed on the scroll screen, while in the current position display screen (b), a partial map display area with "3 cho-me" in the center, for example, is displayed on a horizontally long scroll screen. Then, in the current position display screen (c), a partial map display area that goes southward via "Supermarket" and "Main Street Intersection" is displayed in a vertically long scroll screen. Moreover, in the current position display screen (d), a partial map display area along the route that goes southward from "Bookstore" to "City Hall Bus Stop" and that takes right at the corner where "City Hall" is located is displayed in a vertically long scroll screen. Thus, it is shown that the form of the scroll screen is controlled according to the base point. In this way, it is possible for the driver to perceive the information related to a route on the scroll screen without the visibility of the current position and the information related to the preset location being blocked. In addition, the position at which the scroll screen is displayed is automatically controlled, and furthermore, in the current position display screen (d), scroll base points are calculated on the route and a scroll screen is generated based on the calculated scroll base points so that a scroll screen display point is calculated, the driver can see that the map on the current position display screen and the map on the scroll screen match when returning to the screen indicating the current position.

The operation according to the present embodiment shall be provided with reference to the flowcharts shown in FIGS. 36 and 37. FIG. 36 is a flowchart showing a procedure for scroll displaying a partial map having a scroll base point on the route in the center on a scroll screen within the current position display screen. FIG. 37 is a flowchart showing a procedure for controlling the form of the scroll screen (i.e. partial display area). In the present embodiment, the process from the setting of a route (Step S100) until the calculation of scroll base points (Step S102) is as same as the process described in the first embodiment. The route setting unit 109 such as a touch panel or the like sets a destination (Step S100), obtains the destination and route information related to the destination from the map information storage unit 104 and stores the obtained information into the route storage unit 107 (Step S101).

Next, scroll base points are calculated on the stored route (Step S102). FIG. 33 shows a current position display screen which shows a user's current position or the like. Also, a pre-set destination "Restaurant" and a route to the destination are shown. Moreover, the calculated scroll base points are indicated by stars. In the present embodiment, the form of a scroll screen is calculated using the scroll base points, and a scroll screen is generated.

Then, the base point coordinates obtainment unit 1112 obtains a set of coordinates of the scroll base points (Step S201). The partial map form calculation unit 112 then generates a scroll screen of each of the scroll base points (Step S202).

According to the present embodiment, a scroll screen is generated in consideration of the coordinates of a center scroll base point as well as coordinates of forward and backward scroll base points.

Firstly, a flag is set at the scroll base point that is the nearest to the destination (Step S301). In the case of FIG. 31, a flag is set at the scroll base point 3201 that is the nearest to the destination "Restaurant". Then, whether or not the scroll base point at which the flag has been set is a starting point of scroll is judged (Step S302). Since the scroll base point 3201 is the destination being the starting point of the scroll (Yes in Step S302), the width of a partial display area is determined to a standard size of W dots (Step S303), while the height is determined as a standard size of H dots (Step S304). Note that a flag is to be set at the next scroll base point for the generation of the next scroll screen (Step S312). Then, in the generation of the next scroll screen, the flag that has been set at the next scroll base point is referred to instead that the process proceeds to Step S301.

The flow of calculating a scroll screen display point using the width and height of the partial display area calculated by the partial map form calculation unit 1121 is as same the flow described in the first embodiment.

The scroll base point that is the nearest to a current position is selected (Step S103). Then, whether or not the height exceeds a display area Y (H dots in this case) on a current position display screen which displays a current position display area is judged based on the selected scroll base point (Step S203). In the case where the height does not exceed the display area Y (No in Step S203), whether or not the width exceeds the display area is judged (Step S204). In the case where the width does not exceed the display area (No in Step S204), whether or not there is the next scroll base point is judged (Step S106), and in the case there is (Yes in S106), the next scroll point is selected (Step S107). In repeating this procedure, in the case where the height in the vertical direction exceeds Y dots (H in this case) (Yes in Step S203), or in the case where the width in the horizontal direction exceeds X dots (W in this case) (Yes in Step S204), the process is shifted back to the previous scroll base point, the previous scroll base point is determined to be a scroll screen display point, and a scroll screen of Y dots high and X dots wide having the scroll screen display point in the center is displayed (Step S108). On the other hand, in repeating the Steps S104 through S107, in the case where there is no next scroll base point (No in Step S106), that is, in the case where the destination is displayed on the current position display screen, there is no need to display a scroll screen in another window; therefore, a scroll screen is not generated (Step S109). By performing the sequence of the steps for each scroll screen, the scroll screen generated in a predetermined form (height Y, width X) in consideration of the base points is to be displayed in a predetermined position having the scroll screen display point in the center.

Here, the focus moves to the next scroll screen, and the display of the scroll screen having the scroll base point 3202 in the center, as shown in FIG. 34, shall be described with reference to the flow. The process from the setting of a route (Step S100) until the calculation of the scroll base points (Step S102) is as described above.

Next, the base point coordinates obtainment unit 1112 obtains the coordinates of a scroll base point (Step S201). The partial mal generation unit 1122 generates a scroll screen of the scroll base point 3202 (Step S202).

In the loop process as described above, since a flag is set at the scroll base point 3202, whether or not the scroll base point at which the next flag has been set is a starting point of scroll, or in other words, a destination or a current position, is judged (Step S302). As the scroll base point 3202 is not the destination being the starting point of the scroll (No in Step S302), the coordinates of the scroll base point 3201, which is prior to the scroll base point 3202 at which a flag has been set, are referred to (Step S305). Then, the coordinates of the following scroll base point 3203 are referred to (Step S306). Also, the coordinates of the scroll base point 3202 are referred to (Step S307). Of the three scroll base points, the largest value and the smallest value of Y coordinate are calculated (Step S308). In addition, the largest value and the smallest value of X coordinate out of the three scroll base points are calculated (Step S309). The value obtained by adding an allowable range α (5 seconds in the present embodiment) to the value obtained by subtracting the smallest Y coordinate from the largest Y coordinate is calculated as the height Y of a partial display area (Step S310). Likewise, the value obtained by adding an allowable range α to the value obtained by subtracting the smallest X coordinate from the largest X coordinate is calculated as the width X of the partial display area (Step S311). Note that a coefficient β used in the calculation of the height Y and the width X in Steps S310 and S311 presents a scale for converting the height Y and the width X which are calculated as coordinate values in accordance with the size of the display unit (i.e. a screen of the car navigation system) of the map display device. For example, β=1 in the case where the coordinate values expressed by latitude and longitude can be represented by the number of dots.

In the case of FIG. 32, the latitude 35 degrees 33 minutes 30 seconds north of the scroll base point 3201 is the largest and the latitude 35 degrees 33 minutes 10 seconds north of the scroll base point 3203 is the smallest. Accordingly, a screen is generated by defining, as an area of vertical Y1 dots of the scroll screen, an area ranged from the latitude 35 degrees 33 minutes 5 seconds north obtained as a result of subtracting 5 seconds from the latitude 35 degrees 33 minutes 10 seconds north to the latitude 35 degrees 33 minutes 35 seconds north obtained by adding 5 seconds to the latitude 35 degrees 33 minutes 30 seconds north.

As for the longitude, the longitude 135 degrees 25 minutes 38 seconds east of the scroll base point 3201 is the largest and the longitude 135 degrees 25 minutes 21 seconds east of the scroll base point 3203 is the smallest. Accordingly, a screen is generated by defining, as an area of horizontal X1 dots of the scroll screen, an area ranged from the longitude 135 degrees 25 minutes 16 seconds east obtained as a result of subtracting 5 seconds from the longitude 135 degrees 25 minutes 21 seconds east to the longitude 135 degrees 25 minutes 38 seconds east obtained by adding 5 seconds to the longitude 135 degrees 25 minutes 43 seconds east.

The flow of calculating a scroll screen display point using the width X and the height Y of the partial display area calculated by the partial map form calculation unit 1121 is as same as the flow described in the first embodiment.

The scroll base point that is the nearest to a current position is selected (Step S103). Then, whether or not the height exceeds a display area Y (Y1 dots in the case of FIG. 32) on a current position display screen which displays a current position display area is judged based on the selected scroll base point (Step S104). In the case where the height does not exceed the display area Y (No in Step S104), whether or not the width exceeds the display area is judged (Step S105). In the case where the width does not exceed the display area (No in Step S105), whether or not there is the next scroll base point is judged (Step S106), and in the case there is (Yes in S106), the next scroll point is selected (Step S107). In repeating this procedure, in the case where the height in the vertical direction exceeds Y dots (Y1 in the case of FIG. 32) (Yes in Step S104), or in the case where the width in the horizontal direction exceeds X dots (X1 in the case of FIG. 32) (Yes in Step S105), the process is shifted back to the previous screen base point, the previous screen base point is determined to be a scroll screen display point, and a scroll screen of Y dots high and X dots wide having the scroll screen display point in the center is displayed (Step S108).

FIG. 35 shows displays of the scroll screens generated in respective forms on the current position display screen. The reduction scale of the map on the scroll screen is as same as the reduction scale of the map on the current position display screen so that the map on the scroll screen matches the map on the current position display screen when the scroll screen displays the present point as shown in the current position display screen (d).

(Variation 1)

Note that the form of a scroll screen is changed as needed using scroll base points. For example, by taking the forward and backward scroll base points into consideration, when the scroll base points extend relatively long in a horizontal direction, the form of the scroll screen is shaped in a horizontally long form. Thus, the minimum space can be retained for the scroll screen and the driver can get a route to a destination or the like while perceiving the current position display screen. However, in some cases, it might be difficult to perceive the route due to the change in the form of the scroll screen. The variation therefore describes an example of determining the form of a scroll screen depending on a route to a destination and a scrolling direction so that scroll is performed in that form.

FIG. 38 is a block diagram showing a detailed configuration of the partial map form calculation unit shown in FIG. 29. The partial map form calculation unit 1121 is a unit which calculates a form of a scroll screen. In the variation, the partial map form calculation unit 1121 is further configured of a current position coordinates reference unit 1123, a destination coordinates reference unit 1124 and a partial map aspect ratio calculation unit 1125.

The current position coordinates reference unit 1123 is a unit which refers to the coordinates of the scroll base point that is the nearest to a current position among the calculated scroll base points. The destination coordinates reference unit 1124 is a unit which refers to the coordinates of the scroll base point that is the nearest to a destination among the calculated scroll base points. The partial map aspect ratio calculation unit 1125 is a unit which calculates a form of a scroll screen using the scroll base points referred to by the current position coordinates reference unit 1123 and the destination coordinates reference unit 1124. Hereinafter, the detailed description will be given with reference to the drawings.

FIG. 39 is a diagram showing an example in the case where the form of the scroll screen is controlled based on the coordinates of a destination and the coordinates of the scroll base point that is the nearest to a current position. The diagram shows, as in the case of FIG. 30, the current position display screen which displays a user's current position or the like, a destination "Restaurant" and a route to the destination. The scroll base points are indicated by stars. The scroll base point 3201 is the scroll base point that is the nearest to the destination, and is also a starting point of scroll. The scroll base point 4001 is the scroll base point that is the nearest to a current position and is also an ending point of scroll. In the first embodiment, a scroll screen is generated in a predetermined form having each scroll base point in the center, and then is displayed. In the second embodiment, a scroll screen is generated by automatically controlling the form of the scroll screen as needed in consideration of the forward and backward scroll base points of each base point. Here, a form controlling method for determining a scroll screen of a predetermined form based on the base points which are starting point and the ending point respectively is described as another example.

For example, in the case where a scroll range ranged from the starting point to the ending point is an area relatively long in a south-north direction, scrolling is performed in the south-north direction. Thus, the scroll screen is displayed in a vertically long form, and with such a form, it is possible to view the route closer to the destination. On the other hand, in the case where a scroll range is ranged from the starting point to the ending point is an area relatively long in an east-west direction, scrolling is performed in the east-west direction. Thus, the scroll screen is displayed in a horizontally long form, and with such a form, it is possible to view the route closer to the destination. Therefore, the point is to refer to the respective coordinates of the starting point and the ending point of the scroll base points and determine the form of the scroll screen according to the display of the route.

The base point coordinates obtainment unit 1112 obtains the coordinates of the scroll base points. In FIG. 39, the coordinates of the scroll base point 3201 is the longitude 135 degrees 25 minutes 38 seconds east and the latitude 35 degrees 33 minutes 30 seconds north. The coordinates of the scroll base point 4001 is the longitude 135 degrees 24 minutes 38 seconds east and the latitude 35 degrees 32 minutes 00 second north. The difference between the starting point and the ending point of the scroll base points is obtained as 1 minute (approximately 1.51 km) as a result of subtracting the longitude 135 degrees 24 minutes 38 seconds east from the longitude 135 degrees 25 minutes 38 seconds east in the east-west direction. On the other hand, in the south-north direction, the difference is obtained as 1 minute and 30 seconds north (approximately 2.77 km) as a result of subtracting the latitude 35 degrees 32 minutes 00 second north from the latitude 35 degrees 33 minutes 30 seconds north, resulting in. In other words, in the case of scrolling from the destination "destination" to the current position, the distance to be scrolled in the south-north direction is longer compared with the distance to be scrolled in the east-west direction. The partial map form calculation unit 1121 therefore generates a scroll screen in taking the distance in a scrolling direction into consideration. For example, the partial map form calculation unit 1121 generates a scroll screen of 150 dots in a horizontal X axis which is obtained by considering the distance of 1 minute (1.51 km) in the east-west direction and 270 dots in a vertical Y axis which is obtained by considering the distance of 1 minute and 30 seconds (2.77 km) in the south-north direction.

FIG. 40 is a diagram showing an example of deriving a scroll screen that is vertically long and of a predetermined form, based on the coordinates of a destination and the coordinates of the scroll base point that is the nearest to the current position. The diagram shows the scroll screens of the respective scroll base points generated in the form of vertical Y dots and horizontal X dots as a result of considering the scrolling direction. The scroll screen 4101 of vertical Y dots and horizontal X dots having the scroll base point 3201 in the center is generated. Likewise, the scroll screen 4102 of vertical Y dots and horizontal X dots having the scroll base point 3205 in the center and the scroll screen 4103 of vertical Y dots and horizontal X dots having the scroll base point 3208 in the center are generated.

The partial map display position determination unit 105 calculates a point (scroll screen display point) for displaying the scroll screen generated in each scroll base point and displays the calculated points on the current position display screen. FIG. 41 is a diagram showing an example in which the vertically long scroll screen as derived in FIG. 40 is displayed on the current position display screen. As shown in FIG. 41, the scroll screen 4101 generated by defining the scroll base point 3201 as the center is displayed at the scroll base point 4201 on the current position display screen. The calculation of the scroll screen display point is carried out using the same method as applied in the first and second embodiments, and in this case, a scroll base point which does not exceed the vertical Y axis (150 dots) and horizontal X axis (270 dots) is used. Thus, in the case where a route is relatively long in the south-north direction, by forming a vertically long scroll screen, the driver can perceive the route to be taken when the route is scrolled.

FIG. 42 is a diagram showing an example of deriving a horizontally long scroll screen, based on the coordinates of a destination and the coordinates of the scroll base point that is the nearest to the current position. In other words, it is a diagram for illustrating the case in which a scroll screen is in a horizontally long form, unlike the above-mentioned case of vertically long form. FIG. 42 shows, as in FIG. 39, a current position display screen, a destination "tennis court" and a route to the destination. The scroll base points are indicated by stars.

Considering the position of the scroll base point 4301 that is the nearest to the destination "Tennis Court" and the position of the scroll base point 4302 that is the nearest to a current position, it is assumed that a difference of 2 minutes (approximately 3.02 km) in the east-west direction and a difference of 1 minute (approximately 1.51 km) in the south-north direction are calculated. In such a case, a scroll screen of 300 dots in vertical Y and 150 dots in horizontal X shall be displayed in the position which has the scroll base point 4303 as its reference. Thus, in the case where the route is relatively long in the east-west direction, a horizontally long scroll screen is generated and the generated scroll screen is displayed on the current position display screen.

Note that it is possible to define the size of a scroll screen to be a half or a third of the size of the current position display screen. For example, the starting point and the ending point of the scroll base points are calculated, the distance in the east-west direction and the distance in the south-north direction are compared, and in the case where the distance in the south-north direction is longer, it is possible to vertically divide the current position display screen and define one of the divided screens as a scroll screen. Alternatively, in the case where the distance in the east-west direction is longer, it is possible to horizontally divide the current position display screen and define one of the divided screens as a scroll screen.

(Variation 2)

Note that, in the present embodiment, the form of a scroll screen is controlled using the scroll base points; however, the reduction scale of the map of the scroll screen may be changed.

For example, in the case where the distance to a destination is longer, it is possible to shorten the moving distance of the scrolling (i.e. to reduce the number of scrolling times) even a little by enlarging the reduction scale of the partial map. In addition, it is possible to reduce the size of a map and display the reduced-size map indicating a route to a destination on the current position display screen. In the case where the route to the destination is not displayed within the present screen, it is effective in enabling the easier perception of the information on the entire map such as a route to the destination or the like.

FIG. 43 is a diagram showing a configuration of the map display device according to the present variation. The diagram shows the configuration of the map display device which reduces the size of a partial map along the route to the destination and displays the reduced-size partial map with less scrolling times. The same referential marks are given to the components described in the first and second embodiments, and the description shall be omitted.

The partial map area reduction scale calculation unit 113 is a unit which refers to the coordinates of the scroll base points obtained by the base point coordinates obtainment unit 1112, and calculates a reduction scale of the map indicating a route to the destination. The partial map generation unit 114 is, as is the case of the second embodiment, a unit which generates a partial map based on the reduction scale calculated by the partial map area reduction scale calculation unit 113. Note that the present variation shows the case of displaying a reduced-size partial map, but not a scroll-display of a partial map; therefore, such a map is referred to as "partial map" in the variation. The partial map display area storage unit 103 is, as is the case of the second embodiment, a unit which stores the generated partial map. Also, the partial map display position determination unit 105 is a unit which determines a point for displaying the stored partial map, as described in the second embodiment. Note that the first and second embodiments define the point as "scroll display point" since a scroll screen is displayed; however, the term "partial map display point" shall be used here.

The details of the partial map area reduction scale calculation unit 113 are described with reference to FIG. 44. FIG. 44 is a diagram showing a more detailed configuration of the partial map area reduction scale calculation unit shown in FIG. 43. The partial map area reduction scale calculation unit 113 is further configured of a partial map display point reference unit 1131, a destination coordinates reference unit 1132, a partial map area obtainment unit 1133, a partial map reduction scale control unit 1134, and a partial map base point calculation unit 1135. The partial map display point reference unit 1131 is a unit which refers to a position of the calculated partial map display point (note that partial map display point corresponds to "scroll display point" in the first embodiment) out of the calculated partial map display points, as a result of taking the current position display screen into consideration. The destination coordinates reference unit 1132 is a unit which refers to the scroll base point that is the nearest to a destination among the scroll base points. The partial map area obtainment unit 1133 is a unit which obtains an area on the partial map using the base points referred to by the partial map display point reference unit 1131 and the destination coordinates reference unit 1132. Then, the partial map reduction scale control unit 1134 reduces the size of the obtained partial map and the partial map generation unit 114 generates a reduced-size map. Meanwhile, the partial map base point calculation unit 1135 calculates in advance the coordinates of the partial map display point on the reduced-size map. Hereinafter, a concrete example will be described with reference to the drawings.

FIG. 45 is a diagram showing an example of controlling the reduction scale of a partial map in the case of reducing the size of the partial map display area indicating a route to the destination and displaying the reduced-size partial map display area on the scroll screen of a predetermined size. The diagram shows a current position, a pre-set destination "Restaurant" and a route to the destination. The scroll base points are indicated by stars. Firstly, the present variation defines the form of the partial map screen (corresponds to "scroll screen" in the first and second embodiments) to be 2H dots in a vertical direction and 2W dots in a horizontal direction. The map generated by reducing the size of the map indicating a route to the destination shall be displayed in the area of 2H dots in the vertical direction and 2W dots in the horizontal direction.

Firstly, a partial map display point which displays a partial map screen is calculated. In the first embodiment, a scroll screen is displayed in such a manner that a scroll base point is located in the center. Therefore, the point which does not exceed the height of H dots and the width of W dots is determined to be a scroll screen display point. In the second embodiment, a scroll screen is calculated as needed for each scroll base point; therefore, the point that does not exceed the calculated height of X dots and width of Y dots is defined to be a scroll screen display point. In contrast, in the present variation, a partial map screen shall be displayed in such a way that a scroll base point is defined to be one of the four corners of the partial map screen. Therefore, the scroll base point of the area which does not exceed the height of 2H dots and the width of 2W dots shall be defined as a partial map display point.

The scroll base point 4501, as shown in FIG. 45, is an area which does not exceed the height of 2H dots and the width of 2W dots, so that the scroll base point 4501 is defined to be a point for displaying a partial map screen, that is, a partial map display point.

Next, the partial map area reduction scale calculation unit 113 calculates an area which includes the entire map indicating a route to the destination. The description shall be provided with reference to FIG. 46. FIG. 46 is a diagram showing an example of the partial map display area to be displayed on the scroll screen shown in FIG. 45.

In FIG. 46, the destination "Restaurant" is located in the north east (upper right) of the scroll base point 4501 which is to become a partial map base point (i.e. scroll display point). A map of the area indicated by a dotted rectangular is obtained so that the scroll base point 4501 is located in the upper left, as opposed to the location of the destination, and the entire map indicating a route to the destination is included. The description shall be given with reference to FIG. 47. FIG. 47 is a diagram showing an example of the method for calculating the reduction scale of the partial map display area shown in FIG. 46. For example, the coordinates of the scroll base point that is the nearest to the destination "Restaurant" are assumed to be located in the latitude 35 degrees 33 minutes 30 seconds north and the longitude 135 degrees 25 minutes 38 seconds east, whereas the coordinates of the partial map display point 4501 are located in the latitude 35 degrees 24 minutes 40 seconds north and the longitude 135 degrees 13 minutes 48 seconds east. For example, as a further allowable range, a rectangular formed by the respective coordinates generated as a result of adding 5 seconds in up-and-down as well as right-and left directions is obtained as a partial map. In other words, 12 minutes (distance of 18.2 km) derived as an area ranged from the longitude 135 degrees 13 minutes 43 seconds east (the longitude 135 degrees 13 minutes 48 seconds east−5 seconds) to the longitude 135 degrees 25 minutes 43 seconds east (the longitude 135 degrees 25 minutes 38 seconds east+5 seconds) is defined as the width of the partial map. Also, 9 minutes derived as an area ranged from the latitude 35 degrees 24 minutes (distance of 13.5 km) 35 seconds north (the latitude 35 degrees 24 minutes 40 seconds north−5 seconds) to the latitude 35 degrees 33 minutes 35 seconds north (latitude 35 degrees 33 minutes 30 seconds north+5 seconds) is defined as the height of the partial map.

Then, the size of the obtained map is reduced to a rectangular of 2H dots high and 2W dots wide. The description will be given with reference to FIG. 48. FIG. 48 is a diagram showing an example in the case of reducing the size of the partial map indicating a route from a base point to the destination on the current position display screen and displaying the whole map on the scroll screen of predetermined shape and form.

In FIG. 48, 4601 denotes a partial map in which the partial map display point 4501 and the entire route to the destination "Restaurant" are included. The partial map 4701 is obtained as a result of reducing the size of the partial map 4601 into a rectangular with the size of 2H dots high and 2W dots wide.

Meanwhile, the partial map display base point calculation unit 1135 calculates the coordinates of the partial map display point on the reduced-size partial map, and displays the partial map in such a manner that the reduced-size partial map display point on the entire display screen matches the partial map display point on the reduced-size partial map. Hereinafter, the calculation of the partial map display point on the reduced-size partial map will be described with reference to FIG. 49. FIG. 49 is a diagram showing an example of the method for calculating the scale for reducing the size of the partial map indicating a route from the partial map display point to the destination.

FIG. 49 shows a map obtained by reducing the size of the partial map 4601 to the height of 2H dots (e.g. 144 dots) and the width of 2W dots (e.g. 108 dots). In this case, 1 dot equals to 5 seconds. Therefore, in the partial map 4601 whose size has been reduced, assuming that the position at the latitude 35 degrees 24 minutes 40 seconds north and the longitude 135 degrees 13 minutes 43 seconds east is defined as an origin, the partial map display point 4501 located in the latitude 35 degrees 24 minutes 40 seconds north and the longitude 135 degrees 13 minutes 48 seconds east shall be positioned at a point of 1 dot in a vertical direction and 1 dot in a horizontal direction from the origin. Thus, the partial map base point calculation unit 1135 calculates in advance the coordinates of the partial map display point on the reduced-size partial map. In the current position display screen which is the entire screen, displayed is performed in such a manner that the partial map display point on the current position display screen matches the partial map display point on the reduced-size partial map.

FIG. 50 is a diagram showing an example of a display displaying the generated partial map 4601 on the current position display screen, while defining a partial map display point 4501 to be located in the lower left. Here, the generated partial map is stored in the partial map display area storage unit 103, and is displayed on the current position display screen while the partial map display point 4501 is located in the lower left of the scroll screen. In the present variation, a reduced-size partial map is generated so that the partial map display point 4501 is located in the lower left. Also, the scroll screen is displayed so that the partial map display point 4501 is located in the lower left on the current position display screen. Therefore, the route on the current position display screen matches the route on the scroll screen at the partial map display point 4501. Thus, a route to the destination which is not displayed on the present screen, or the like, is displayed as a partial map in such a manner that the route matches the presently-displayed route. Therefore, it is easy for the driver to perceive the information. For example, in the case of FIG. 50, the route turns right at "Fourth Intersection", matches the route on the partial map at the point (partial map display point 4501) which is passed after going straight, further forwards straight, turns left and heads north east (upper left), so that the driver can easily perceive the route to the destination. Note here that it is defined to reduce the size of the entire map in indicating the route from the current position to the destination on the partial map screen and display the reduced-size partial map altogether; however, the partial map which displays the route beyond the destination may be further scrolled. In the case where the size of a partial map covering the current position up to the destination is reduced too much for the user to view, the level of reduction may be set so as not to go below a predetermined ratio (threshold value) and the partial map on the route which could not be displayed altogether on the scroll screen may be scroll-displayed. Also, in the case where the driver has a place to drop in between the current position to the destination, this place may be defined as a first destination, the map is entirely displayed on the screen after reducing the size of the map ranged from the current position to the first destination, and an area ranged from the first destination to the last destination or an area ranged from the current position to the last destination may be scroll-displayed.

Next, the description shall be provided using another example. FIG. 51 is a diagram showing an example in the case where the partial map display point is located in a different corner of the scroll screen shown in FIG. 46. For example, FIG. 51 shows a current position that is located in the same position as the position shown in FIG. 46, a destination "Tennis Court" located in a direction different from the direction of the "Restaurant" shown in FIG. 46, and a route to the destination. The scroll base points are indicated by stars. The scroll base point 4501 is a point which does not exceed the height of 2H dots and the width of 2W dots, and a reduced-size map indicating the route to the destination shall be displayed using this point (which is to become a partial map display point) as a reference. In the case of FIG. 51, the destination "Tennis Court" is located south east of the partial map; therefore, a partial map, in which the destination is positioned in the lower right and the partial map display point 4501 is positioned in the upper left and which indicates a route to the destination is obtained. A dotted rectangular indicates the obtained partial map. FIG. 52 is a diagram showing an example of a display displaying the partial map display area shown in FIG. 51 on the current position display screen. In other words, FIG. 52 shows how the obtained partial map is displayed on the current position display screen as a result of reducing the size of the partial map to the size of 2H dots high and 2W dots wide and positioning the partial map display point 4501 in the upper left. The route displayed on the reduced-size partial map matches the route on the current position display screen so that it is possible for the driver to perceive the route to the destination.

FIG. 53 is a flowchart showing the procedure used in the case of reducing the size of the partial map display area ranged from the partial map display point to the destination and entirely displaying it on a scroll screen of a predetermined size. FIG. 54 is a flowchart showing the detailed procedure for the calculation of the partial display area performed in S404 shown in FIG. 53. The description of the operation shall be given using the flowcharts shown in FIGS. 53 and 54. In the present embodiment, the operation from the setting of a route (Step S100) to the calculation of scroll base points (Step S102) is as same as the operation described in the first embodiment. The route setting unit 109 such as a touch panel or the like sets a destination (Step S100), obtains the destination and route information related to the destination from the map information storage unit 104, and stores the obtained information into the route storage unit 107 (Step S101).

Next, scroll base points are calculated on the stored route (Step S102). FIG. 45 shows a current position display screen which displays a user's current position or the like. The screen also shows a pre-set destination "Restaurant" and a route to the destination. The calculated scroll base points are indicated by stars. In the present variation, a scroll screen display point is calculated using these scroll base points.

First, the scroll base point that is the nearest to the current position is selected (Step S103). Next, whether or not the height exceeds a display area 2H on the current position display screen which displays a current position display area is judged based on the selected scroll base point (Step S401). In the case where the height does not exceed the display area 2H (No in Step S401), whether or not the width exceeds the display area is judged (Step S402). In the case where the width does not exceed the display area (No in Step S402), whether or not there is the next scroll base point is judged (Step S106), and in the case there is (Yes in S106), the next scroll point is selected (Step S107). In repeating this procedure, in the case where the height in the vertical direction exceeds 2H dots (Yes in Step S401), or in the case where the width in the horizontal direction exceeds 2W dots (Yes in Step S402), the process is shifted back to the previous screen base point and the previous screen base point is determined to be a scroll screen display point (Step S403). In the case of FIG. 45, the scroll base point 4501 becomes the scroll screen display point.

Then, a reduced-size partial map indicating the route to the destination is generated using the selected scroll screen display point (Step S404). Firstly, the coordinates of the selected scroll screen display point are referred to (Step S411). Next, the coordinates of the scroll base point that is the nearest to the destination are referred to (Step S412). Then, the position of the scroll base point that is the nearest to the destination is represented by the coordinates at which the nearest scroll base point is located in a position symmetric to the position of the selected scroll screen display point, and a partial map is created. In other words, the case varies depending on the correlation between the scroll base point that is the nearest to the current position and the scroll base point that is the nearest to the destination (Step S413).

In the case where the scroll base point that is the nearest to the destination is positioned in the upper right of the scroll screen display point, a partial map is generated so that the scroll screen display point is positioned in the lower left which is a position symmetric to the position of the scroll base point that is the nearest to the destination (Step S414). In the case where the scroll base point that is the nearest to the destination is located in the lower right of the scroll screen display point, a partial map is created so that the scroll screen display point is positioned in the upper left which is a position symmetric to the position of the scroll base point that is the nearest to the destination (Step S415). In the case where the scroll base point that is the nearest to the destination is located in the upper left of the scroll screen display point, a partial map is created so that the scroll screen display point is positioned in the lower right which is a position symmetric to the position of the scroll base point that is the nearest to the destination (Step S416). In the case where the scroll base point that is the nearest to the destination is located in the lower left which is a position symmetric to the position of the scroll base point that is the nearest to the destination, a partial map is generated so that the scroll screen display point is positioned in the upper right which is a position symmetric to the position of the scroll base point that is the nearest to the destination (Step S417).

Then, the size of the generated partial map is reduced to the size of 2H dots high and 2W dots wide (Step S418).

Next, the generated partial map is displayed at the scroll base point (Step S405).

For example, in the case of FIG. 46, since the destination is located in the upper right with respect to the scroll screen display point, the scroll screen display point is positioned in the lower left and a partial map indicated by a dotted rectangular is created (Step S414). Then, as shown in FIG. 43, the size of the partial map is reduced to the size of 2H dots high and 2W dots wide (Step S418).

Then, the partial map generated as shown in FIG. 50 is displayed at the scroll base point. Thus, the scroll screen display point shall match the scroll base point 4501. That is to say that the route on the current position display screen matches the route on the reduced-size partial map, and therefore, it is possible for the driver to easily perceive the information on the route to be taken while perceiving the information related to the current position.

Note that for the partial map whose size is reduced in the above example, an area of the partial map is calculated based on a partial map display point and a base point that is the nearest to the destination. For example, in the case of FIG. 46, a rectangular area indicated by a dotted line is defined to be an area for a partial map using the calculated partial map display point 4501 and the base point that is the nearest to the destination located in the north east (a vertical axis denotes latitude and a horizontal axis denotes longitude) of the partial map display point. Thus, a route to the destination is included within the area, which enables the user to perceive the information related to the route to the destination as a partial map while perceiving the information on the current position display screen, and also. However, when the area for the partial map is thus calculated, some parts of the route may not be included in the partial map depending on the route, in some cases. For example, the largest value and the smallest value of the base points may be obtained with respect to each of the vertical and horizontal axes, and a partial map may be calculated so that the route is entirely displayed in the partial map area. Hereinafter, the description shall be given using a concrete example.

FIGS. 55A, 55B and 55C are diagrams illustrating the case of deriving base points to be, for example, the largest value and the smallest value in each axis, out of the base points, and generating a partial map based on the calculated base points. FIG. 55A shows an example of the display screen in the case where the coordinate of the vertical axis of the base point 4801 shown in FIG. 55C is defined to be the smallest. FIG. 55B is an example of the display screen in the case where the coordinate of the vertical axis of the base point 4802 shown in FIG. 55C is defined to be the smallest. FIG. 55C shows the coordinates of main base points on the route from the base point 4801 to the destination. As in the above-mentioned method, the partial map display point 4801 which is displayed on the current position display screen and displays a partial map is calculated. The destination is restaurant, and base points are shown by stars on the route to the restaurant. Here, a partial map is generated so that only the partial map display point 4801 and the base point 4803 which is the nearest to the restaurant are included, which results in a partial map that does not include the entire route, as shown in the display screen in FIG. 55A. Therefore, among the base points, the base points to become the largest value and the smallest value with respect to each of the axis are respectively calculated, and a partial map is generated using the calculated base points as the base points to be referred to in the generation of the partial map. As to the axes, in the case of north-up display (display in such a manner that north is always positioned at the top in the case of car navigation system), for example, a vertical axis denotes latitude and a horizontal axis denotes longitude. Note that in the case of heading-up display (display in such a manner that the direction in which the user faces is always positioned at the top), the facing direction is denoted as a vertical axis and left-right direction is denoted as a horizontal axis.

First, the largest value and the smallest value of the horizontal axis (longitude) are calculated. The values are calculated, for example, by referring to the coordinates, indicated by the latitude and longitude, of the partial map display point 4801 through the base point 4803 which is the nearest to the destination. In this case, the base points in the horizontal axis are defined as follows: the smallest value of the horizontal axis (longitude) is the longitude 135 degrees 33 minutes 20 seconds east of the partial map display point 4801 and the largest value is the longitude 135 degrees 35 minutes 20 seconds east of the base point 4803.

Likewise, the largest value and the smallest value of the vertical axis (longitude) are calculated. The values are calculated by referring to the coordinates, indicated by the latitude and longitude, of the partial map display point 4801 through the base point 4803 that is the nearest to the destination. In this case, the base points of the vertical axis are defined as follows: the smallest value is the latitude 35 degrees 34 minutes 20 seconds north of the base point 4802 and the largest value is the latitude 35 degrees 31 minutes 12 seconds north.

A partial map area is determined using the calculated base points on each of the axes. The area 4804 indicated by a dotted rectangular shown in FIG. 57B is determined to be an area for a partial map. The display screen in FIG. 55B shows a display screen showing the map whose size has been reduced using the above-mentioned method. Unlike the display screen in FIG. 55A, the partial map which includes the entire route to the destination restaurant is displayed.

(Variation 3: Change Menu Position According to Scroll Screen)

Note that the first and second embodiments have described the control on a display position, a form and a reduction scale of a scroll screen. By controlling a position in which a scroll display screen is to be displayed, the driver can easily perceive the information such as a route to the destination or the like. On the other hand, a display screen (hereinafter to be referred to as "menu screen") of a mobile terminal as used in the car navigation system or the like generally displays not only map information but also the information necessary for the current driving such as candidates to be included in a menu for operating the terminal, e.g., present time information, route search and the like. Normally, the position in which a menu screen is to be displayed is predetermined. On the other hand, the position in which a scroll screen is to be displayed, according to the present invention, is calculated based on the scroll base points, and may overlap with the menu screen depending on the case. The present variation describes the method for controlling the display position of a menu screen.

FIG. 56 is a block diagram showing a configuration of the map display device according to the variation in the case of holding plural display patterns of a menu screen and displaying the menu screen in a different position in the case where the menu screen and the scroll screen overlap with each other. The same referential marks are provided for the components described in the first and second embodiments, and the description shall be omitted.

The menu display area storage unit 1130 is a unit which stores a display area of a menu screen. FIG. 57 is a diagram showing an example (pattern 1) of the menu screen displayed on the current position display screen which displays a current position or the like. FIG. 58 is a diagram showing another example (pattern 2) of the menu screen displayed on the current position display screen. As shown in the diagram, the menu screen displays a present time "Present time", a destination "Destination "Restaurant"", and in the case of touch panel, the candidate menu for the operation operable via user's touch such as "Periphery search", "Change destination", and "Search detour". The position in which such a menu screen is to be displayed is normally determined in advance. On the other hand, the display position of the menu screen according to the variation is variable, and plural kinds of patterns are to be stored. For example, in FIG. 57, a menu screen is displayed on the right side of the current position display screen, whereas in FIG. 58, an identical menu screen is displayed on the left side of the current position display screen. Thus, the menu display area storage unit 1130 stores a pattern 1 (FIG. 57) in which a menu screen is displayed on the right side and a pattern 2 (FIG. 58) in which a menu screen is displayed on the left side.

FIG. 59 is a diagram showing an example of the current position display screen in the case where the scroll screen and the menu screen overlap with each other due to the calculated scroll screen display point 5601. In this case, when a scroll screen is displayed without any processing, the scroll screen overlaps with the menu screen and the user cannot view the menu screen. The display area judgment unit 1140 shall therefore refer to the position of the scroll screen display point and the display position of the menu screen, and in the case the overlap occurs, the menu display area switching unit 115 switches the display position of the menu screen. For example, assuming that a menu screen is displayed in the pattern 1 (right side), and then, a scroll screen display point 5601 is calculated. In this case, the display area judgment unit 1140 refers to the coordinates of the scroll screen display point 5601 and judges whether the scroll screen should be positioned on the left side or the right side of the screen. In the case where the menu screen is located in the right side, it is possible to display both the menu screen and the scroll screen by switching the menu screen to the pattern 2 (left side). FIG. 60 is a diagram showing a display example of the current position display screen displayed on the left side as a result of switching the display pattern of the menu screen in the case where the scroll screen is displayed on the right side of the current position display screen, as shown in FIG. 59.

When scroll displaying a route to a destination or the like in a pre-set position, as is the conventional case, the route is displayed in a different position that is not in the direction for which the driver is heading, which may cause user's confusion. By displaying a scroll screen in the direction of the destination or on the route to the destination, in considering the current position display screen which displays a current position, it is easy for the driver to visually perceive the information. Moreover, by controlling the menu screen such as operation candidates or the like according to the scroll display screen, the driver can easily perceive necessary information.

(Variation 4: Scroll Display of Route Directed to Accompanying Vehicle which Moves Together)

Note that, in the previous embodiment, the route information to be scroll-displayed is a pre-set destination or the like. In contrast, as the variation of the embodiment, it is possible to scroll-display the second mobile terminal as a destination, instead of scroll displaying a destination. For example, application is possible in such a way that the position of the second mobile terminal is detected, the detected position is set as a destination, and a route to the destination or the like is scrolled. In the case of a car navigation system, for instance, a driver may drive accompanied by a vehicle driven by the driver's friend. In such circumstances, the driver needs to get not only the information related to the periphery of his/her own vehicle, but also a position, a route, and the like, of the accompanying vehicle. Even in the case where the driver's vehicle and the accompanying vehicle head for the same destination, the routes respectively derived through the respective car navigation systems are not totally the same. In the case where the pre-set routes are different between the vehicle that leads ahead and the vehicle that follows the leading vehicle, the routes that are pre-set in the car navigation system are different between the following vehicle and the leading vehicle, which may cause confusion. In the case of driving in an accompanying manner, even the destination is the same, one may take a rest during the driving journey; therefore, the position information of the second mobile terminal is one of the great interests of the user. In the present variation, an example, in which a position of the accompanying vehicle is detected and a route to the position of the accompanying vehicle is scroll-displayed, will be described.

FIG. 61 is a diagram showing a configuration of the map display device according to the variation in the case of scroll displaying a route guiding to the position of an accompanying vehicle which drives with the user's vehicle when setting the position of the accompanying vehicle as a destination. The same referential marks are provided for the components described in the first and second embodiments, and the description shall be omitted.

The second current position detection unit 1160 is a unit which detects a position of the second mobile terminal. The second current position storage unit 1170 is a unit which stores the detected second mobile terminal's position. The second current position transmission unit 1180 is a unit which transmits the detected second mobile terminal's position directly or via a server or the like.

The mobile terminal is equipped with a second current position receiving unit 119 which receives the transmitted position information of the second mobile terminal. Thus, it is possible to detect not only the position of the present mobile terminal but also the position information of the second mobile terminal. By setting the position information detected by the second current position receiving unit 119 as a destination, a route to the destination is calculated by the route calculation unit 108, and then stored in the route storage unit 120, as in the embodiments. As in the embodiments, the scroll base points guiding to the second mobile terminal are calculated by the route base point calculation unit 1111 and a scroll screen is generated.

Note that in the case of a mobile terminal for which an accompanying vehicle is set as a destination, at which timing scroll display should be performed is important. It is preferable to support the following vehicle's driving so that the following vehicle follows the leading vehicle. For example, the number of intersections on the route guiding to the second mobile terminal shall be calculated and the generation of a scroll screen shall be controlled depending on the number of intersections.

The intersection information obtainment unit 121 is a unit which calculates the number of intersections detected on the derived route guiding to the second mobile terminal. A predetermined threshold (e.g. in the case of taking right or left more than two times) is set, and the partial map generation control unit 122 controls whether or not to generate a scroll screen. Hereinafter, the detailed description will be given with reference to the drawings.

FIG. 62 is a diagram showing the current position display screen which displays a current position of the mobile terminal. In addition, the diagram further shows the current position of the second mobile terminal, which is not displayed on the current position display screen detected by the second current position receiving unit 119. In FIG. 62, the second mobile terminal is shown in the north east (upper right) of the current position of the mobile terminal.

Furthermore, in the variation, the detected second mobile terminal's position is considered to be a destination, and a route guiding to the second mobile terminal is scroll-displayed. In the first embodiment, the route setting unit 109 sets a predetermined position on a map as a destination, and the route calculation unit 108 calculates a route to the destination. Here, the position information detected by the second current position detection unit 160 is obtained via the communications with the second current position transmission unit 1180, the second current position receiving unit 119 or the like. The obtained second terminal device's position is set as a destination and a route is derived by the route calculation unit 108. In FIG. 62, a bold black line indicates a route to the second mobile terminal. As in the embodiments, scroll base points are calculated for the route to the destination and are indicated by stars. In addition, in the present embodiment, the number of intersections on the route guiding to the second mobile terminal is calculated so that whether or not to perform scroll display is controlled.

FIG. 63 is a diagram showing an example of the positional relationship between a second mobile terminal and a vehicle, which is to become a trigger of the partial map scroll display indicating the route from the vehicle's position to the second mobile terminal's position. In FIG. 63, white circles denote intersections and it is shown that two intersections are found on the route from the current position to the second mobile terminal. The intersection information obtainment unit 121 obtains the number of intersections, on the calculated route, between the second mobile terminal's position and the current position that is the position of the driver's vehicle. In this case, two intersections shall be obtained. In the case of driving a vehicle accompanied by another vehicle, passing of an intersection is one of the cases where one vehicle strays from another. For example, in the case where the leading vehicle passes an intersection while the following vehicle stops at the intersection due to a red light or the like, the leading vehicle may drive away without noticing it, which results in the separation of the vehicles. In other cases, the following vehicle may lose sight of the leading vehicle as a result that the leading vehicle turns right or left at the intersection. Therefore, the trigger of starting scroll display may be based on the number of intersections.

For example, in the case where the number of intersections at which scroll display should be performed is defined as two, scroll display is started in this case. Note that the method of scroll display is as same as the one described in the embodiments: scroll display can be performed by generating a scroll screen based on the scroll base points, and by displaying the scroll screen at the calculated scroll screen display point. However, in the present variation, the destination is not a point but the second mobile terminal; therefore, it is possible to scroll-display the route guiding to the second mobile terminal. FIG. 64 is a diagram showing an example in the case where the scroll screen indicating a route between the vehicle and the second mobile terminal is displayed on the current position display screen. In the case of moving along with plural users rather than driving one's own vehicle alone, the partner user's position is a matter of interest to the user. In the case of a car navigation system, complicated operation during the drive is undesirable. By displaying the positions of other users, or the routes to such positions using scroll screens, it is possible to allow the driver to easily perceive information on the accompanying vehicles without disturbing the user's driving task.

Note that the present variation describes that the number of intersections on the route guiding to the second mobile terminal is a trigger; however, the present invention is not limited to this. For example, not only intersections but also the distance to the second mobile terminal may be taken into account. As the distance gets longer between the vehicles, there is a high possibility that the vehicles stray from each other. It is therefore possible, with the present variation, to set a predetermined threshold, and in the case where the distance between the vehicles get farther from each other for more than a predetermined distance although an intersection is not passed, it is possible to perform control, e.g. scroll display, in considering both intersection and distance. Alternatively, the type of routes, traffic information such as traffic jam may be taken into consideration. For example, in the case of driving a motor way, a route tends to be straight and the possibility at which the vehicles lose sight of one another is low even with more or less distance. Therefore, control may be performed so that in the case where a travel route is a motor way, a threshold value for scroll display is increased, or in the case where there is a high possibility that the vehicles get separated, a threshold value is decreased, or the like.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The map display device according to the present invention is configured of a current position storage unit, a route storage unit, a map information storage unit, a display area determination unit, a partial map display area storage unit and a partial map display position determination unit, and is useful as a mobile terminal as such that is used in a car navigation system which scroll-displays route information on a current position display screen so that the user can easily perceive the information.

What is claimed is:

1. A map display device which displays a map regarding a travel route of a mobile object, said device comprising:
   a display screen;
   a map information obtainment unit operable to obtain map information concerning a current position and the travel route of the mobile object;
   a whole-display unit operable to display, on the whole display screen, a map indicated by the obtained map information concerning the current position of the mobile object; and
   a partial-display unit operable to display a partial map on a partial display area of said display screen, the partial map being a map that is related to a part of the travel route of the mobile object,
   wherein the partial display area occupies only a part of said display screen, and
   wherein said partial-display unit is operable to display the partial map on the partial display area by superimposing the partial map on the map displayed by said whole-display unit while causing the partial map to be scrolled along the travel route of the mobile object and causing the partial display area to move along the travel route of the mobile object.

2. The map display device according to claim 1,
   wherein the travel route is a route from the current position of the mobile object to a destination, and
   said partial-display unit is operable to display the partial map while causing the partial map to be scrolled in one of the following directions: a direction from the current position to the destination, and a direction from the destination to the current position.

3. The map display device according to claim 2, further comprising:
   a position detection unit operable to detect the current position of the mobile object,
   wherein each time said position detection unit detects a new current position, said map information obtainment unit is operable to obtain map information concerning the new current position and a moving route from the new current position to the destination, said whole-display unit is operable to display a map indicated by the obtained map information concerning the new current position, and said partial-display unit is operable to display a map indicated by the obtained map information concerning the travel route.

4. The map display device according to claim 1,
wherein in the case where a point on the travel route included in the map displayed by said whole-display unit is defined as a base point, said partial-display unit is operable to define a display area as the partial display area, and to display the partial map while causing the partial map to be scrolled, the display area including the base point and being associated with the base point by a predetermined distance.

5. The map display device according to claim 4,
wherein said partial-display unit is operable to define a base point as a starting point or an ending point of the scrolling of the partial map, and to display the partial map while causing the partial map to be scrolled, the base point being a point at which the partial map displayed in the partial display area matches the map displayed by said whole-display unit.

6. The map display device according to claim 4, further comprising
a partial map area calculation unit operable to calculate plural base points on the travel route from the current position to the destination, and to calculate a form or a reduction scale of the partial map based on a positional relationship of the calculated base points,
wherein said partial-display unit is operable to display the partial map in the form or at the reduction scale calculated by said partial map area calculation unit.

7. The map display device according to claim 1,
wherein when said partial-display unit displays the partial map in the partial display area, said whole-display unit is operable to change the display area of the map displayed on the whole display screen, based on the travel route included in the map displayed on the whole display screen.

8. The map display device according to claim 1,
wherein said partial-display unit is operable to display the partial map while causing the partial map to be scrolled and causing the partial display area to move along the travel route, by sequentially setting plural predetermined points on the travel route as base points, the partial display area being caused to move along the travel route at each of the base points.

9. The map display device according to claim 1, further comprising
an input unit operable to receive a user's operational input,
wherein said partial-display unit is operable to start causing the partial map to be scrolled when said input unit has received the user's operational input.

10. The map display device according to claim 1,
wherein said partial-display unit is operable to calculate a plurality of points on the travel route indicated in the displayed partial map, by predicting a time when the mobile object passes the respective points, and to display the calculated time together with the partial map.

11. A map display device which displays a map regarding a travel route of a mobile object, said device comprising:
a display screen;
a map information obtainment unit operable to obtain map information concerning a current position of the mobile object and a plurality of travel routes from the current position to respective destinations;
a whole-display unit operable to display, on the whole display screen, a map indicated by the obtained map information concerning the current position of the mobile object; and
a partial-display unit operable to display a first partial map on a first partial display area of said display screen and a second partial map on a second partial display area of said display screen, the first partial map being a map that is related to a part of a first travel route of the plurality of travel routes of the mobile object, and the second partial map being a map that is related to a part of a second travel route of the plurality of travel routes of the mobile object,
wherein the first partial display area occupies a first part of said display screen, and the second partial display area occupies a second part of said display screen,
wherein said partial-display unit is operable to display the first partial map and the second partial map in the first partial display area and the second partial display area, respectively, by superimposing the first partial map and the second partial map on the map displayed by said whole-display unit while causing the first partial map to be scrolled along the first travel route and the second partial map to be scrolled along the second travel route and causing the first partial display area to move along the first travel route and the second partial display area to move along the second travel route, and
wherein the first partial map and the second partial map are different from one another.

12. A map display device which displays a map regarding a travel route of a mobile object, said device comprising:
a display screen;
a map information obtainment unit operable to obtain map information concerning a current position of the mobile object and a plurality of travel routes from the current position to respective destinations;
a whole-display unit operable to display, on the whole display screen, a map indicated by the obtained map information concerning the current position of the mobile object; and
a partial-display unit operable to display a first partial map on a first partial display area of said display screen and a second partial map on a second partial display area of said display screen, the first partial map being a map that is related to a part of a first travel route of the plurality of travel routes of the mobile object, and the second partial map being a map that is related to a part of a second travel route of the plurality of travel routes of the mobile object, wherein the first partial display area occupies a first part of said display screen, and the second partial display area occupies a second part of said display screen,
wherein the first partial map and the second partial map are different from one another, and
wherein said partial-display unit is operable to:
display the first partial map and the second partial map in the first partial display area and the second partial display area, respectively, by superimposing the first partial map and the second partial map on the map displayed by said whole-display unit while causing the first partial map to be scrolled along the first travel route and the second partial map to be scrolled along the second travel route; and
by adjusting the number of base points which serve as bases for the scroll or a speed of the scroll, simultaneously display the first and second partial maps in such a manner that a time from the start of scroll until the end of scroll for the first partial map is identical to a time from the start of scroll until the end of scroll for the second partial map, while causing each of the first and second partial maps to be scrolled.

13. A map display device which displays a map regarding a travel route of a mobile object, said device comprising:
a display screen;
a map information obtainment unit operable to obtain map information concerning a current position of the mobile object and a plurality of travel routes from the current position to respective destinations;
a whole-display unit operable to display, on the whole display screen, a map indicated by the obtained map information concerning the current position of the mobile object; and
a partial-display unit operable to display a first partial map on a first partial display area of said display screen and a second partial map on a second partial display area of said display screen, the first partial map being a map that is related to a part of a first travel route of the plurality of travel routes of the mobile object, and the second partial map being a map that is related to a part of a second travel route of the plurality of travel routes of the mobile object, wherein the first partial display area occupies a first part of said display screen, and the second partial display area occupies a second part of said display screen,
wherein the first partial map and the second partial map are different from one another, and
wherein said partial-display unit is operable to:
display the first partial map and the second partial map in the first partial display area and the second partial display area, respectively, by superimposing the first partial map and the second partial map on the map displayed by said whole-display unit while causing the first partial map to be scrolled along the first travel route and the second partial map to be scrolled along the second travel route; and
simultaneously display the first and second partial maps in such a manner that the first and second partial maps are of a same predicted time of the mobile object while traveling, while causing each of the first and second partial maps to be scrolled.

14. A map display device which displays a map regarding a travel route of a mobile object, said device comprising:
a display screen;
a map information obtainment unit operable to obtain map information concerning a current position and the travel route of the mobile object;
a whole-display unit operable to display, on the whole display screen, a map indicated by the obtained map information concerning the current position of the mobile object; and
a partial-display unit operable to display a partial map on a partial display area of said display screen, the partial map being a map that is related to a part of the travel route of the mobile object; and
wherein the partial display area occupies only a part of said display screen,
wherein said partial-display unit is operable to display the partial map on the partial display area by superimposing the partial map on the map displayed by said whole-display unit while causing the partial map to be scrolled along the travel route of the mobile object,
wherein in the case where a point on the travel route included in the map displayed by said whole-display unit is defined as a base point, said partial-display unit is operable to define a display area as the partial display area, and to display the partial map while causing the partial map to be scrolled, the display area including the base point and being associated with the base point by a predetermined distance,
wherein the map display device further includes a partial map area calculation unit operable to calculate plural base points on the travel route from the current position to a destination, and to calculate a form or a reduction scale of the partial map based on a positional relationship of the calculated base points,
wherein said partial-display unit is operable to display the partial map in the form or at the reduction scale calculated by said partial map area calculation unit, and
wherein said partial map area calculation unit is operable to calculate the form of the partial map based on the positional relationship of backward and forward base points on the travel route.

15. A map display device which displays a map regarding a travel route of a mobile object, said device comprising:
a display screen;
a map information obtainment unit operable to obtain map information concerning a current position and the travel route of the mobile object;
a whole-display unit operable to display, on the whole display screen, a map indicated by the obtained map information concerning the current position of the mobile object;
a partial-display unit operable to display, on a partial display area that is a part of said display screen, a map indicated by the obtained map information concerning the travel route of the mobile object; and
a partial map area calculation unit operable to calculate plural base points on the travel route from the current position to the destination, and to calculate a form or a reduction scale of the partial map based on a positional relationship of the calculated base points,
wherein said partial-display unit is operable to display, on the partial display area, a partial map that is a map related to a part of the travel route while causing the map to be scrolled along the travel route, the partial map being superimposed on the map displayed by said whole-display unit,
wherein in the case where a point on the travel route included in the map displayed by said whole-display unit is defined as a base point, said partial-display unit is operable to define a display area as the partial display area, and to display the partial map while causing the partial map to be scrolled, the display area including the base point and being associated with the base point by a predetermined distance,
wherein said partial-display unit is operable to display the partial map in the form or at the reduction scale calculated by said partial map area calculation unit, and
wherein said partial map area calculation unit includes:
a base point coordinates obtainment unit operable to obtain coordinate values of two base points located backward and forward with respect to each other on the travel route, and
wherein said partial map area calculation unit is operable to calculate the form of the partial map by multiplying a ratio with a predetermined constant, the ratio being a ratio of the obtained coordinate values between a difference in a vertical axis and a difference in a horizontal axis.

16. A map display device which displays a map regarding a travel route of a mobile object, said device comprising:
a display screen;
a map information obtainment unit operable to obtain map information concerning a current position and the travel route of the mobile object;
a whole-display unit operable to display, on the whole display screen, a map indicated by the obtained map information concerning the current position of the mobile object;
a partial-display unit operable to display, on a partial display area that is a part of said display screen, a map indicated by the obtained map information concerning the travel route of the mobile object; and
a partial map area calculation unit operable to calculate plural base points on the travel route from the current position to the destination, and to calculate a form or a reduction scale of the partial map based on a positional relationship of the calculated base points,
wherein said partial-display unit is operable to display, on the partial display area, a partial map that is a map related to a part of the travel route while causing the map to be scrolled along the travel route, the partial map being superimposed on the map displayed by said whole-display unit,
wherein in the case where a point on the travel route included in the map displayed by said whole-display unit is defined as a base point, said partial-display unit is operable to define a display area as the partial display area, and to display the partial map while causing the partial map to be scrolled, the display area including the base point and being associated with the base point by a predetermined distance,
wherein said partial-display unit is operable to display the partial map in the form or at the reduction scale calculated by said partial map area calculation unit,
wherein said partial map area calculation unit is operable to calculate the form of the partial map based on the positional relationship of backward and forward base points on the travel route, and
wherein said partial map area calculation unit is operable to calculate the reduction scale of the partial map to be displayed in the partial display area, based on the positional relationship of the base points located forward and backward with respect to each other on the travel route.

17. A map display device which displays a map regarding a travel route of a mobile object, said device comprising:
a display screen;
a map information obtainment unit operable to obtain map information concerning a current position and the travel route of the mobile object;
a whole-display unit operable to display, on the whole display screen, a map indicated by the obtained map information concerning the current position of the mobile object;
a partial-display unit operable to display, on a partial display area that is a part of said display screen, a map indicated by the obtained map information concerning the travel route of the mobile object; and
a partial map area calculation unit operable to calculate plural base points on the travel route from the current position to the destination, and to calculate a form or a reduction scale of the partial map based on a positional relationship of the calculated base points,
wherein said partial-display unit is operable to display, on the partial display area, a partial map that is a map related to a part of the travel route while causing the map to be scrolled along the travel route, the partial map being superimposed on the map displayed by said whole-display unit,
wherein in the case where a point on the travel route included in the map displayed by said whole-display unit is defined as a base point, said partial-display unit is operable to define a display area as the partial display area, and to display the partial map while causing the partial map to be scrolled, the display area including the base point and being associated with the base point by a predetermined distance,
wherein said partial-display unit is operable to display the partial map in the form or at the reduction scale calculated by said partial map area calculation unit,
wherein said partial map area calculation unit is operable to calculate the form of the partial map based on the positional relationship of backward and forward base points on the travel route, and
wherein said partial map area calculation unit is operable to specify, with respect to two axes which are orthogonal to each other, a set of two points from among the base points, as reference base points, and calculate the reduction scale of the partial map to be displayed in the partial display area, using the reference base points.

18. The map display device according to claim 17,
wherein said partial map area calculation unit includes
a reference base point coordinates obtainment unit operable to obtain coordinate values of two reference base points located forward and backward with respect to each other on the travel route,
wherein said partial map area calculation unit is operable to calculate a reduction scale for reducing the size of the partial map to the extent that a difference in a vertical axis does not exceed the height of the partial display area of a predetermined size and a difference in a horizontal axis of the obtained coordinate values does not exceed the width of the partial display area of a predetermined size, and
wherein said partial-display unit is operable to display the partial map at the reduction scale calculated by said partial map area calculation unit, the partial map regarding the travel route which includes the two base points.

19. A map display device which displays a map regarding a travel route of a mobile object, said device comprising:
a display screen;
a map information obtainment unit operable to obtain map information concerning a current position of the mobile object and a travel route from the current position to a destination;
a whole-display unit operable to display, on the whole display screen, a map indicated by the obtained map information concerning the current position of the mobile object;
a partial-display unit operable to display, on a partial display area that is a part of said display screen, a map indicated by the obtained map information concerning the travel route of the mobile object;
a second mobile object detection unit operable to detect a location of a second mobile object that is different from the mobile object; and
an intersection information obtainment unit operable to obtain information concerning intersections on the route to the destination, in the case where the location detected by said second mobile object detection unit is set as the destination, wherein in the case where a point on the travel route included in the map displayed by said whole-display unit is defined as a base point, said partial-display unit is operable to define a display area as the partial display area, and display a partial map that is a map regarding a part of the travel route while causing the partial map to be scrolled along the travel route, the display area including the base point and being associated with the base point by a predetermined distance, and the partial map being superimposed on the map displayed by said whole-display unit, and said partial-display unit is further operable to judge whether or not the number of intersections between the current position and the destination exceeds a predetermined number, based on the information concerning the intersections, and start causing the partial map to be scrolled when the number of intersections exceeds the predetermined number.

20. A map display device which displays a map regarding a travel route of a mobile object, said device comprising:

a display screen;

a map information obtainment unit operable to obtain map information concerning a current position and the travel route of the mobile object;

a whole-display unit operable to display, on the whole display screen, a map indicated by the obtained map information concerning the current position of the mobile object;

a partial-display unit operable to display, on a partial display area that is a part of said display screen, a map indicated by the obtained map information concerning the travel route of the mobile object;

an input unit operable to receive a user's operational input; and an input valid range control unit operable to control a valid range of the user's operation inputted by said input unit, wherein said partial-display unit is operable to display, on the partial display area, a partial map that is a map related to a part of the travel route while causing the map to be scrolled along the travel route, the partial map being superimposed on the map displayed by said whole-display unit, wherein in the case where a point on the travel route included in the map displayed by said whole-display unit is defined as a base point, said partial-display unit is operable to define a display area as the partial display area, and to display the partial map while causing the partial map to be scrolled, the display area including the base point and being associated with the base point by a predetermined distance, wherein said input valid range control unit is operable to determine, as the valid range, an area which includes the base point and is associated with the base point by a predetermined distance, and wherein said partial display unit is operable to start causing the partial map to be scrolled in the case where said input unit receives the user's operational input within the valid range.

21. A map display device which displays a map regarding a travel route of a mobile object, said device comprising:

a display screen;

a map information obtainment unit operable to obtain map information concerning a current position and the travel route of the mobile object;

a whole-display unit operable to display, on the whole display screen, a map indicated by the obtained map information concerning the current position of the mobile object;

a partial-display unit operable to display, on a partial display area that is a part of said display screen, a map indicated by the obtained map information concerning the travel route of the mobile object; and a current position information display unit operable to display, in a menu form, information concerning a current position which is not displayed on the map, in a predetermined area within the display screen, wherein said partial-display unit is operable to display, on the partial display area, a partial map that is a map related to a part of the travel route while causing the map to be scrolled along the travel route, the partial map being superimposed on the map displayed by said whole-display unit, wherein in the case where a point on the travel route included in the map displayed by said whole-display unit is defined as a base point, said partial-display unit is operable to define a display area as the partial display area, and to display the partial map while causing the partial map to be scrolled, the display area including the base point and being associated with the base point by a predetermined distance, and wherein in the case where the area in which the information concerning the current position is displayed in the menu form is superimposed on the partial display area, said current position information display unit is operable to move the information concerning the current position in another predetermined area which is not superimposed on the partial display area.

22. A map display method of displaying a map regarding a travel route of a mobile object on a screen, said method comprising:

obtaining map information concerning a current position and the travel route of the mobile object;

displaying, on a display screen, a map indicated by the obtained map information concerning the current position of the mobile object, the map indicated by the obtained map information being displayed on the whole display screen; and displaying, on a partial display area that is a part of the display screen, a partial map, the partial map being a map that is related to a part of the travel route of the mobile object, wherein the partial display area occupies only a part of the display screen, and wherein in said displaying of the partial maps the partial map is displayed on the partial display area by superimposing the partial map on the map displayed on the whole display screen in said displaying of the map, while the partial map is caused to be scrolled along the travel route of the mobile object and while the partial display area is caused to move along the travel route of the mobile object.

23. A computer-readable storage medium storing a program for displaying a map regarding a travel route of a mobile object on a screen, said program causing a computer to execute the steps of:

obtaining map information concerning a current position and the travel route of the mobile object;

displaying, on a display screen, a map indicated by the obtained map information concerning the current position of the mobile object, the map indicated by the obtained map information being displayed on the whole display screen; and displaying, on a partial display area that is a part of the display screen, a partial map, the partial map being a map that is related to a part of the travel route of the mobile object, wherein the partial display area occupies only a part of the display screen, and wherein in said displaying of the partial map, the partial map is displayed on the partial display area by superimposing the partial map on the map displayed on the whole display screen in said displaying of the map, while the partial map is caused to be scrolled along the travel route of the mobile object and while the partial display area is caused to move along the travel route of the mobile object.

* * * * *